US006317495B1

(12) United States Patent
Gaikwad et al.

(10) Patent No.: US 6,317,495 B1
(45) Date of Patent: Nov. 13, 2001

(54) SPECTRAL OPTIMIZATION AND JOINT SIGNALING TECHNIQUES WITH MULTI-LINE SEPARATION FOR COMMUNICATION IN THE PRESENCE OF CROSSTALK

(75) Inventors: Rohit V. Gaikwad; Richard G. Baraniuk, both of Houston, TX (US)

(73) Assignee: WM. Marsh Rice University, Houston, TX (US)

( * ) Notice: Subject to any disclaimer, the term of this patent is extended or adjusted under 35 U.S.C. 154(b) by 0 days.

(21) Appl. No.: 09/144,934

(22) Filed: Sep. 1, 1998

Related U.S. Application Data

(63) Continuation of application No. 09/107,975, filed on Jun. 30, 1998.
(60) Provisional application No. 60/068,123, filed on Dec. 19, 1997, provisional application No. 60/083,750, filed on Apr. 30, 1998, and provisional application No. 60/087,255, filed on May 29, 1998.

(51) Int. Cl.$^7$ .............................. H04M 1/00; H04M 7/00; H04M 9/00
(52) U.S. Cl. ..................... 379/417; 379/93.01; 379/24; 379/28; 370/201
(58) Field of Search ..................... 375/260, 254; 379/417, 93.01, 9–9.06, 10.01–10.03, 15.01–15.05, 22–22.08, 23, 24, 27.01–27.08, 28; 370/201, 278, 282, 286

(56) References Cited

U.S. PATENT DOCUMENTS

| 4,870,657 | 9/1989 | Bergmans et al. ........................ 375/14 |
| 5,063,351 | 11/1991 | Goldthorp et al. .................... 324/628 |
| 5,377,230 | 12/1994 | Golden .................................... 375/60 |
| 5,479,447 | 12/1995 | Chow et al. . |
| 5,519,731 | 5/1996 | Cioffi .................................... 375/260 |
| 5,668,802 | 9/1997 | Chalmers et al. .................... 370/276 |
| 5,673,290 | 9/1997 | Cioffi . |

FOREIGN PATENT DOCUMENTS

98/34351 8/1998 (WO) .

OTHER PUBLICATIONS

Chen, .WY., Architecture and Performance Simulation of Single Pair HDSL, Jun. 1996, IEEE Communications, pp. 1421–1425.*

Primary Examiner—Fan Tsang
Assistant Examiner—Roland G. Foster
(74) Attorney, Agent, or Firm—Conley, Rose & Tayon, P.C.

(57) ABSTRACT

A system and method for determining transmission characteristics for a communications channel and for transmitting data on the communications channel. In one embodiment, the method starts by determining the channel's transfer function and determining interference characteristics for the channel. The interference characteristics preferably include transfer functions describing the channel's susceptibility to cross talk from neighboring channels. The channel transfer function and the interference characteristics are then examined and a transmit spectrum (or power spectral density function) is constructed for the channel. The transmit spectrum preferably uses orthogonal separation of upstream and downstream communications to increase channel capacity. This method is useable in communicating data when the channel is subject to interference from one or more other communications channels, including near-end cross talk (NEXT) and far-end cross talk (FEXT), from other channels carrying the same service and/or different services. The present invention may be used in digital subscriber-line (xDSL) communications or in a variety of other applications, such as in well-logging and in systems involving multiple interfering radio transmitters.

81 Claims, 34 Drawing Sheets

OTHER PUBLICATIONS

Search Report for International Application No. PCT/US98/27154 mailed Apr. 29, 1999.

Carbonelli et al., "Evaluation of Near–End Crosstalk Noise Affecting ADSL Systems," Singapore ICCS Conference, Nov. 1994, pp. 630–634.

McCaslin et al., "Performance and Spectral Compatibility of MONET–PAM HDSL2 with Ideal Transmit Spectra—Preliminary Results," T1E1.4/97–307, Sep. 1997, pp. 1–5.

Rude et al., "A Proposal for HDSL2 Transmission: OPTIS," T1E1.4/97–238, Jun. 1997, pp. 1–3.

Rude et al., "OPTIS Performance and Spectral Compatibility," T1E1.4/97–239, Jun. 1997, pp. 1–4.

Takatori et al., "Performance Evaluation of OPTIS for HDSL2," T1E1.4/97–240, Jun. 1997, pp. 1–4.

Sendonaris et al., "Joint Signaling Strategies for Approaching the Capacity of Twisted Pair Channels," IEEE Transactions on Communications, vol. 46, No. 5, May 1998, pp. 673–685.

McCaslin et al., "Performance and Spectral Compatibility of MONET (R1) HDSL2 with Ideal Transmit Spectra—Preliminary Results," T1E1.4/97–412, Dec. 1997, pp. 1–6.

Girardeau et al., "Updated OPTIS PSD Mask and Power Specification for HDSL2," T1E1.4/97–435, Dec. 1997, pp. 1–6.

Bingham, "Multicarrier Modulation for Data Transmission: An Idea Whose Time Has Come," IEEE Communications Magazine, May 1990, pp. 5–14.

Zimmerman, "Performance and Spectral Compatibility of OPTIS HDSL2," T1E1.4/97–237, Jun. 1997, pp. 1–7.

Kerpez, "Full–Duplex 2B1Q Single–Pair HDSL Performance and Spectral Compatibility," T1E1.4/95–127, Nov. 1995, pp. 1–8.

Zimmerman, "Normative Text for Spectral Compatibility Evaluations," T1E1.4/97–180R1, Jun. 1997, pp. 1–10.

Barton et al., "Optimization of Discrete Multitone to Maintain Spectrum Compatibility with Other Transmission Systems on Twisted Copper Pairs," IEEE Journal on Selected Areas in Communications, vol. 13, No. 9, Dec. 1995, pp. 1558–1563.

Kerpez, "Near–End Crosstalk is Almost Gaussian," IEEE Transactiosn on Communications, vol. 41, No. 1, Jan. 1993, pp. 670–672.

Kalet, "The Multitone Channel," IEEE Transactions on Communications, vol. 37, No. 2, Feb. 1989, pp. 119–124.

Aslanis, Jr. et al., "Achievable Information Rates on Digital Subscriber Loops: Limiting Information Rates with Crosstalk Noise," IEEE Transactions on Communications, vol. 40, No. 2, Feb. 1992, pp. 361–372.

Chow et al., "A Practical Discrete Multitone Transceiver Loading Algorithm for Data Transmission over Spectrally Shaped Channels," IEEE Transactions on Communications, vol. 43, No. 2/3/4, Feb./Mar./Apr. 1995, pp. 773–775.

Kalet et al., "On the Capacity of a Twisted–Wire Pair: Gaussian Model," IEEE Transactions on Communications, vol. 38, No. 3, Mar. 1990, pp. 379–383.

Werner, "The HDSL Environment," IEEE Journal on Selected Areas in Communications, vol. 9, No. 6, Aug. 1991, pp. 785–800.

Lee et al., *Digital Communication, Second Edition*, Kluwer Academic Publishers 1994, pp. 489–491.

Andrew Sendonaris, Joint Signaling Strategies for Maximizing the Capacity of Twisted Pair Loops, (13 pp.), Oct. 1995.

Written Opinion mailed Jan. 20, 2000, Int'l App. No. PCT/US98/27154.

* cited by examiner

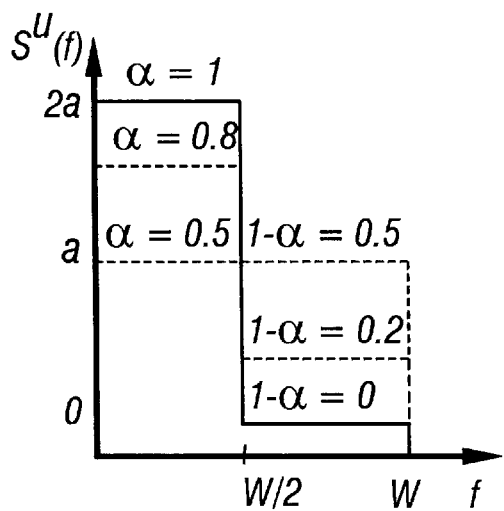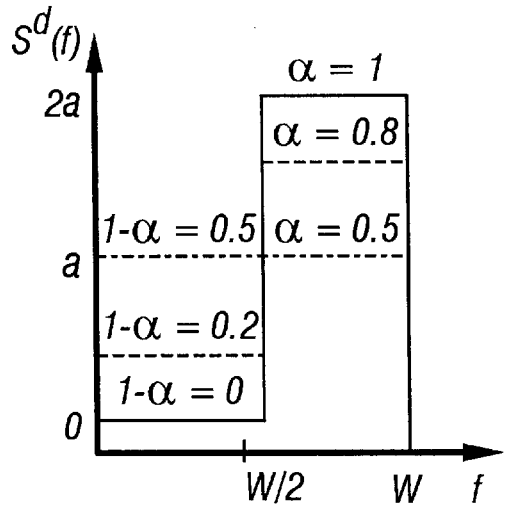
FIG. 23A    FIG. 23B
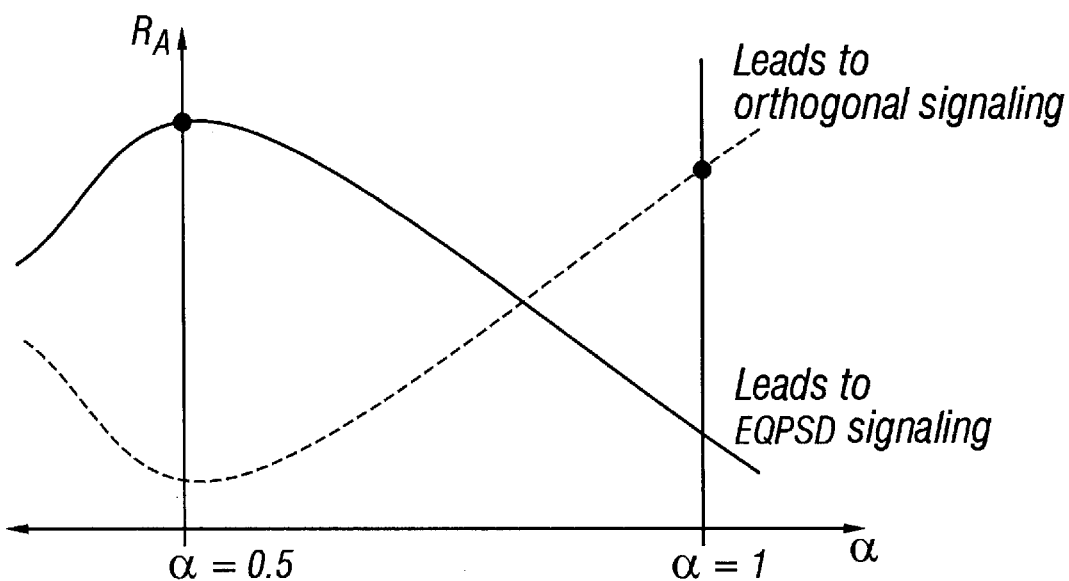
FIG. 24

EQPSD/FDS with "discrete"
transmit spectra

EQPSD/FDS with "contiguous"
transmit spectra $M_E = M_{E2F} = 9$

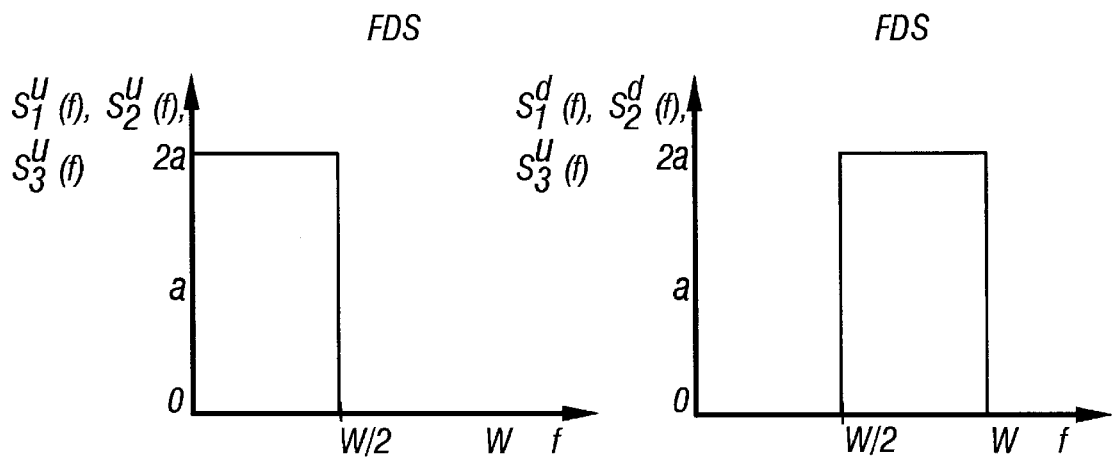
FIG. 34A  FIG. 34B
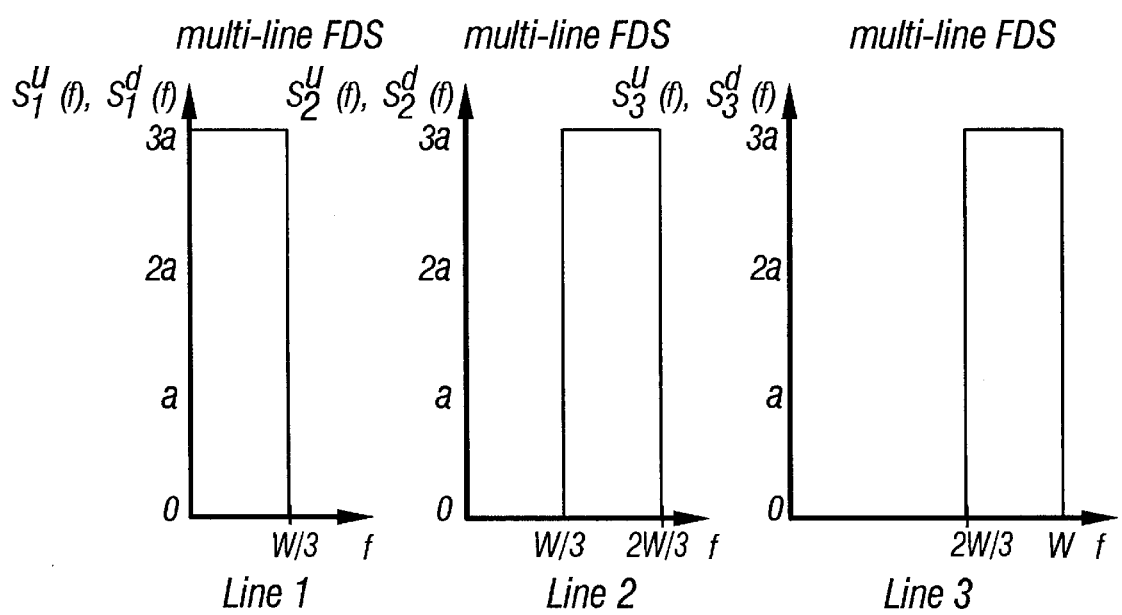
FIG. 34C  FIG. 34D  FIG. 34E

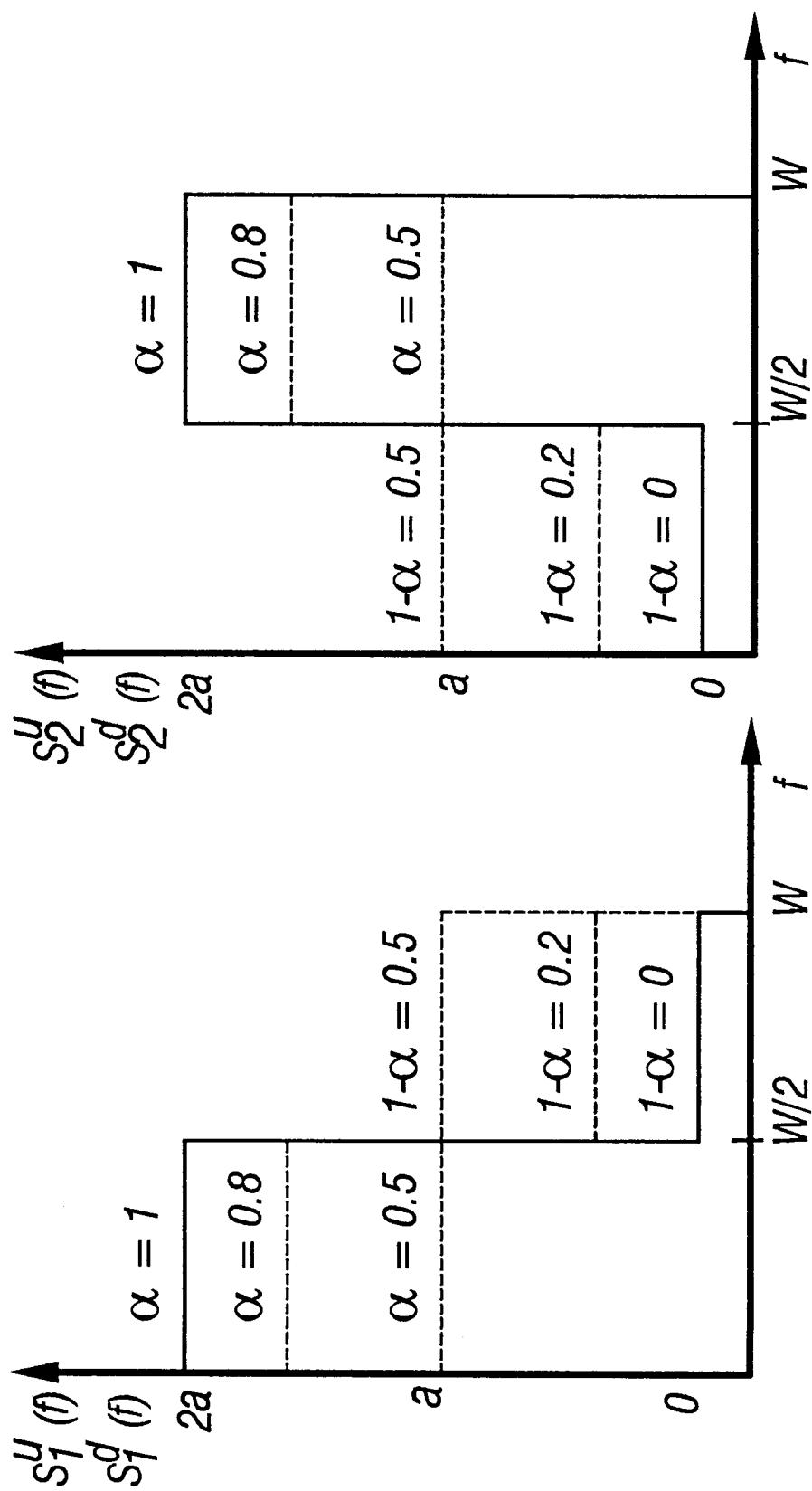

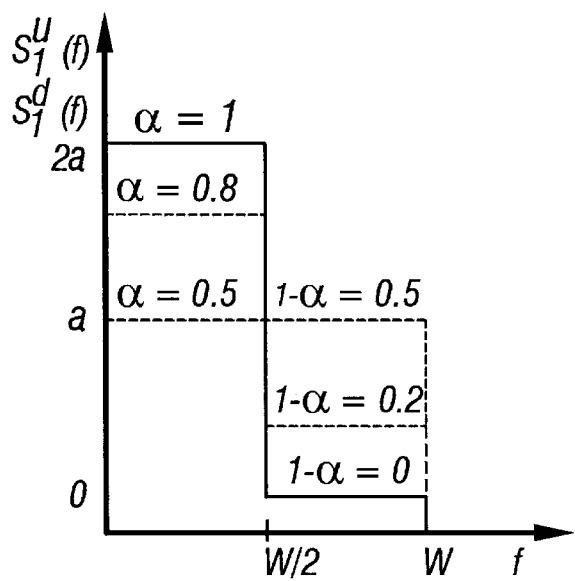
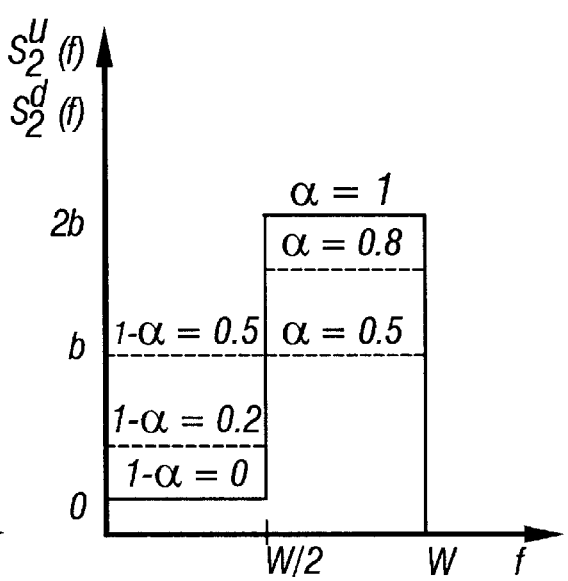
FIG. 42A  FIG. 42B
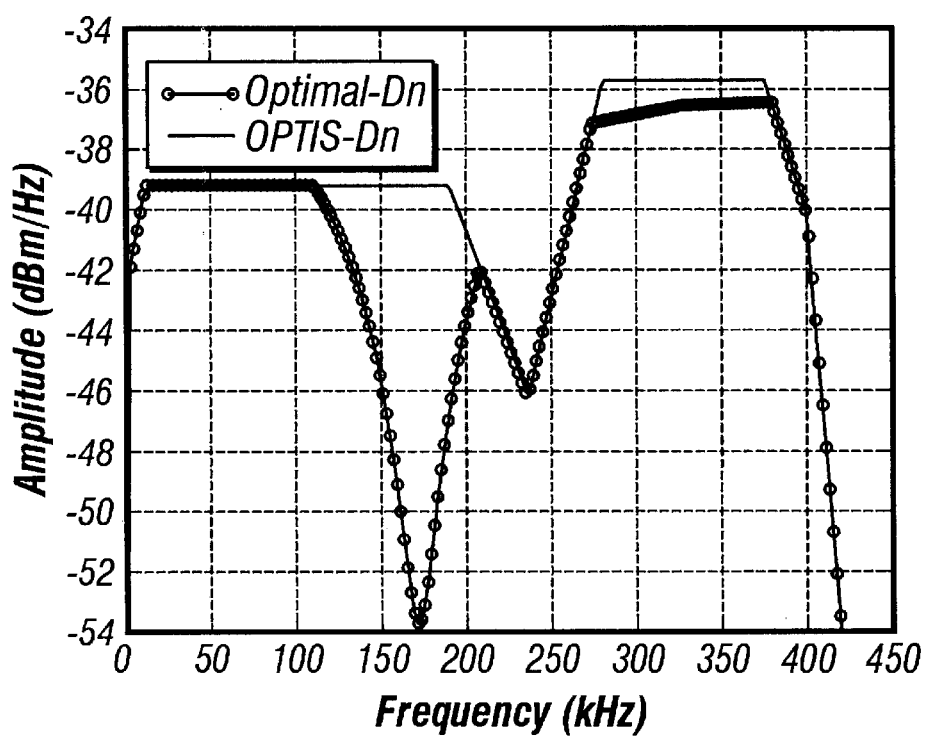
FIG. 43

SPECTRAL OPTIMIZATION AND JOINT SIGNALING TECHNIQUES WITH MULTI-LINE SEPARATION FOR COMMUNICATION IN THE PRESENCE OF CROSSTALK

CROSS-REFERENCE TO RELATED APPLICATIONS

This application is a continuation of:

U.S. application Ser. No. 09/107,975 titled "Spectral optimization and joint signaling techniques for communication in the presence of crosstalk," by Rohit Gaikwad and Richard Baraniuk, filed on Jun. 30, 1998 and assigned to the assignee of this application;

which in turn claims the benefit of priority of:

U.S. Provisional Application No. 60/068,123 titled "Spectral optimization and joint signalling techniques for twisted pair communication," by Rohit Gaikwad and Richard Baraniuk, filed on Dec. 19, 1997;

U.S. Provisional Application No. 60/083,750 titled "Spectral optimization and joint signaling techniques for communication in the presence of crosstalk," by Rohit Gaikwad and Richard Baraniuk, filed on Apr. 30, 1998; and U.S. Provisional Application No. 60/087,255 titled "Spectral optimization and joint signaling techniques for communication in the presence of crosstalk," by Rohit Gaikwad and Richard Baraniuk, filed on May 29, 1998.

FIELD OF THE INVENTION

The invention relates to electronic communication and, more particularly, to techniques for communicating on communications channels subject to interference such as crosstalk and noise.

OUTLINE

Description of the Related Art
1 Communications Background
  1.1 Twisted pairs
  1.2 Overview of services
  1.3 Crosstalk interference
    1.3.1 NEXT and FEXT
    1.3.2 Notation for self-NEXT and self-FEXT
  1.4 Capacity and performance margin
2 Problem Statement
  2.1 General statement
  2.2 Particular statement for DSLs
    2.2.1 HDSL2 service
    2.2.2 "GDSL" service
    2.2.3 "VDSL2" service
3 Previous Work
  3.1 Static PSD Masks and transmit spectra
  3.2 Joint signaling techniques
  3.3 Multitone modulation
  3.4 Summary of previous work

SUMMARY OF THE INVENTION

BRIEF DESCRIPTION OF THE DRAWINGS

DETAILED DESCRIPTION OF THE PREFERRED EMBODIMENTS

Figure 1:
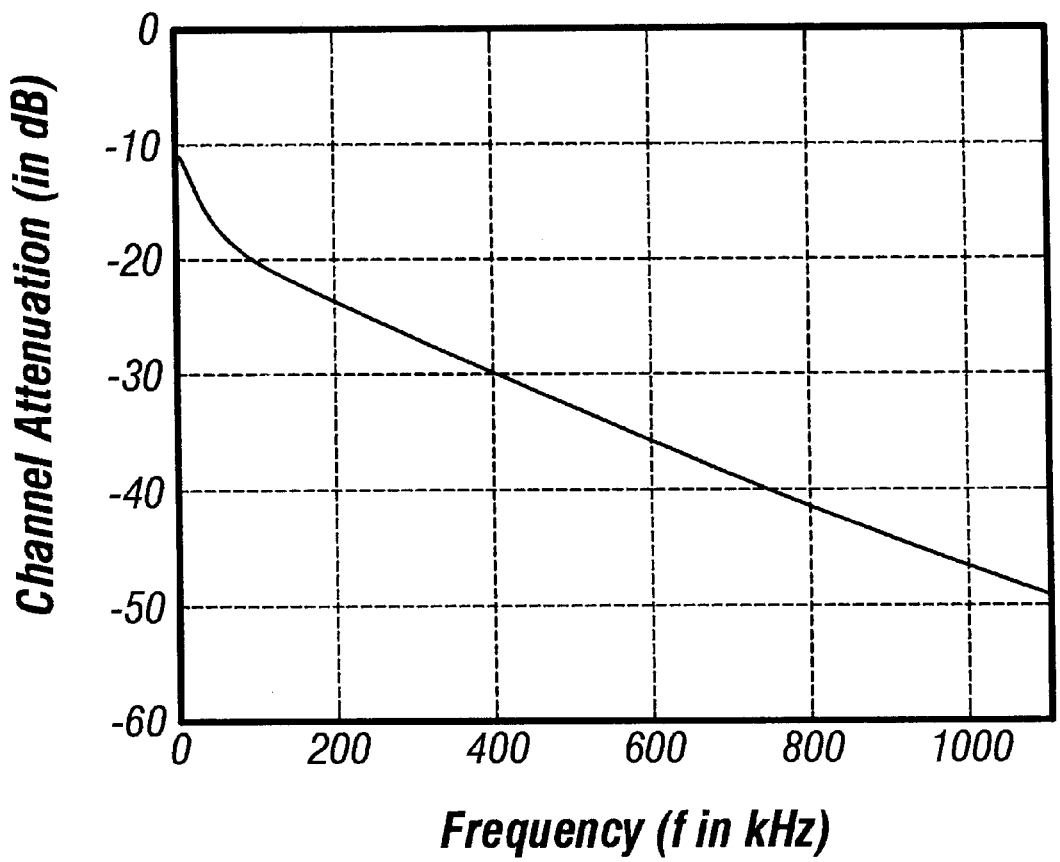

4 New, Optimized Signaling Techniques
  4.1 Assumptions, Notation, and Background
  4.2 Interference models and simulation conditions
  4.3 Signaling schemes
  4.4 Optimization: Interference from other services (DSIN-NEXT and DSIN-FEXT)—Solution: EQPSD signaling
    4.4.1 Problem statement
    4.4.2 Additional assumption
    4.4.3 Solution
    4.4.4 Examples
  4.5 Optimization: Interference from other services (DSIN-NEXT and DSIN-FEXT) plus self-interference (self-NEXT and low self-FEXT)—Solution: EQPSD and FDS signaling
    4.5.1 Self-NEXT and self-FEXT rejection using orthogonal signaling
    4.5.2 Problem statement
    4.5.3 Additional assumptions
    4.5.4 Signaling scheme
    4.5.5 Solution: One frequency bin
    4.5.6 Solution: All frequency bins
    4.5.7 Algorithm for optimizing the overall transmit spectrum
    4.5.8 Fast, suboptimal solution for the EQPSD to FDS switch-over bin
    4.5.9 Flow of the scheme
    4.5.10 Grouping of bins and wider subchannels
    4.5.11 Examples and results
    4.5.12 Spectral compatibility
  4.6 Optimization: Interference from other services (DSIN-NEXT and DSIN-FEXT) plus self-interference (self-NEXT and high self-FEXT)—Solution: EQPSD, FDS and multi-line FDS signaling
    4.6.1 Self-FEXT and self-NEXT rejection using multi-line FDS
    4.6.2 Problem statement
    4.6.3 Additional assumptions
    4.6.4 Signaling scheme
    4.6.5 Solution using EQPSD and FDS signaling: All frequency bins
    4.6.6 Switch to multi-line FDS: One frequency bin
    4.6.7 Switch to multi-line FDS: All frequency bins
    4.6.8 Special case: Performance of 2 lines
    4.6.9 Flow of the scheme
    4.6.10 Examples and results
  4.7 Joint signaling for lines differing in channel, noise, and interference characteristics
    4.7.1 Solution for 2 lines: EQPSD and FDS signaling
    4.7.2 Solution for M lines: EQPSD and FDS signaling
    4.7.3 Solution for 2 lines: EQPSD and multi-line FDS signaling
  4.8 Optimizing under a PSD mask constraint: No self-interference
    4.8.1 Problem statement
    4.8.2 Solution
    4.8.3 Examples
  4.9 Optimizing under a PSD mask constraint: With self-interference
    4.9.1 Problem statement
    4.9.2 Solution
    4.9.3 Algorithm for constrained optimization of the transmit spectra
    4.9.4 Examples and results
  4.10 Bridged taps
    4.10.1 Optimal transmit spectra
    4.10.2 Suboptimal transmit spectra
    4.10.3 Examples and discussion
  4.11 Optimization: Asymmetrical data-rate channels 4.12 Extensions
   4.12.1 More general signaling techniques
   4.12.2 More general interferer models
   4.12.3 Channel variations
   4.12.4 Broadband modulation schemes
   4.12.5 Linear power constraints in frequency
   4.12.6 CDS signaling under a peak power constraint in frequency
   4.12.7 Multi-user detector at central office
Summary of Contributions
   References
   Glossary
   Notation

DESCRIPTION OF THE RELATED ART

1 Communications Background 1.1 Twisted pair telephone lines

Telephone service is provided to most businesses and homes via a pair of copper wires (a "twisted pair"). A telephone cable contains many twisted pairs: 25 twisted pairs are grouped in close proximity into 2 "binder groups," and several binder groups are packed together to form a cable. The two terminations of a telephone cable are at the user (subscriber) end and at the telephone company (central office, CO) end. We will use the terms "twisted pair," "line," and "subscriber loop" interchangeably herein as one example of a communications channel.

Voice telephony uses only the first 4 kHz of bandwidth available on the lines. However, one can modulate data to over 1 MHz with significant bit rates. Only recently have schemes been developed to exploit the additional bandwidth of the telephone channel. A plot of the frequency response of a typical telephone channel is given in FIG. 1.

1.2 Overview of services

In the past few years, a number of services have begun to crowd the bandwidth of the telephone channel. Some of the important services are:

POTS—"Plain Old Telephone Service." This is the basic telephone service carrying voice traffic in the 0–4 kHz bandwidth. Conventional analog modems also use the same bandwidth.

ISDN—Integrated Services Digital Network. This service allows end-to-end digital connectivity at bit rates of up to 128 kbps (kilo-bits-per-second).

T1—Transmission 1. This is a physical transmission standard for twisted pairs that uses 24 multiplexed channels (each at 64 kbps) to give a total bit rate of 1.544 Mbps (Mega-bits-per-second). It uses costly repeaters.

HDSL—High bit-rate Digital Subscriber Line. This is a full-duplex (two-way) T1-like (1.544 Mbps) signal transmission service using only two twisted pairs and no repeaters.

ADSL—Asymmetric Digital Subscriber Line. Over one twisted pair, this service provides a high-speed (on the order of 6 Mbps) downstream (from central office (CO) to subscriber) channel to each user and a low-speed (on the order of 640 kbps) upstream (from subscriber to the central office) channel. This service preserves the POTS service over a single twisted pair.

VDSL—Very high bit-rate DSL. This yet-to-be-standardized service will provide a very high speed (on the order of 25 Mbps) downstream channel to subscribers and a lower speed upstream channel to the central office over a single twisted pair less than 3 to 6 kft long. Further, it will preserve the POTS service.

HDSL2—High bit-rate Digital Subscriber Line 2. This soon-to-be-standardized service will provide full-duplex 1.544 Mbps signal transmission service in both directions (full duplex) over a single twisted pair (<18 kft long) without repeaters.

"GDSL"—General Digital Subscriber Line. This hypothetical service would (for illustration purposes) carry 25 Mbps full-duplex data rate over a single twisted pair (see Sections 2.2.2 and 4.6.10).

"VDSL2"—Very high bit-rate DSL Line 2. This hypothetical service would (for illustration purposes) carry 12.4 Mbps full-duplex data rate over a single twisted pair less than 3 to 6 kft long (see Sections 2.2.3 and 4.6.10).

Currently, all the above mentioned services have an ANSI standard except for VDSL, HDSL2, "GDSL" and "VDSL2".

1.3 Crosstalk interference 1.3.1 NEXT and FEXT

Due to the close proximity of the lines within a binder, there is considerable amount of crosstalk interference between different neighboring telephone lines. Physically, there are two types of interference (see in FIG. 2):

Near-end crosstalk (NEXT): Interference between neighboring lines that arises when signals are transmitted in opposite directions. If the neighboring lines carry the same type of service then the interference is called self-NEXT; otherwise, we will refer to it as different-service NEXT.

Far-end crosstalk (FEXT): Interference between neighboring lines that arises when signals are transmitted in the same direction. If the neighboring lines carry the same type of service then the interference is called self-FEXT; otherwise, we will refer to it as different-service FEXT.

Figure 3:
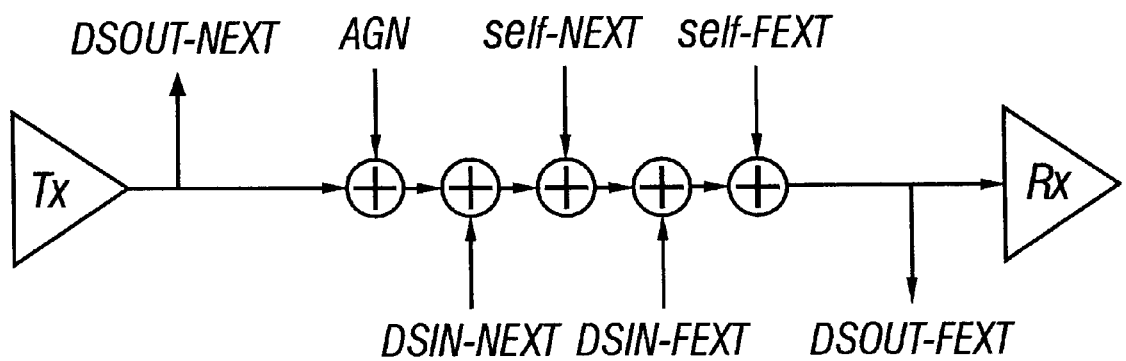

FIG. 3 shows that crosstalk interference can be modeled as additive interference. Since neighboring lines may carry either the same or a different flavor of service, there are three categories of interference (see FIG. 3):

1. Self-interference (self-NEXT and self-FEXT) between lines carrying the same service.
2. Interference into a channel carrying service A from other lines carrying services other than A (DSIN-NEXT and DSIN-FEXT).
3. Interference from a channel carrying service A into other lines carrying services other than A (DSOUT-NEXT and DSOUT-FEXT).

Channel noise will be modeled as additive Gaussian noise (AGN).

1.3.2 Notation for self-NEXT and self-FEXT

Here is some notation to keep things clear. Number the M twisted pairs (lines) in the cable with index $i \in \{1, \ldots, M\}$, and denote the direction of transmission with index $o \in \{u, d\}$, with u=upstream (to the central office) and d=downstream (from the central office). All the twisted pairs in the cable bundle are assumed to carry the same service. Let $\bar{o}$ be the complement direction of o: $\bar{u}=d$, $\bar{d}=u$. Denote the transmitters and receivers on line i as:

$T_i^o$: transmitter (Tx) on twisted pair i in direction o.

$R_i^o$: receiver (Rx) on twisted pair i in direction o.

Ideally, $T_i^o$ intends to transmit information only to $R_i^o$. In a real system, however, $T_i^o$'s signal leaks into the receivers $R_j^{\bar{o}}$ and $R_j^o$. Using our notation, this self-interference corresponds to:

Self-NEXT: Crosstalk from $T_i^o$ into $R_j^{\bar{o}}$ for all $j \neq i$, $o \in \{u, d\}$, and Self-FEXT: Crosstalk from $T_i^o$ into $R_j^o$ for all $j \neq i$, $o \in \{u, d\}$.

In a full-duplex xDSL service, each twisted pair i supports transmission and reception in both directions (using echo cancelers), so each line i has a full set of transmitters and receivers: $\{T_i^u, R_i^u, T_i^d, R_i^d\}$. With perfect echo cancellation, there is no crosstalk from $T_i^o$ into $R_i^o$. We will assume this for the balance of this document, although this crosstalk could be dealt with in a fashion similar to self-NEXT and self-FEXT.

1.4 Capacity and performance margin

The Channel capacity C is defined as the maximum number of bits per second that can be transmitted over a channel with an arbitrarily small bit error probability. The achievable rate $R_A$ for a channel is any transmission rate below or equal to capacity, i.e., $R_A \leq C$. Another channel performance metric is performance margin (or margin). It is defined (in dB) as $$margin = 10 \log_{10}\left(\frac{SNR_{rec}}{SNR_{min}}\right)$$

where $SNR_{rec}$ is the received signal-to-noise ratio (SNR) and $SNR_{min}$ is the minimum received SNR required to achieve a fixed bit error probability (BER) at a given transmission rate. The performance margin of a channel for a fixed bit error probability measures the maximum degradation (from noise and interference) in achievable bit rate that a channel can sustain before being unable to transmit at that bit rate for a fixed BER (see [12]). The higher the performance margin of a channel at a given transmission rate and fixed BER, the more robust it is to noise and interference, i.e., the better is its performance.

2 Problem Statement

2.1 General statement

Given an arbitrary communications channel with:

1. Self-interference (self-NEXT and self-FEXT) between users of service A,
2. Interference from users of different services with users of service A (DSIN-NEXT and DSIN-FEXT),
3. Interference from users of service A into users of different services (DSOUT-NEXT and DSOUT-FEXT), and
4. Other interference (including noise), maximize the capacity of each user of service A without significant performance (capacity or margin) degradation of the other services.

Here services could refer to different possible signaling schemes. Users refer to the generic Tx-Rx pairs.

2.2 Particular statement for DSLs

2.2.1 HDSL2 service

As a special case of the general problem, we will look into a particular problem of subscriber loops. In particular, we can phrase our statement in the language of HDSL2 [2]. Here, the communication channel is the collection of twisted pairs in the telephone cable, interference is caused by:

1. Self-NEXT and self-FEXT between neighboring HDSL2 lines (self-NEXT dominates over self-FEXT [8]),
2. DSIN-NEXT and DSIN-FEXT from T1, ISDN, HDSL and ADSL,
3. Interference from HDSL2 into other services, such as T1, ISDN, HDSL and ADSL, and
4. Channel noise, which we will model as AGN.

We wish to maximize the capacity of the HDSL2 service in presence of other HDSL2, T1, ISDN, HDSL, ADSL, VDSL lines and even services not yet imagined while maintaining spectral compatibility with them. We will consider HDSL2 service in Sections 4.4 to 4.7.

The HDSL2 service is intended to fill a key need for fast (1.544 Mbps) yet affordable full duplex service over a single twisted pair. Efforts to define the standard are being mounted by several companies and the T1E1 standards committee. The two key issues facing HDSL2 standards committee are:

Spectral optimization. All previously proposed schemes for HDSL2 achieve the required data rates with satisfactory margins only in complete isolation.

However, due to the proximity of the lines in a cable, there is considerable DSINNEXT, DSIN-FEXT, self-NEXT and self-FEXT interference from T1, ISDN, HDSL, ADSL and HDSL2 into HDSL2—this interference reduces the capacity of the HDSL2 service. Simultaneously, there is considerable DSOUT-NEXT and DSOUT-FEXT interference from HDSL2 into T1, ISDN, HDSL and ADSL. This problem is known as spectral compatibility. The scheme ultimately adopted for HDSL2 must not interfere overly with other DSL services like T1, ISDN, HDSL, and ADSL. Modulation scheme. No prior system has been developed that systematically optimizes the HDSL2 spectrum and reduces interference effects both from and into HDSL2. Further, a modulation scheme for HDSL2 has not been decided upon at this time.

2.2.2 "GDSL" service

Consider the hypothetical DSL service "GDSL" described above. The "GDSL" service will enable very high bit-rate full-duplex, symmetric traffic over a single twisted pair. We assume that the lines carrying GDSL service have good shielding against self-NEXT. In this case, interference is caused by:

1. Self-NEXT and self-FEXT between neighboring "GDSL" lines (self-FEXT dominates over self-NEXT),
2. DSIN-NEXT and DSIN-FEXT from T1, ISDN, HDSL, HDSL2 and ADSL,
3. Interference from "GDSL" into other services, such as T1, ISDN, HDSL, HDSL2 and ADSL, and
4. Channel noise, which we will model as AGN.

We wish to maximize the capacity of the "GDSL" service in presence of other "GDSL", T1, ISDN, HDSL, ADSL, HDSL2 lines and even services not yet imagined while maintaining spectral compatibility with them. The spectral optimization issue is similar to the one discussed for HDSL2 case, and we need to find an optimal transmit spectrum for "GDSL". Further, a good modulation scheme needs to be selected.

2.2.3 "VDSL2" service

Consider the hypothetical DSL service "VDSL2" described above. Optical fiber lines having very high channel capacity and virtually no crosstalk will be installed in the future up to the curb of each neighborhood (FTTC). The final few thousand feet up to the customer premises could be covered by twisted pairs. In such a scenario, high bit-rate asymmetric-traffic services (like VDSL) and symmetric-traffic services (like "VDSL2") over short length twisted pairs would become important. For illustration of such a potential future service we propose a hypothetical "VDSL2" service that would carry very high bit-rate symmetric traffic over short distance loops on a single twisted pair. In the "VDSL2" case, the interference will be caused by:

1. Self-NEXT and self-FEXT between neighboring "VDSL2" lines (both self-NEXT and self-FEXT are dominant), 2. DSIN-NEXT and DSIN-FEXT from T1, ISDN, HDSL, HDSL2, VDSL and ADSL, 3. Interference from "VDSL2" into other services, such as T1, ISDN, HDSL, HDSL2, VDSL and ADSL, and 4. Channel noise, which we will model as AGN.

Again, we wish to maximize the capacity of "VDSL2" in presence of all the other interferers. To achieve this we need to find optimal transmit spectra and a good modulation scheme.

3 Previous Work

Here we discuss prior work pertaining to HDSL2 service.

3.1 Static PSD masks and transmit spectra

The distribution of signal energy over frequency is known as the power spectral density (PSD). A PSD mask defines the maximum allowable PSD for a service in presence of any interference combination. The transmit spectrum for a service refers to the PSD of the transmitted signal. Attempts have been made by several groups to come up with PSD masks for HDSL2 that are robust to both self-interference and interference from other lines. One way of evaluating channel performance is by fixing the bit rate and measuring the performance margins [12]: The higher the performance margin for a given disturber combination, the more robust the HDSL2 service to that interference. The term crosstalk here implies self-interference plus interference from other lines.

To the best of our knowledge, no one has optimized the PSD of HDSL2 lines in presence of crosstalk and AGN. The significant contributions in this area, MONET-PAM and OPTIS, [1, 2, 4, 5] suggest a static asymmetrical (in input power) PSD mask in order to attempt to suppress different interferers. The PSD masks suggested in [1, 2, 4, 5] have a different mask for each direction of transmission. Furthermore, the techniques in [1, 4] use different upstream and downstream average powers for signal transmission. However, the mask is static, implying it does not change for differing combinations of interferers.

Optis [5] is currently the performance standard for HDSL2 service.

When a constraining PSD mask is imposed, the transmit spectrum lies below the constraining mask. Specifying a constraining PSD mask only limits the peak transmit spectrum. We do PSDs (transmit spectra) and not masks in this document unless stated otherwise. In Section 4.11 we indicate ideas to get PSD masks.

3.2 Joint signaling techniques

Self-NEXT is the dominant self-interference component in symmetric-data-rate, full-duplex, long-length line xDSL service (e.g., HDSL2). One simple way of completely suppressing self-NEXT is to use orthogonal signaling (for example, time division signaling (TDS), frequency division signaling (FDS), or code division signaling (CDS)). In TDS, we assign different services to different time slots. In FDS, we separate in frequency the services that could interfere with each other. In CDS, a unique code or signature is used in each direction of service. Further, in CDS each service occupies the entire available bandwidth for all of the time. CDS is similar to code division multiple access (CDMA), but here instead of providing multiple access, CDS separates the upstream and downstream transmit spectra using different codes.

The choice of orthogonal signaling scheme depends on the intent. We will see that FDS is in a sense optimal under an average power constraint (see Section 4.5.12).

To eliminate self-NEXT using FDS, we would force the upstream transmitters $\{T_i^u, i=1, \ldots, M\}$, and the downstream transmitters $\{T_i^d, i=1, \ldots, M\}$ to use disjoint frequency bands. Thus, in FDS signaling, the upstream and downstream transmissions are orthogonal and hence can be easily separated by the corresponding receivers. Since in a typical system FDS cuts the bandwidth available to each transmitter to ½ the overall channel bandwidth, we have an engineering tradeoff: FDS eliminates self-NEXT and therefore increases system capacity; however, FDS also reduces the bandwidth available to each transmitter/receiver pair and therefore decreases system capacity. When self-NEXT is not severe enough to warrant FDS, both upstream and downstream transmitters occupy the entire bandwidth. In this case, the upstream and downstream directions have the same transmit spectrum; we refer to this as equal PSD (EQPSD) signaling.

On a typical telephone channel, the severity of self-NEXT varies with frequency. Therefore, to maximize capacity, we may wish to switch between FDS and EQPSD depending on the severity of self-NEXT. Such a joint signaling strategy for optimizing the performance in the presence of self-NEXT and white AGN was introduced in [3].

The scheme in [3] is optimized, but only for an over simplified scenario (and therefore not useful in practice). In particular, [3] does not address self-FEXT and interference from other lines as considered in this work. Further, [3] does not address spectral compatibility issue.

All other schemes for joint signaling employ ad-hoc techniques for interference suppression [1, 2, 4, 5].

3.3 Multitone modulation

Multicarrier or discrete multitone (DMT) modulation [6] can be readily used to implement a communication system using a wide variety of PSDs. Multitone modulation modulates data over multiple carriers and adjusts the bit rate carried over each carrier according to the signal to noise ratio (SNR) for that carrier so as to achieve equal bit error probability (BER) for each carrier (see in FIG. 4).

Orthogonal FDS signaling is easily implemented using the DMT: we simply assign transmitter/receiver pairs to distinct sets of carriers. Note, however, that multitone modulation is definitely not the only modulation scheme that can be used to implement (optimal) transmit spectra. We can just as well use other techniques, such as CAP, QAM, multi-level PAM, etc.

3.4 Summary of previous work

The current state of the art of DSL technology in general and HDSL2 in particular can be described as follows:

Ad-hoc schemes (sometimes referred to as "optimized") have been developed that attempt to deal with self-interference and DSIN-NEXT and DSIN-FEXT as well as spectral compatibility of the designed service with other services. However, these schemes by no means optimize the capacity of the services considered.

An optimal signaling scheme has been developed in [3] for the case of self-NEXT and white additive Gaussian noise only. The development of [3] does not address crosstalk from other sources, such as DSIN-NEXT and DSIN-FEXT, or self-FEXT, or other types of additive Gaussian noise. The development of [3] also does not address spectral compatibility of the designed service with respect to other services.

SUMMARY OF THE INVENTION

Described herein are a method and a system for determining a transmit spectrum for use in communicating data on a communications channel. In one embodiment, the method is used in communicating data when the channel is subject to interference from one or more other communications channels, some of which may carry the same type of service as the communications channel under consideration. The first steps in this method comprise determining a channel transfer function of the communications channel and interference characteristics of the communications channel.

The interference characteristics may include an amount of self interference into the communications channel from the other communications channels that carry the same type of service. The amount of self interference preferably includes near-end cross talk (self-NEXT) and far-end cross talk (self-FEXT) from the other same-service channels. The self-NEXT and self-FEXT are preferably characterized by transfer functions that describe the coupling from the other same-service channels into the communications channel.

The interference characteristics also preferably include an amount of uncorrelated interference. Some of the uncorrelated interference may be cross talk from other communications channels that carry a different type of service. This type of cross talk is also called different-service interference (DSIN). The uncorrelated interference may also originate in other sources. Some examples include noise interference such as additive Gaussian noise (AGN), "white" noise, and "non-white" noise.

After determining the channel transfer function and the interference characteristics, the channel transfer function and the interference characteristics are examined, and a transmit spectrum for the channel is determined based on the examining. The transfer function and the interference characteristics may be determined by measurement or they may be received from a remote or local analyzer or memory storage. The transmit spectrum is preferably determined so that it has one or more portions in which the channel is orthogonally separated (using multi-line FDS or multi-line CDS or other orthogonal signaling techniques) from other channels carrying the same type of service. The orthogonal separation is preferably used in spectral regions where it provides heightened channel capacity by substantially eliminating self-FEXT and self-NEXT interference. It is preferably not used where its associated reduction in bandwidth causes an overall reduction in channel capacity. In these spectral regions, other signaling techniques, such as EQPSD or FDS, are preferably used.

The channel transfer function and the interference characteristics are preferably re-evaluated at appropriate times, and the transmit spectrum is then recalculated in response to the new channel transfer function and interference characteristics. The reevaluation may occur periodically, in response to power cycling, in response to changes in the operating environment of the communications channel, or at other intervals.

In one embodiment, the transmit spectrum is constructed of a set of frequency bins, each of which uses either EQPSD, FDS, or multi-line FDS (MFDS) signaling. Numerous arrangements of the FDS and MFDS bins are possible, including groupings that lead to "discrete" and "contiguous" transmit spectra. In a discrete FDS transmit spectrum, the FDS frequency bins are grouped so that their upstream and downstream sub-bins alternate. In a contiguous FDS transmit spectrum, the upstream and downstream sub-bins are grouped into an upstream frequency band and a downstream frequency band. Similarly, in a discrete MFDS transmit spectrum, the MFDS frequency bins are grouped so that their sub-bins are arranged in groups that have one sub-bin for each of the same-service channels. In a contiguous MFDS transmit spectrum, the sub-bins are grouped into several frequency bands, with each band carrying service for one of the same-service channels. The contiguous FDS and MFDS transmit spectra are preferably constructed to provide equal upstream and downstream signaling capacities.

If the channel transfer function and the interference characteristics are substantially monotonic over the frequency band of the communications channel, then determining which frequency bins use a particular technique may comprise a binary search for transition bins in which appropriate characteristic quantities cross particular threshold values.

An iterative technique is also presented for situations in which the channel transfer function or the interference characteristics are not monotonic. In another embodiment, the method is useable to construct transmit spectra for joint signaling communication.

BRIEF DESCRIPTION OF THE DRAWINGS

Figure 2:
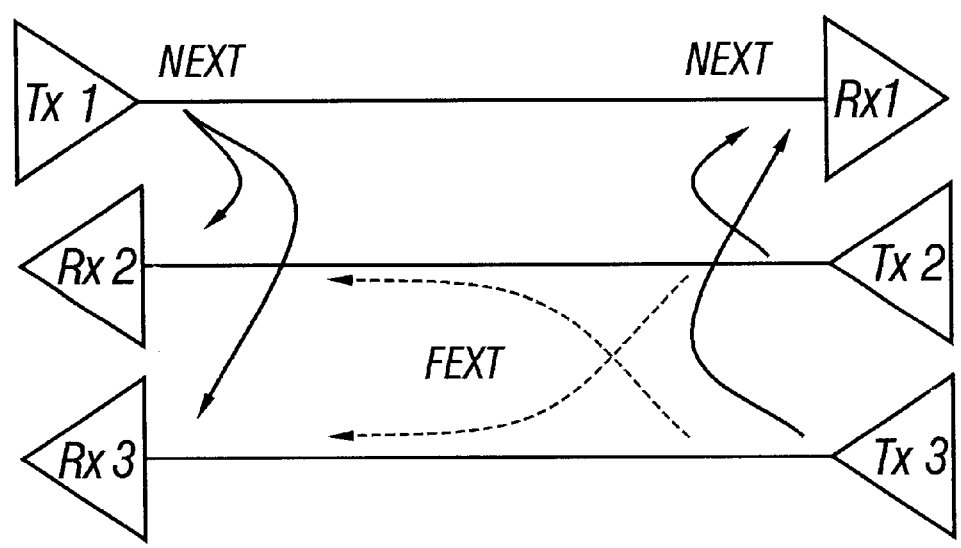
Figure 4:
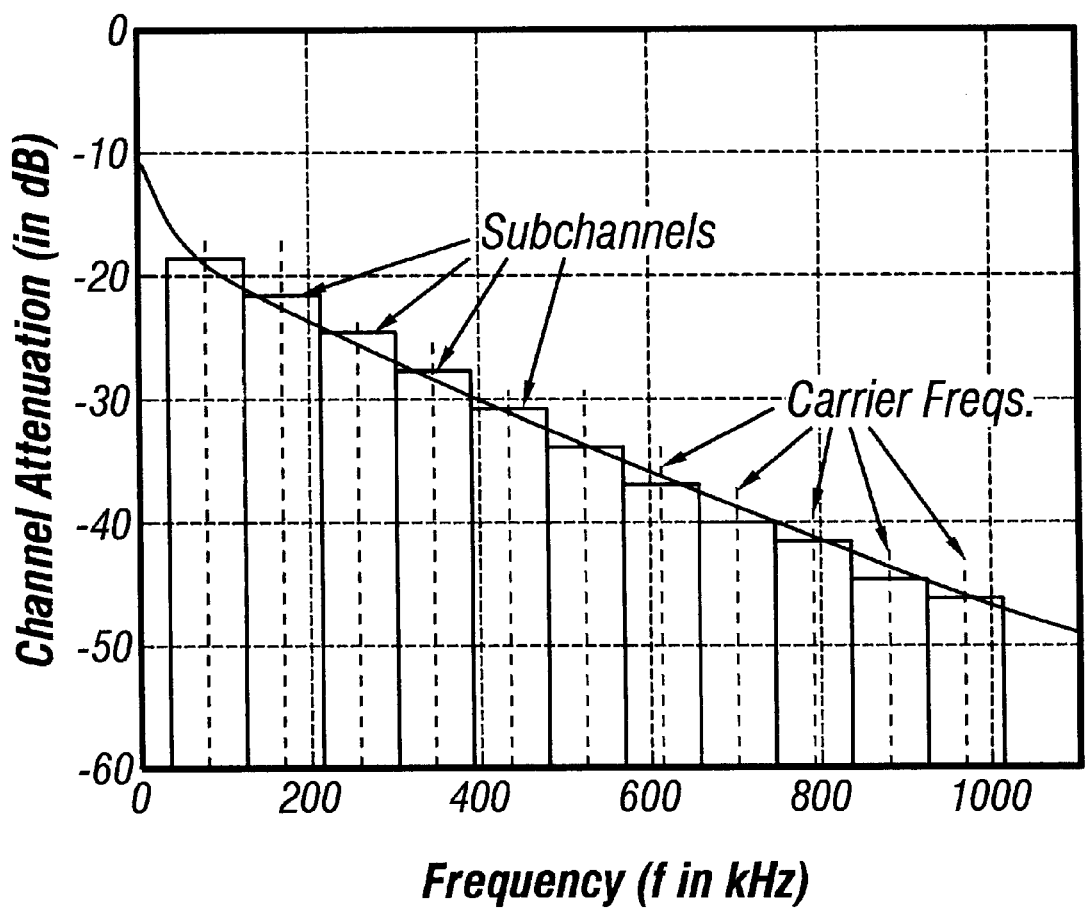
Figure 5:
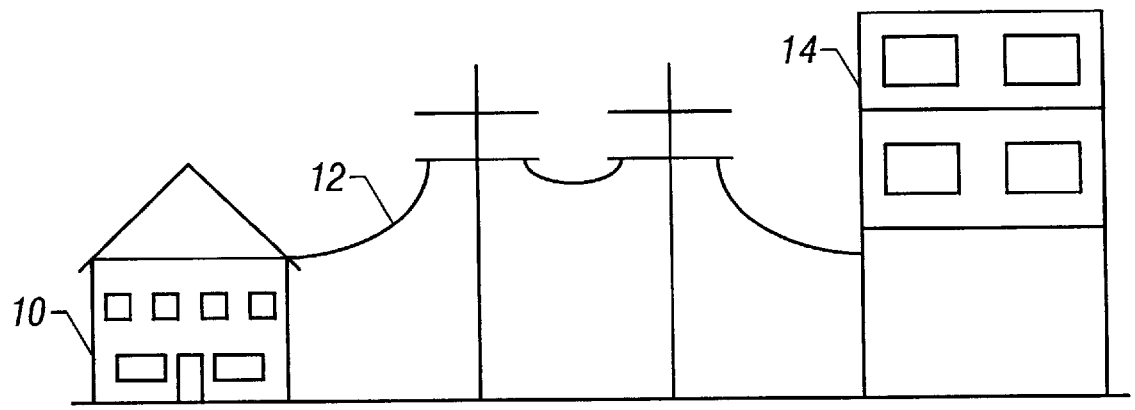
Figure 5A:
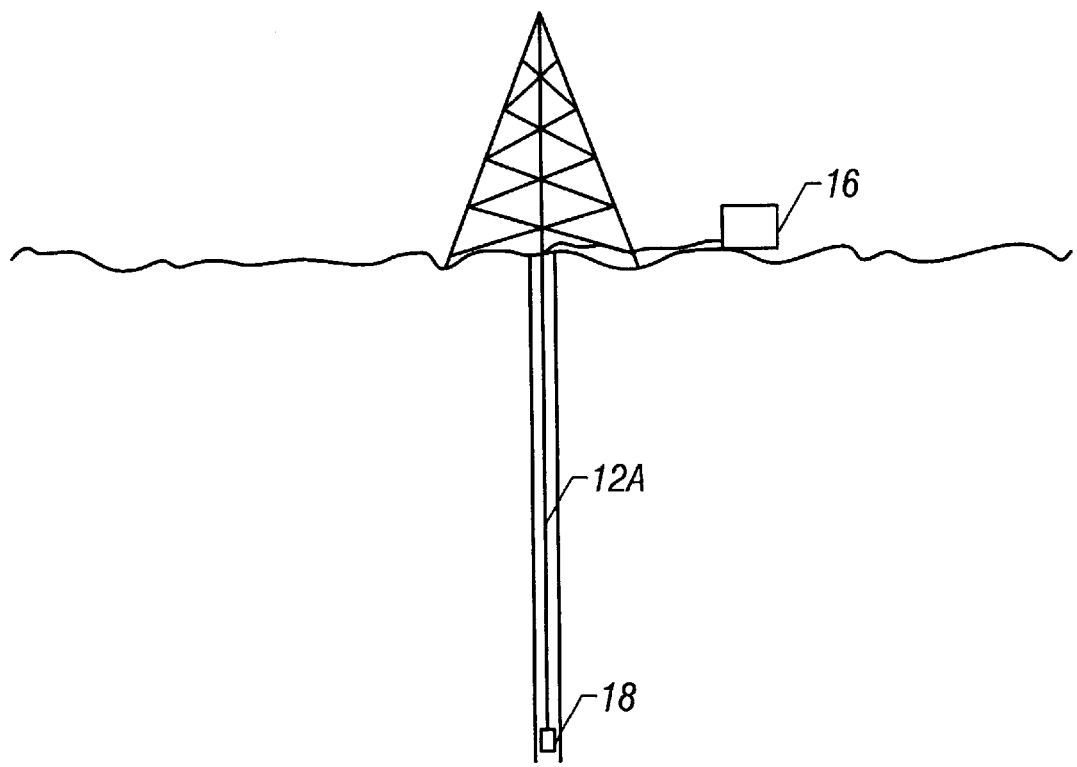
Figure 6:
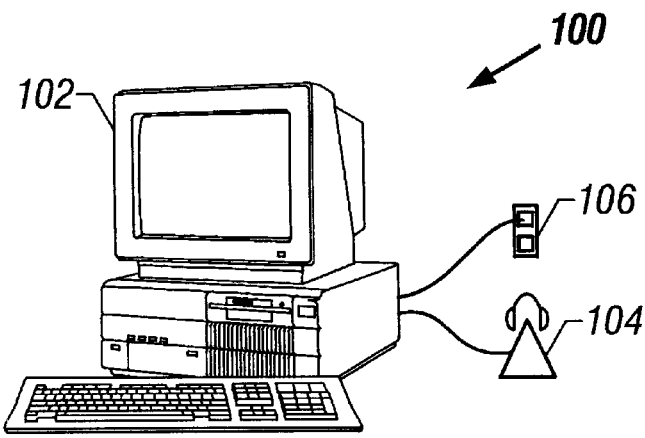
Figure 7:
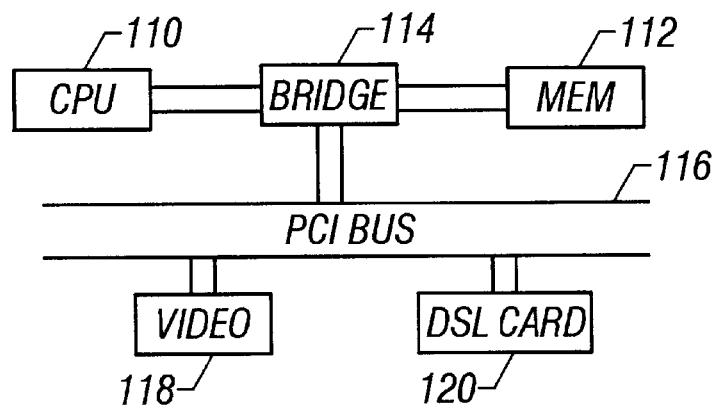
Figure 8:
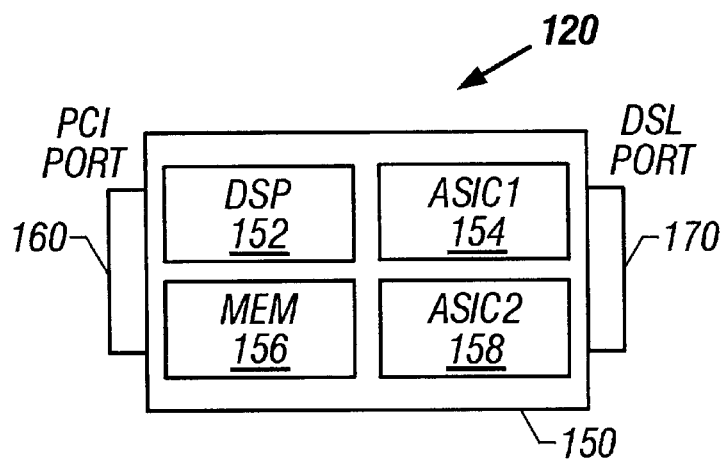
Figure 9:
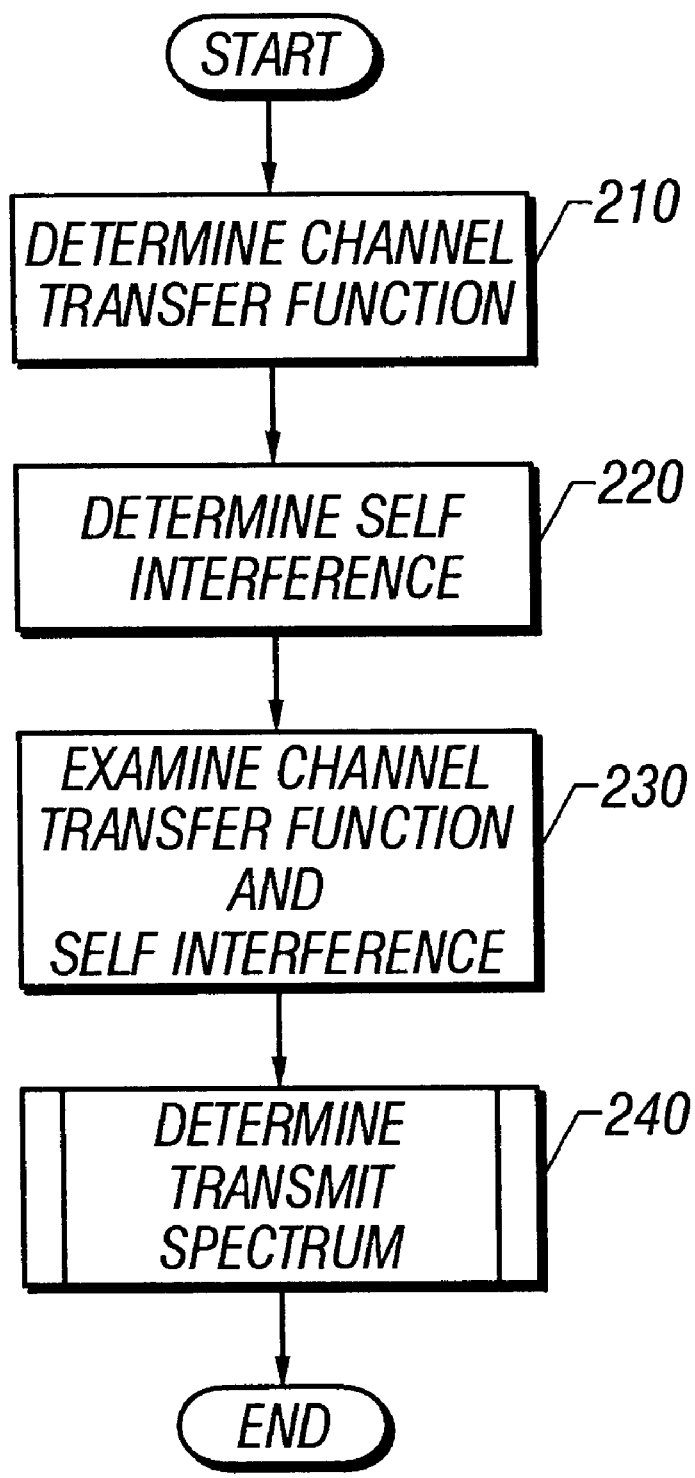
Figure 10:
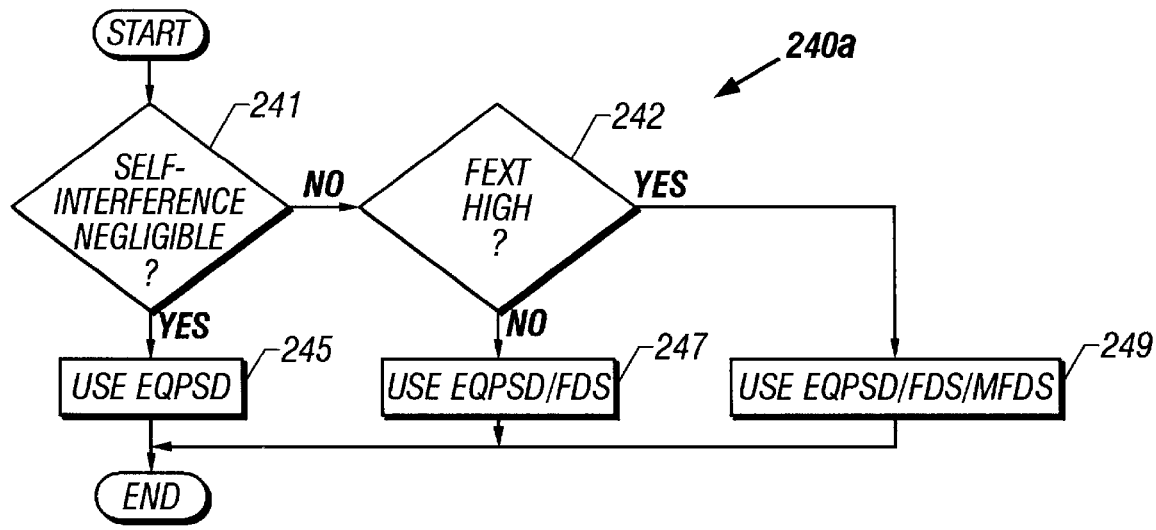
Figure 11:
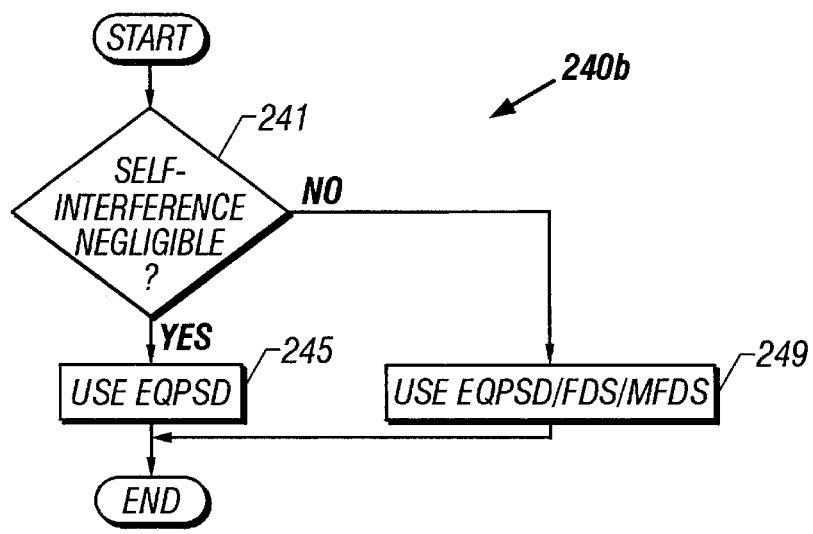
Figure 12:
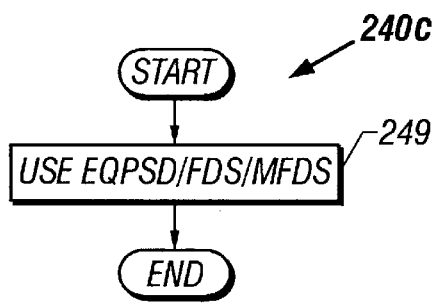
Figure 13:
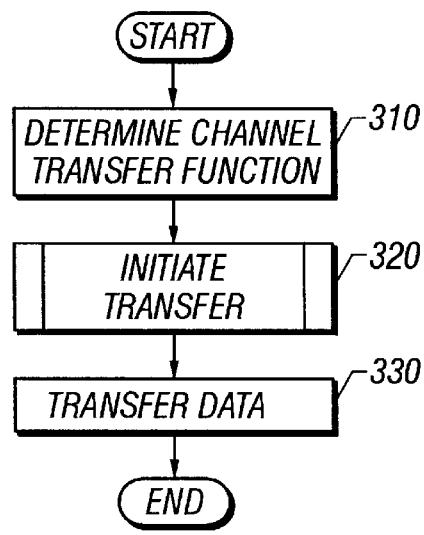
Figure 14:
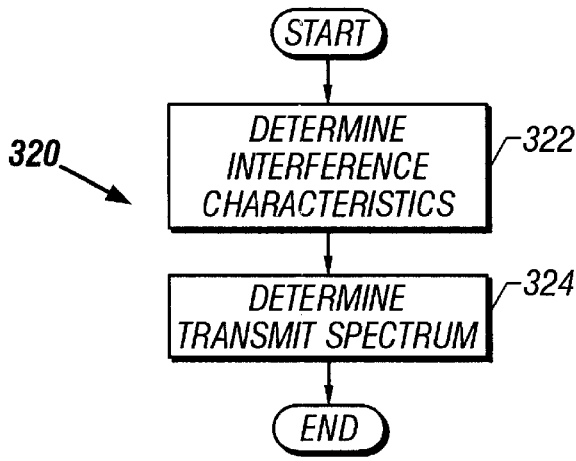
Figure 15:
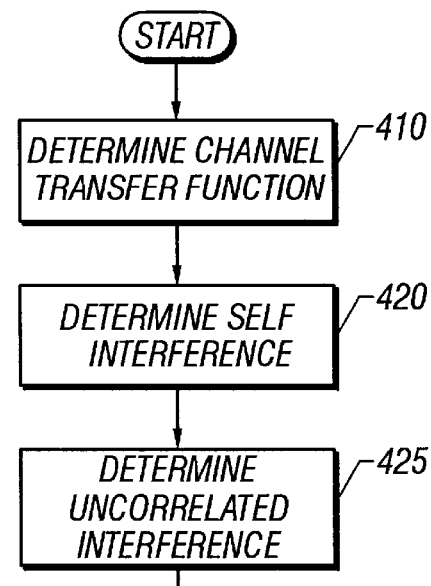
Figure 16:
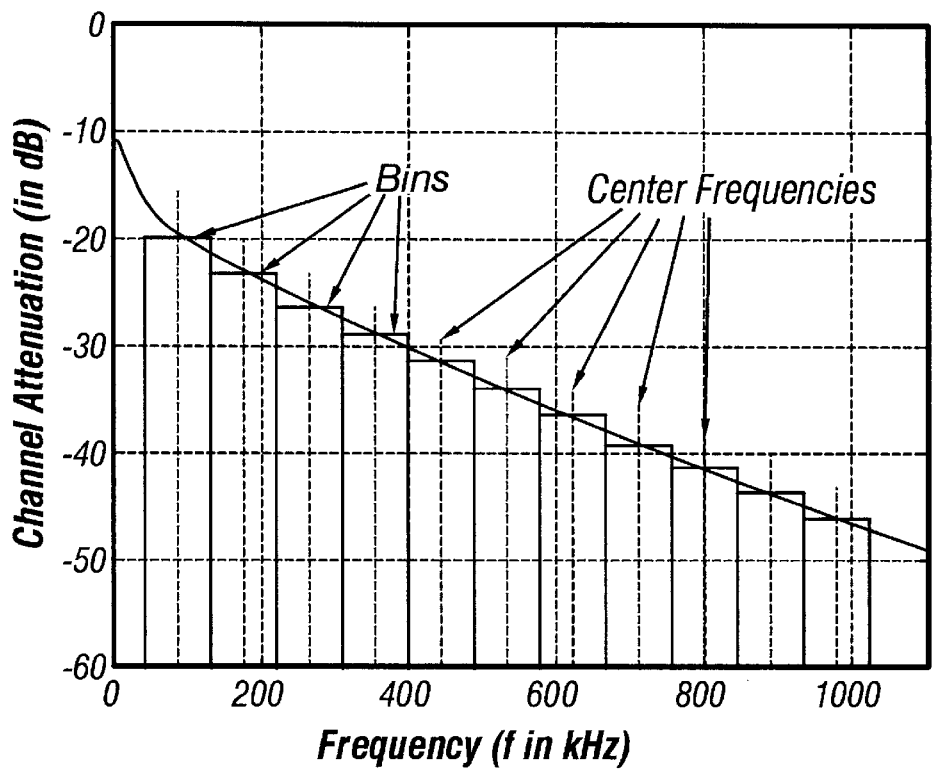
Figure 17:
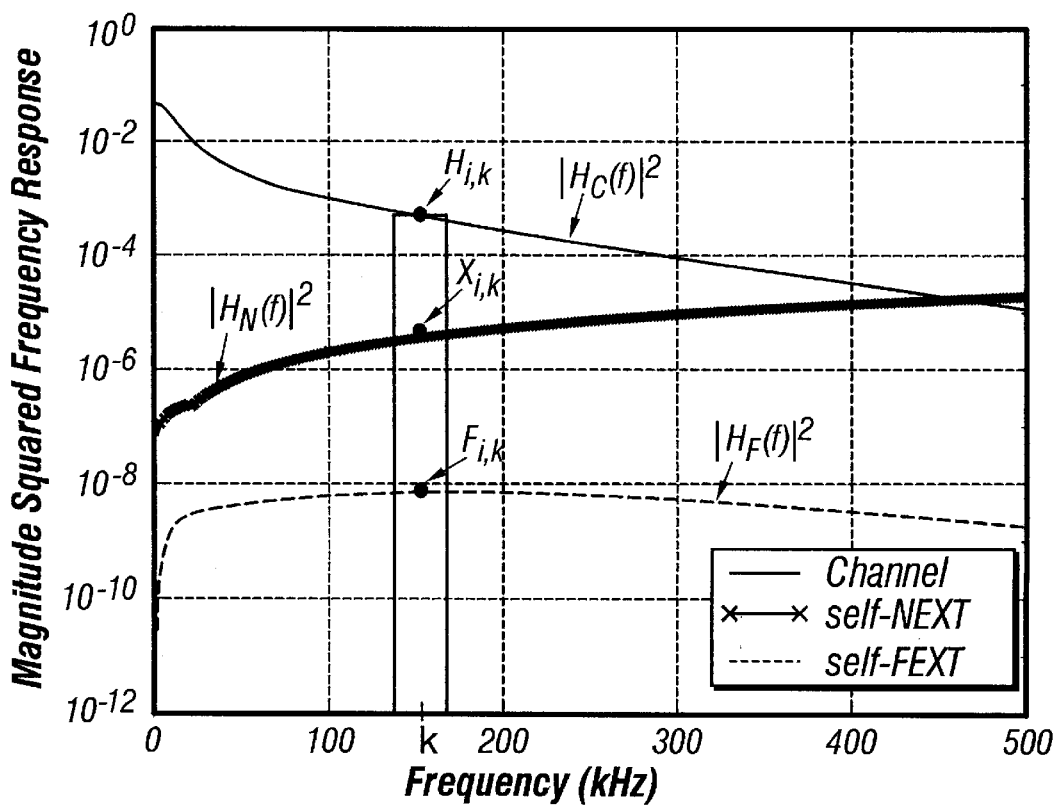
Figure 18A:
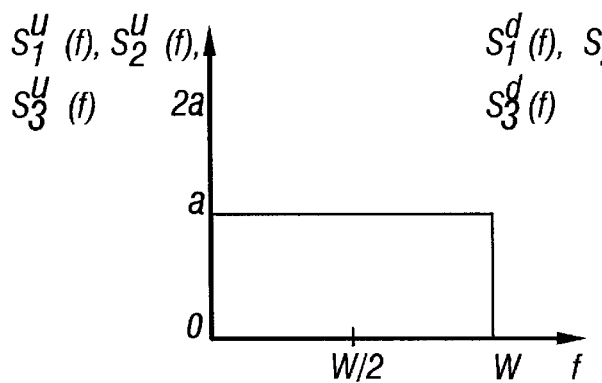
Figure 18B:
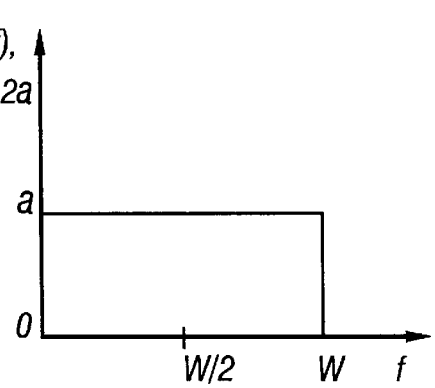
Figure 18C:
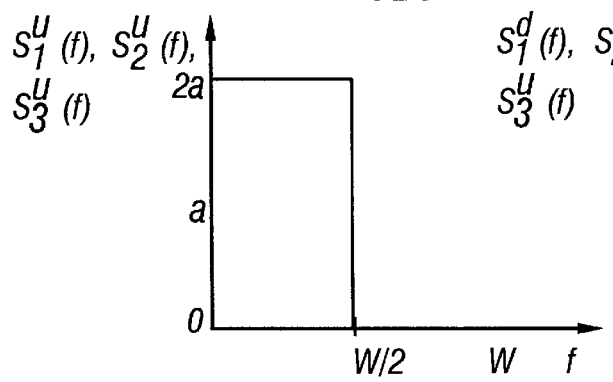
Figure 18D:
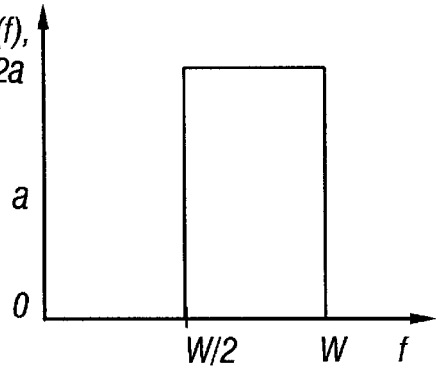
Figure 18E:
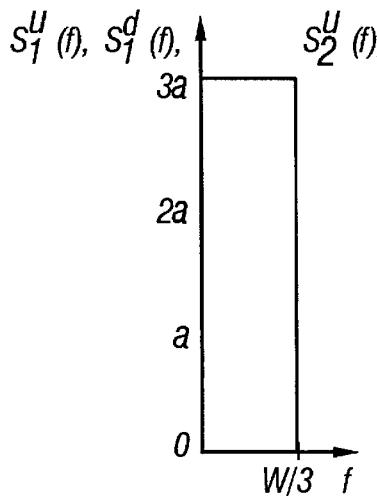
Figure 18F:
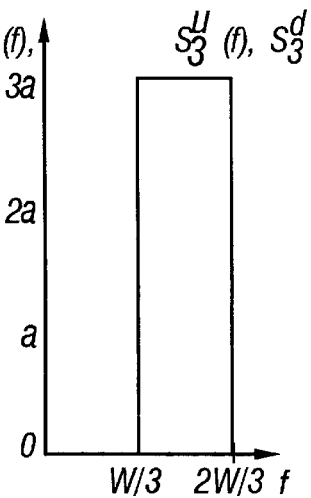
Figure 18G:
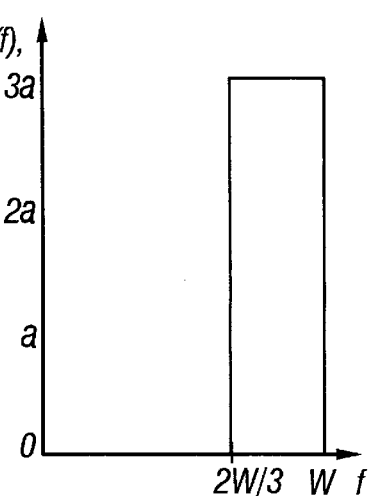
Figure 19:
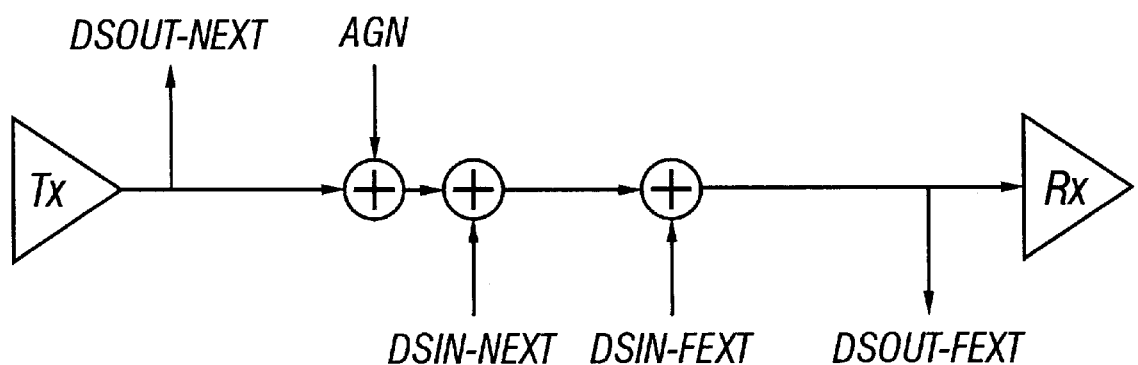
Figure 20:
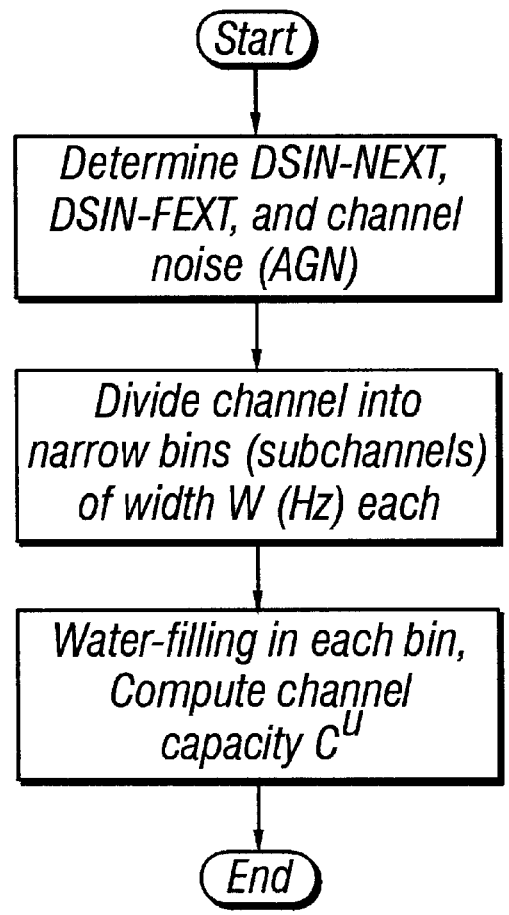
Figure 21:
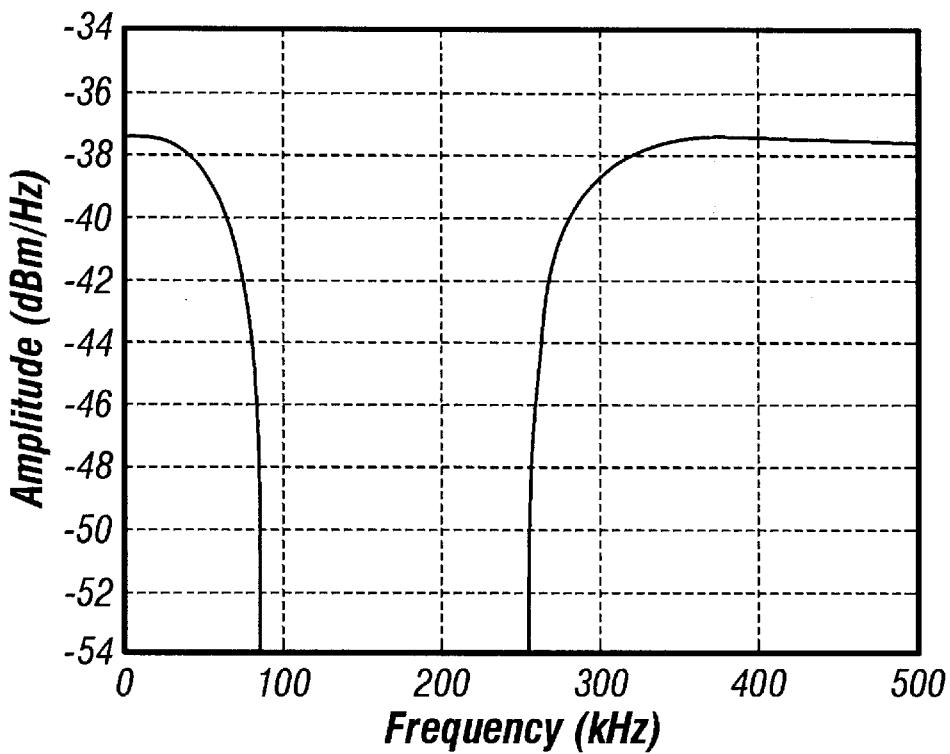
Figure 22:
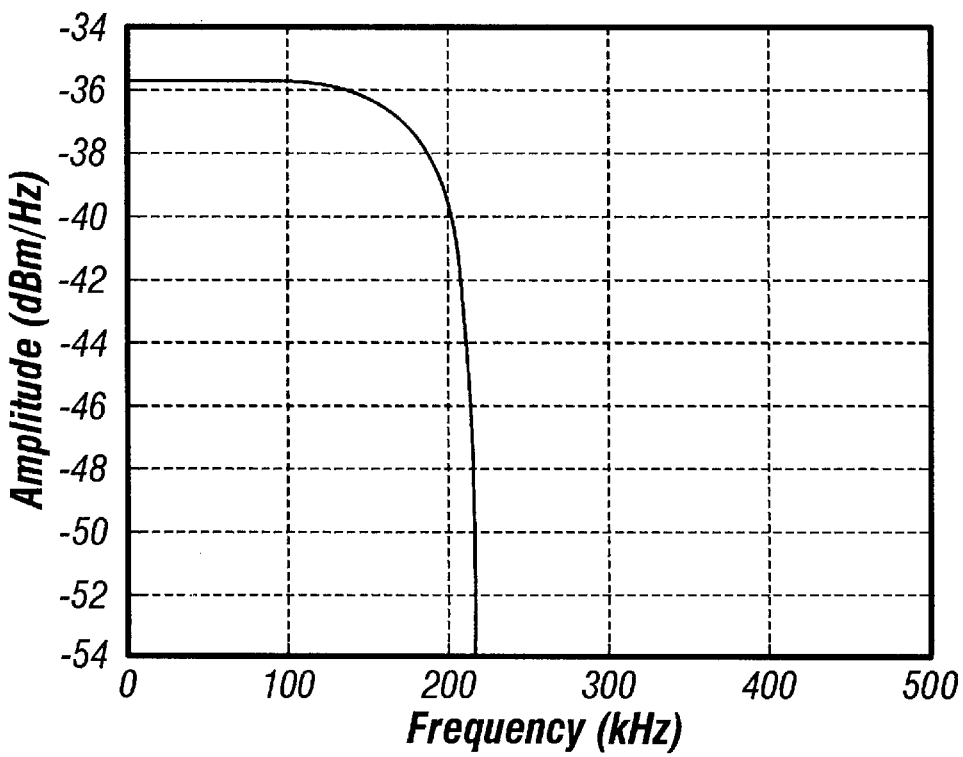
Figure 25A:
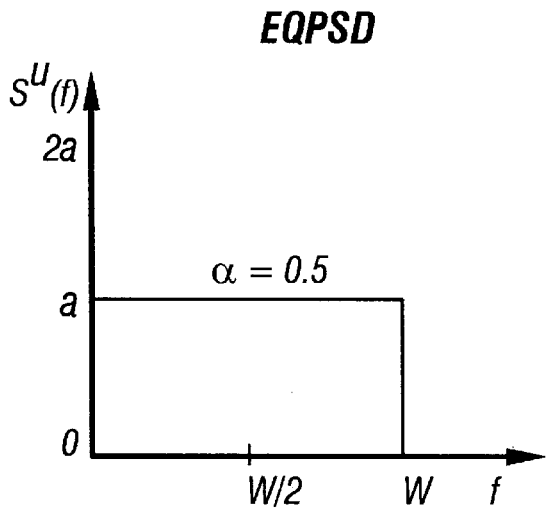
Figure 25B:
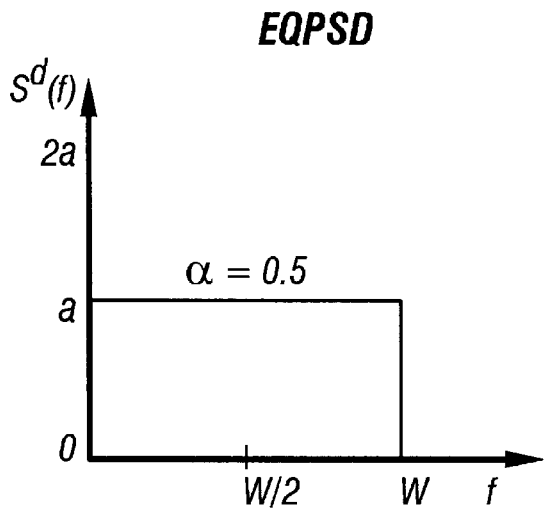
Figure 25C:
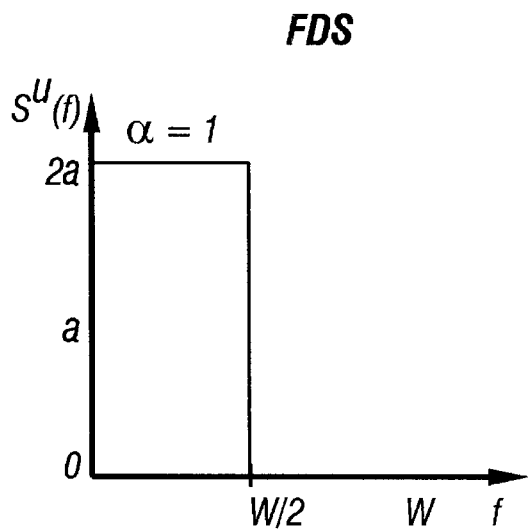
Figure 25D:
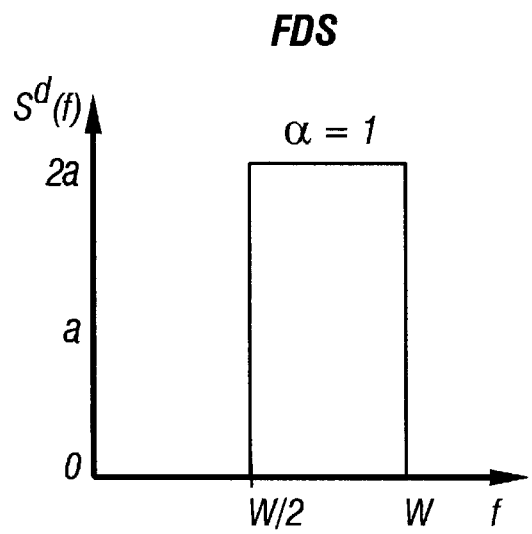
Figure 26A:
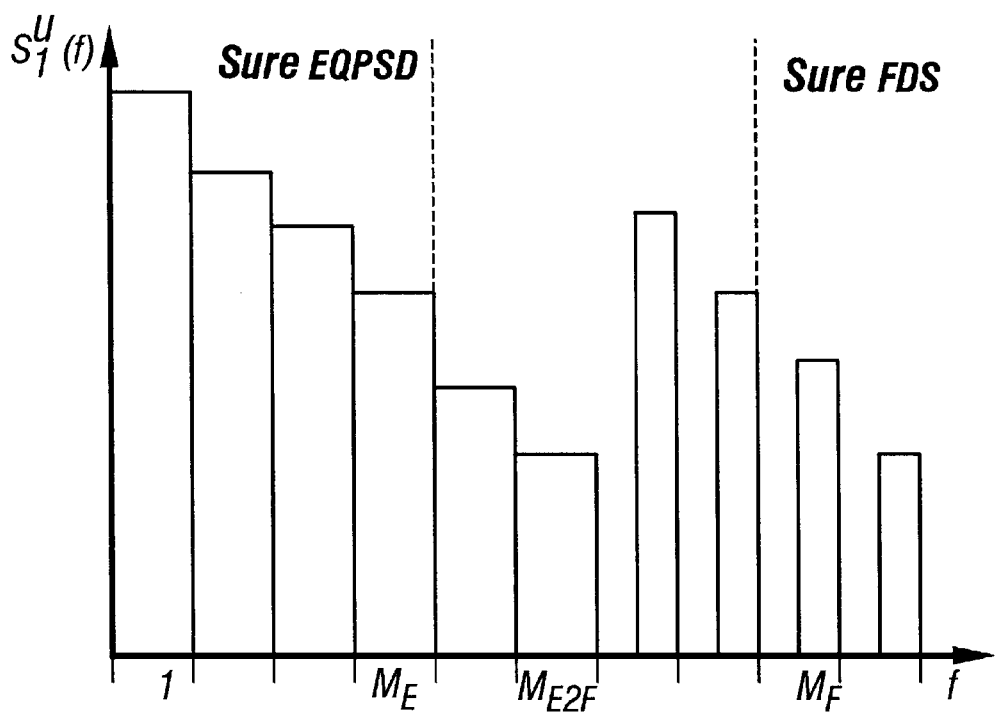
Figure 26B:
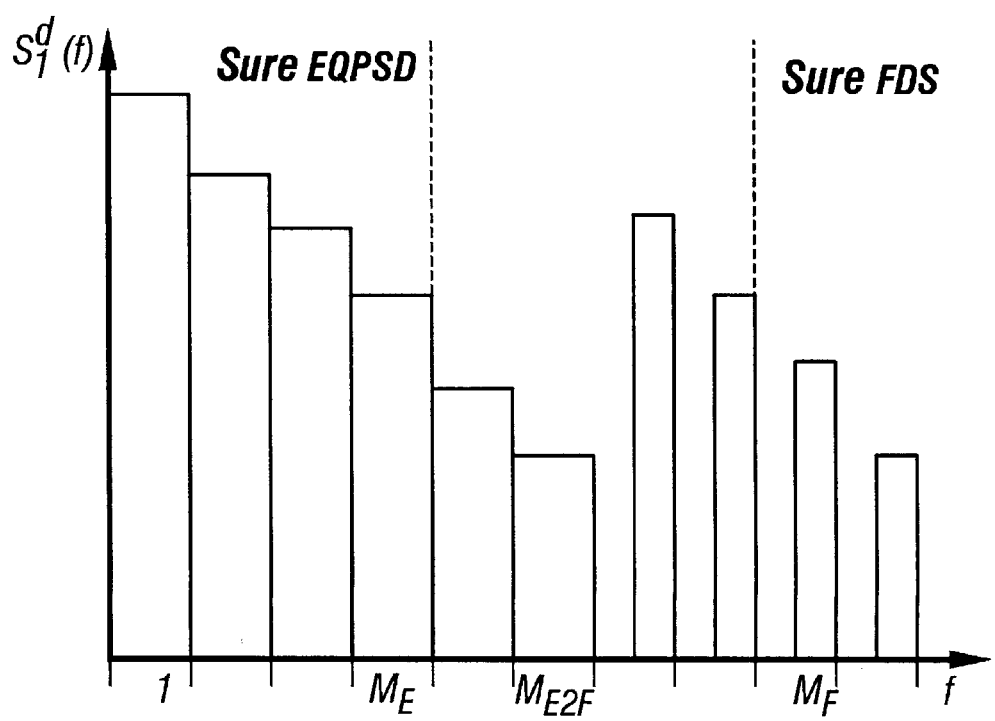
Figure 27:
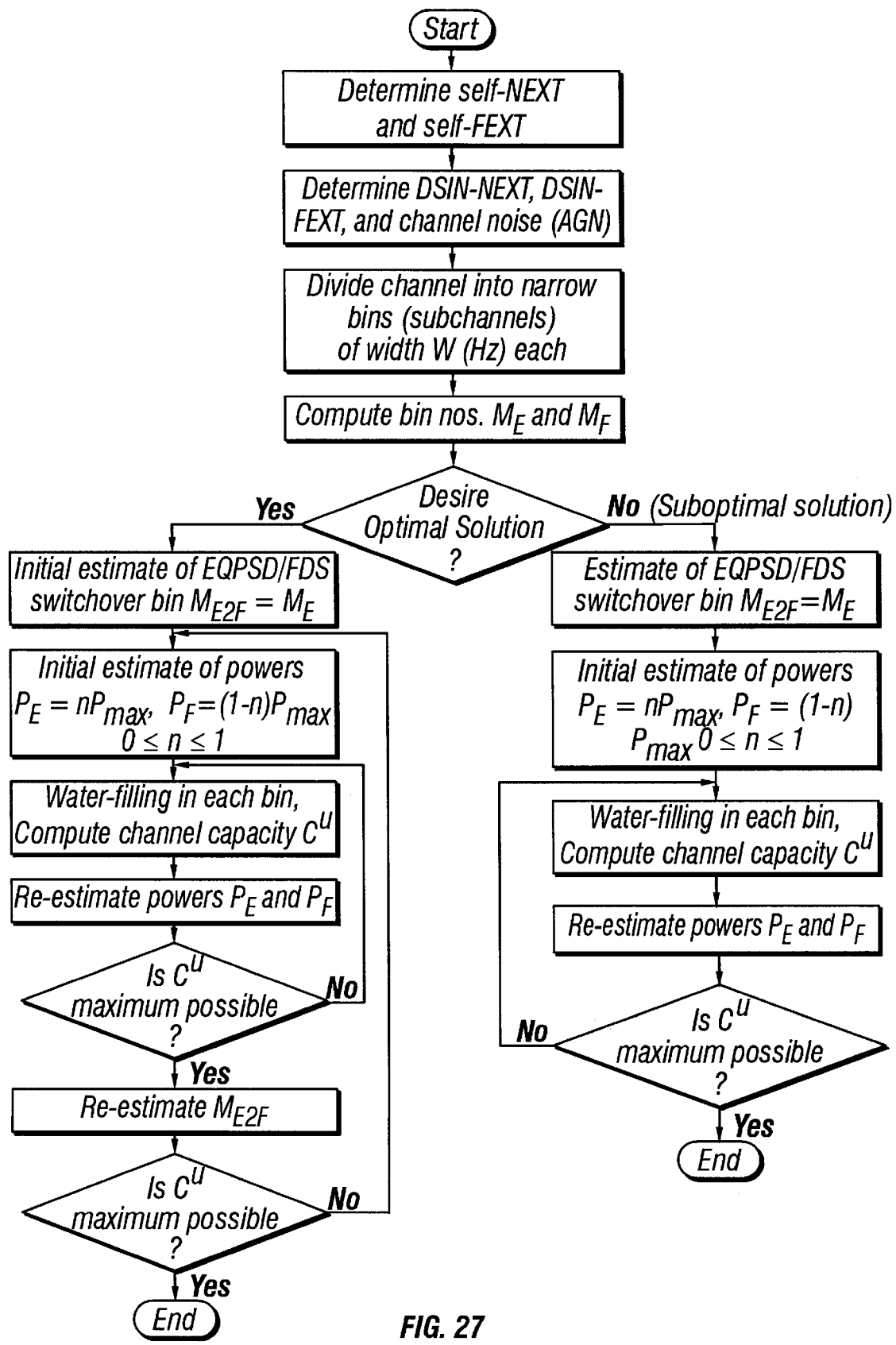
Figure 28A:
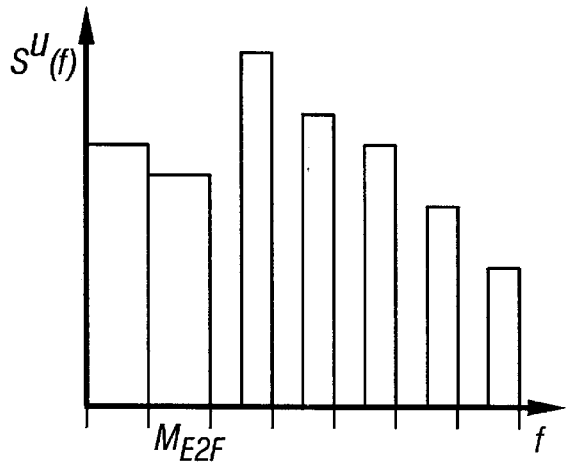
Figure 28B:
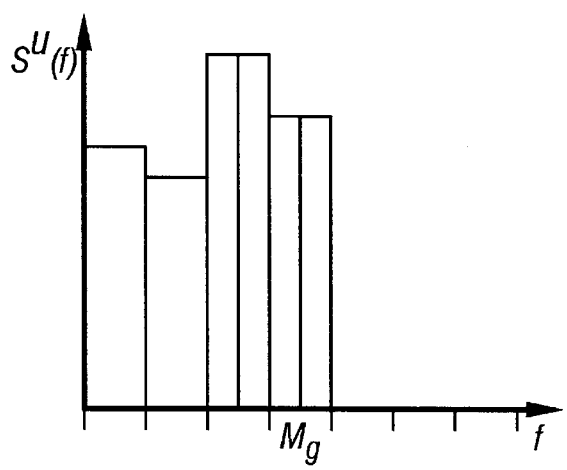
Figure 28C:
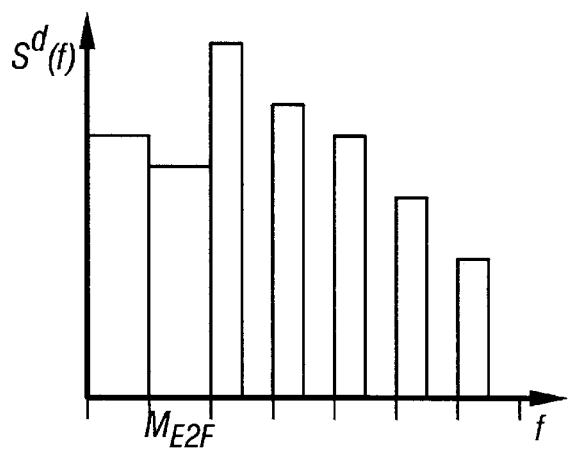
Figure 28D:
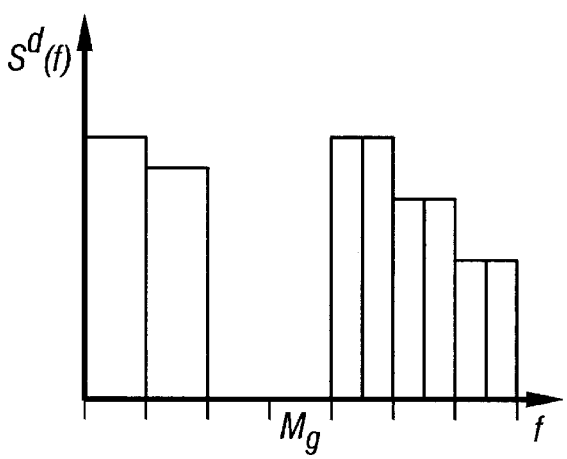
Figure 29:
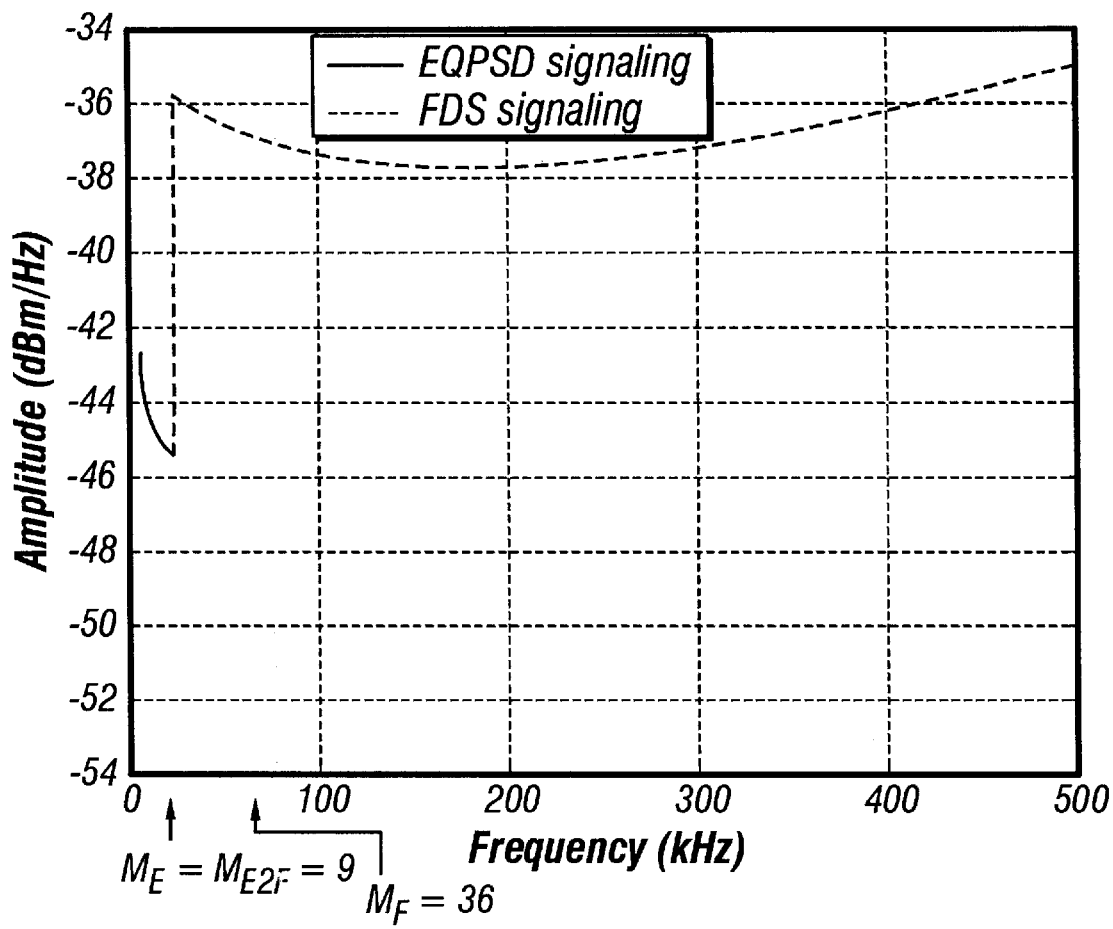
Figure 30A:
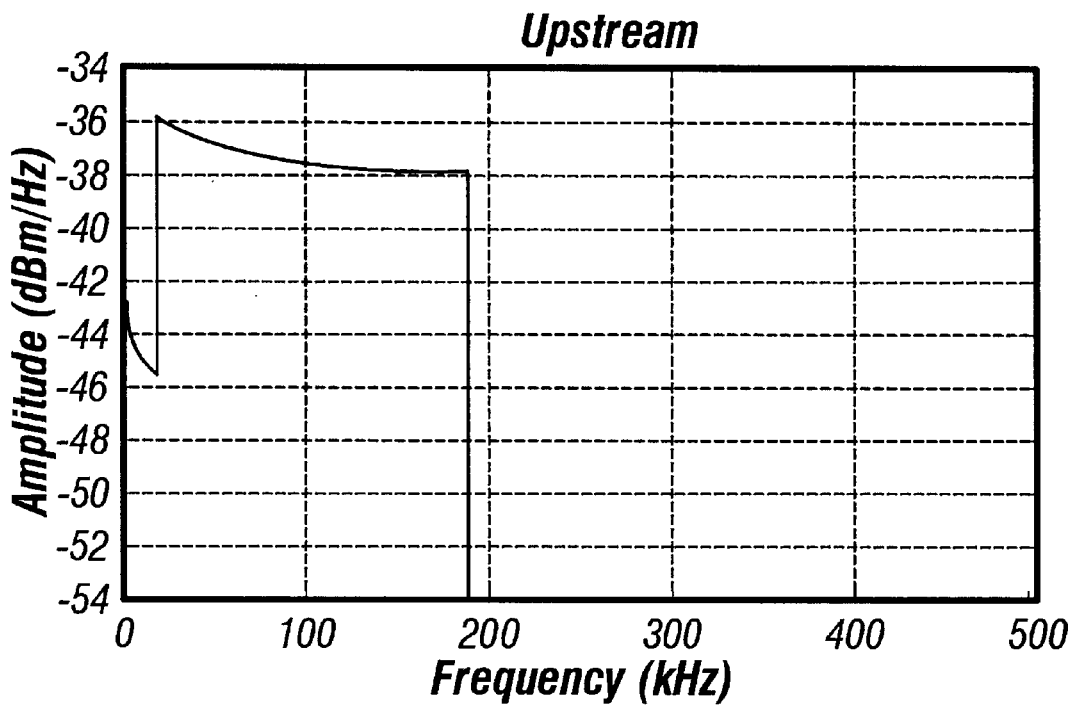
Figure 30B:
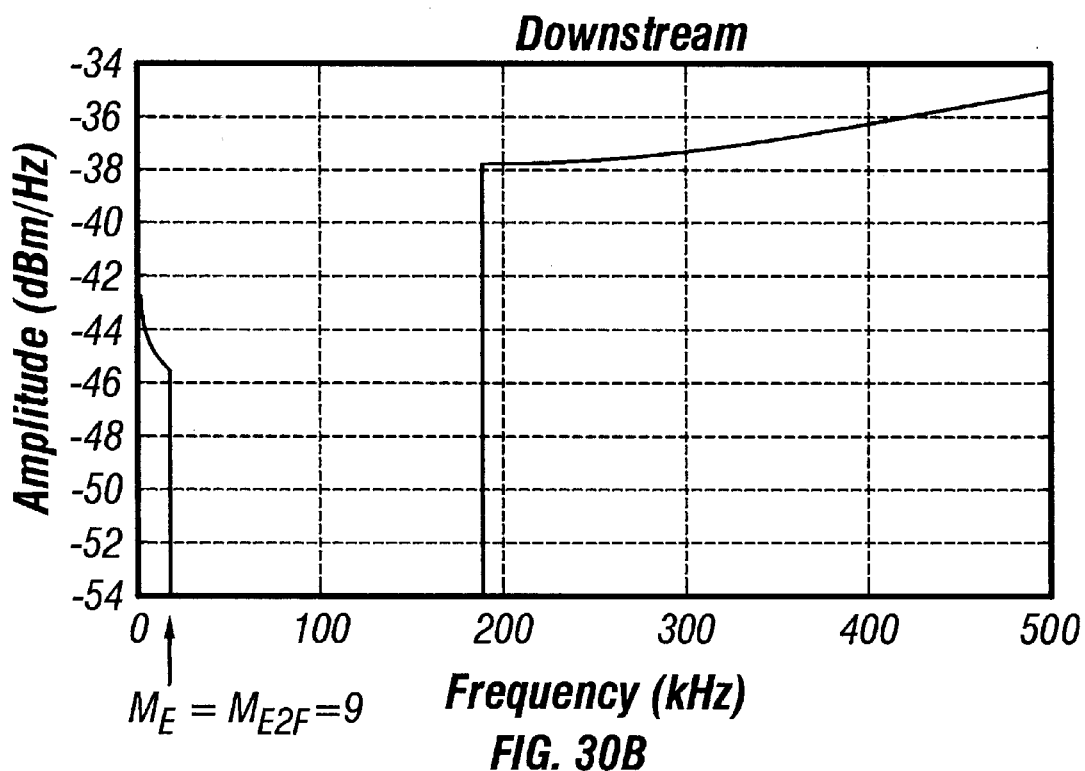
Figure 31A:
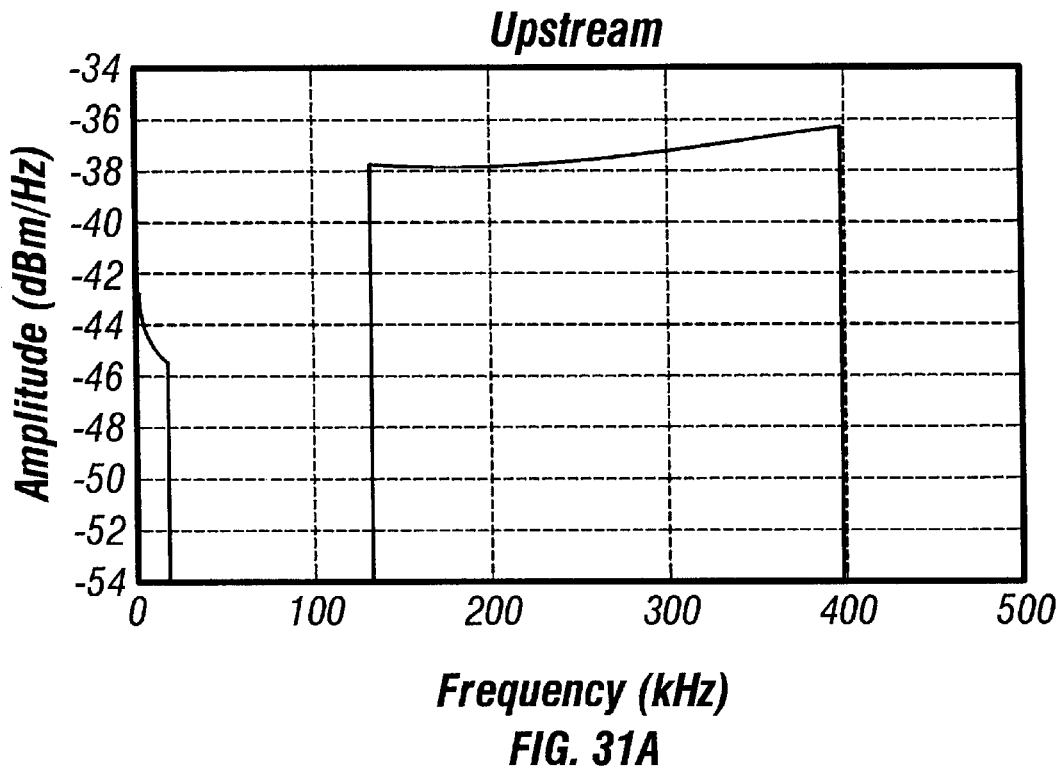
Figure 31B:
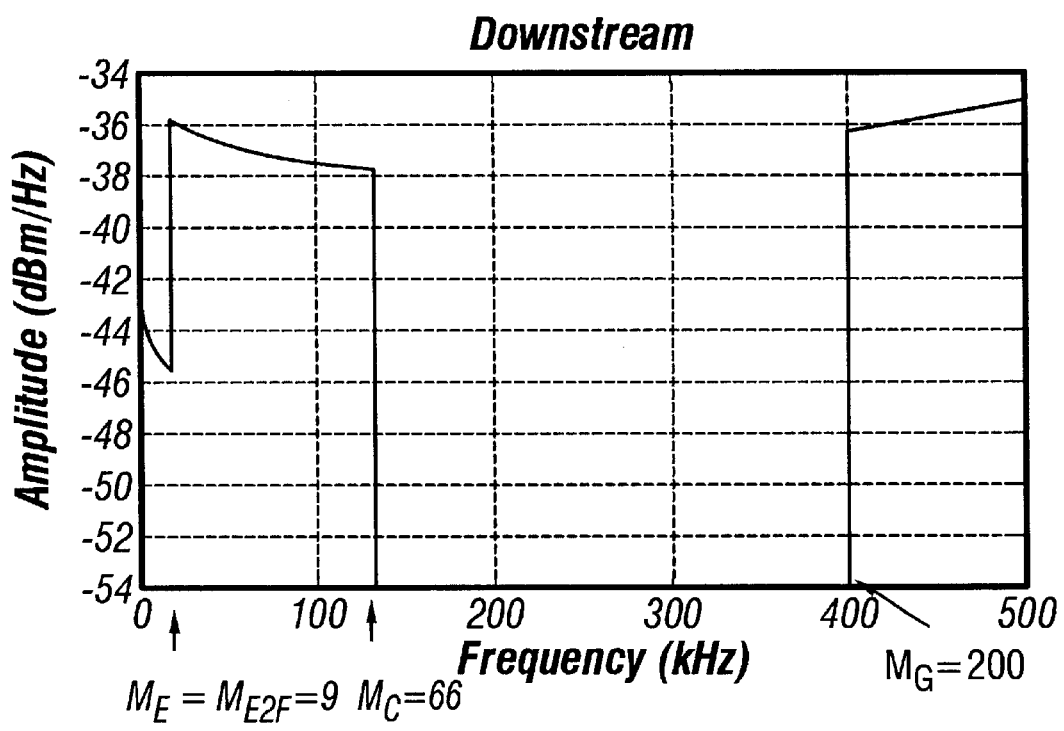
Figure 32A:
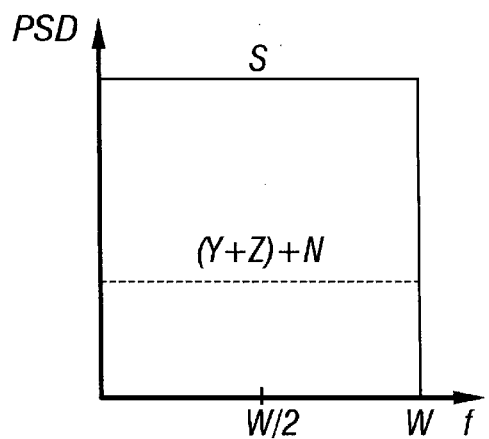
Figure 32B:
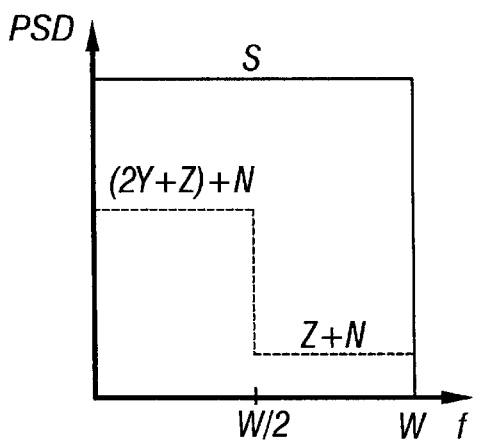
Figure 33A:
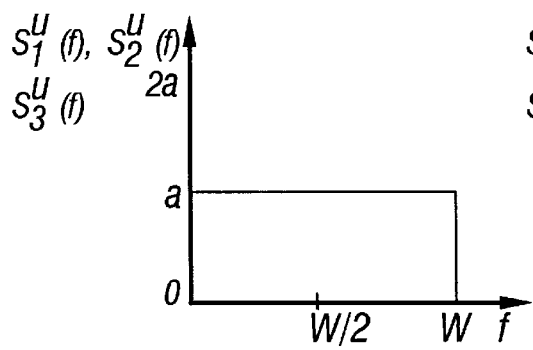
Figure 33B:
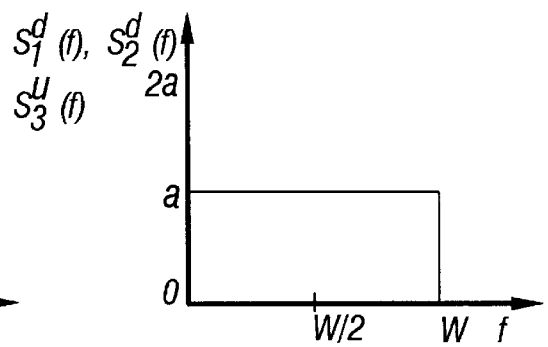
Figure 33C:
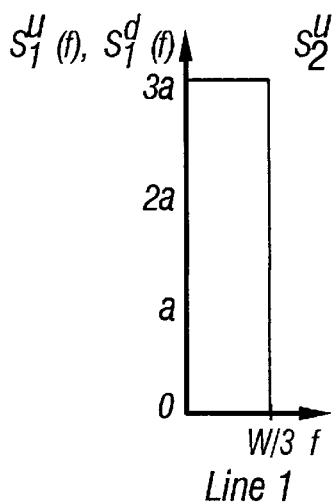
Figure 33D:
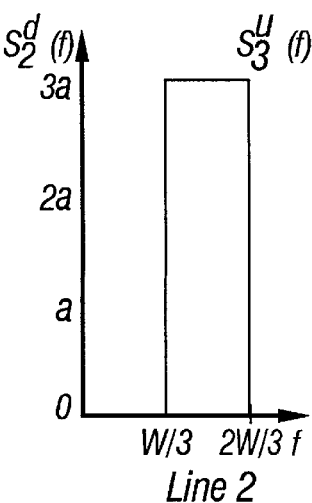
Figure 33E:
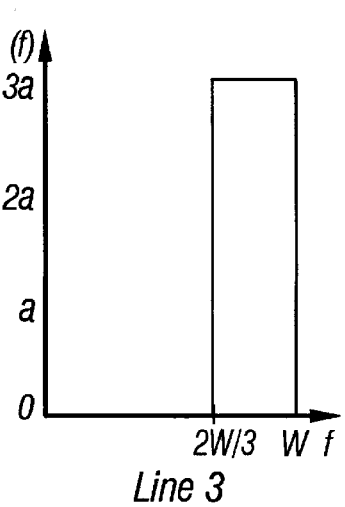
Figure 35:
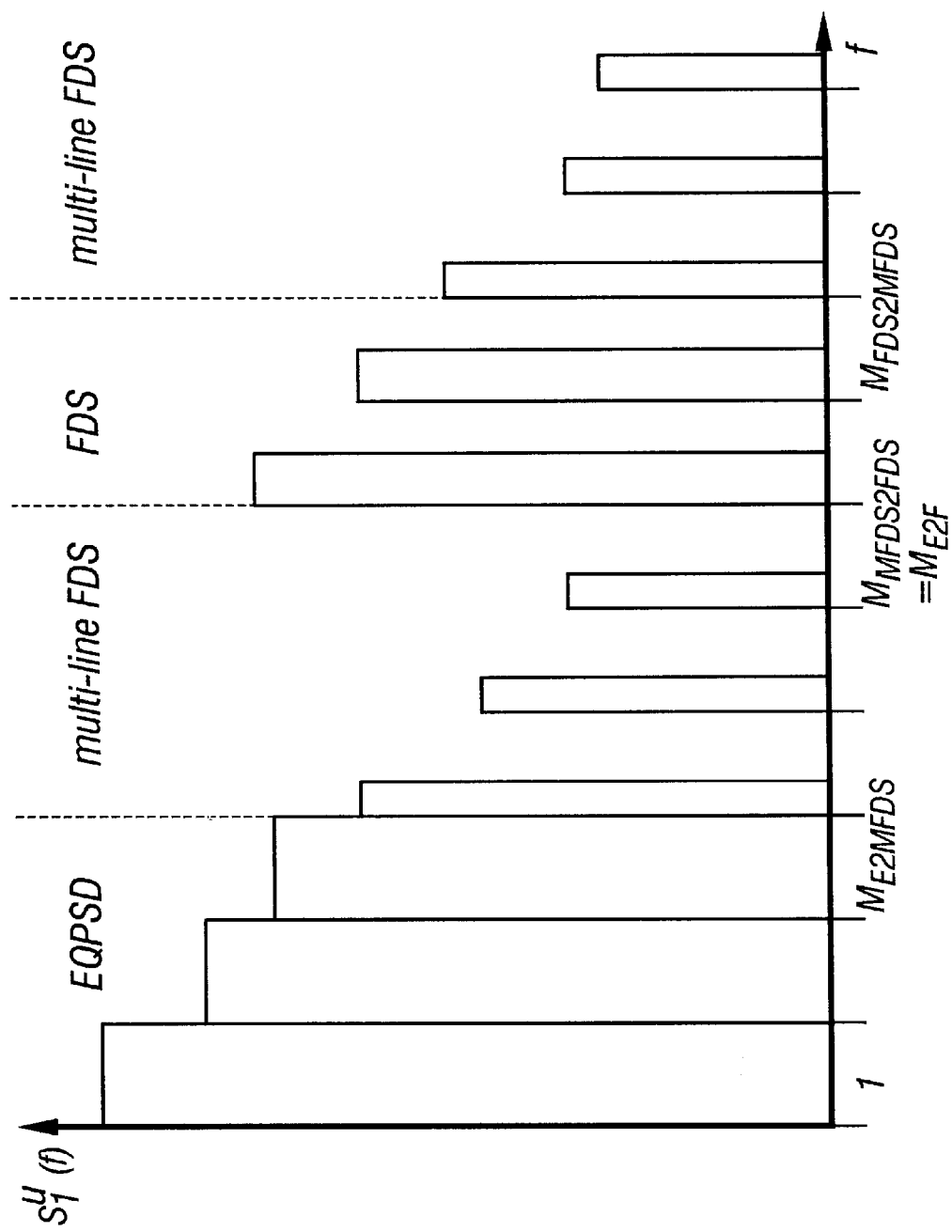
Figure 36:
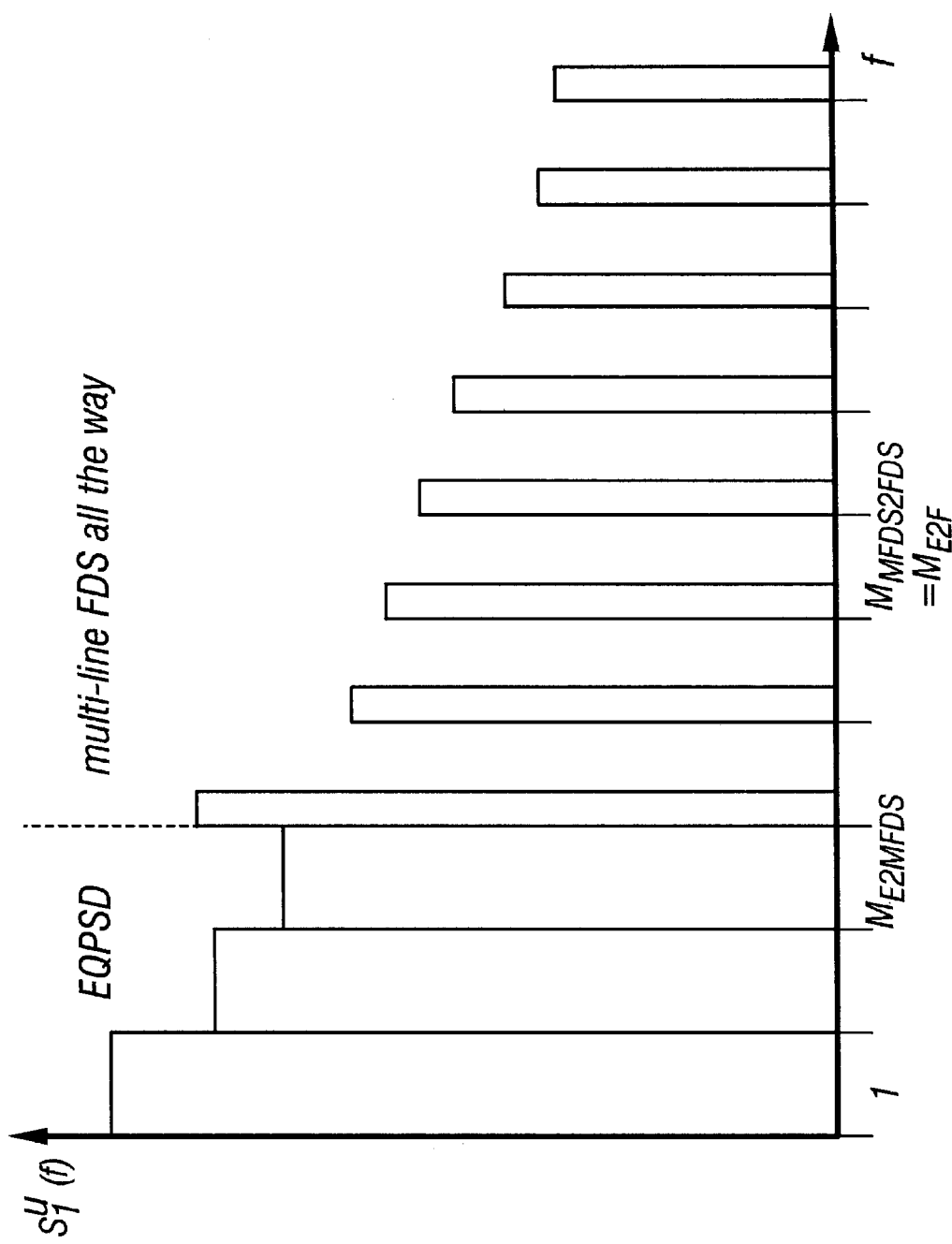
Figure 37:
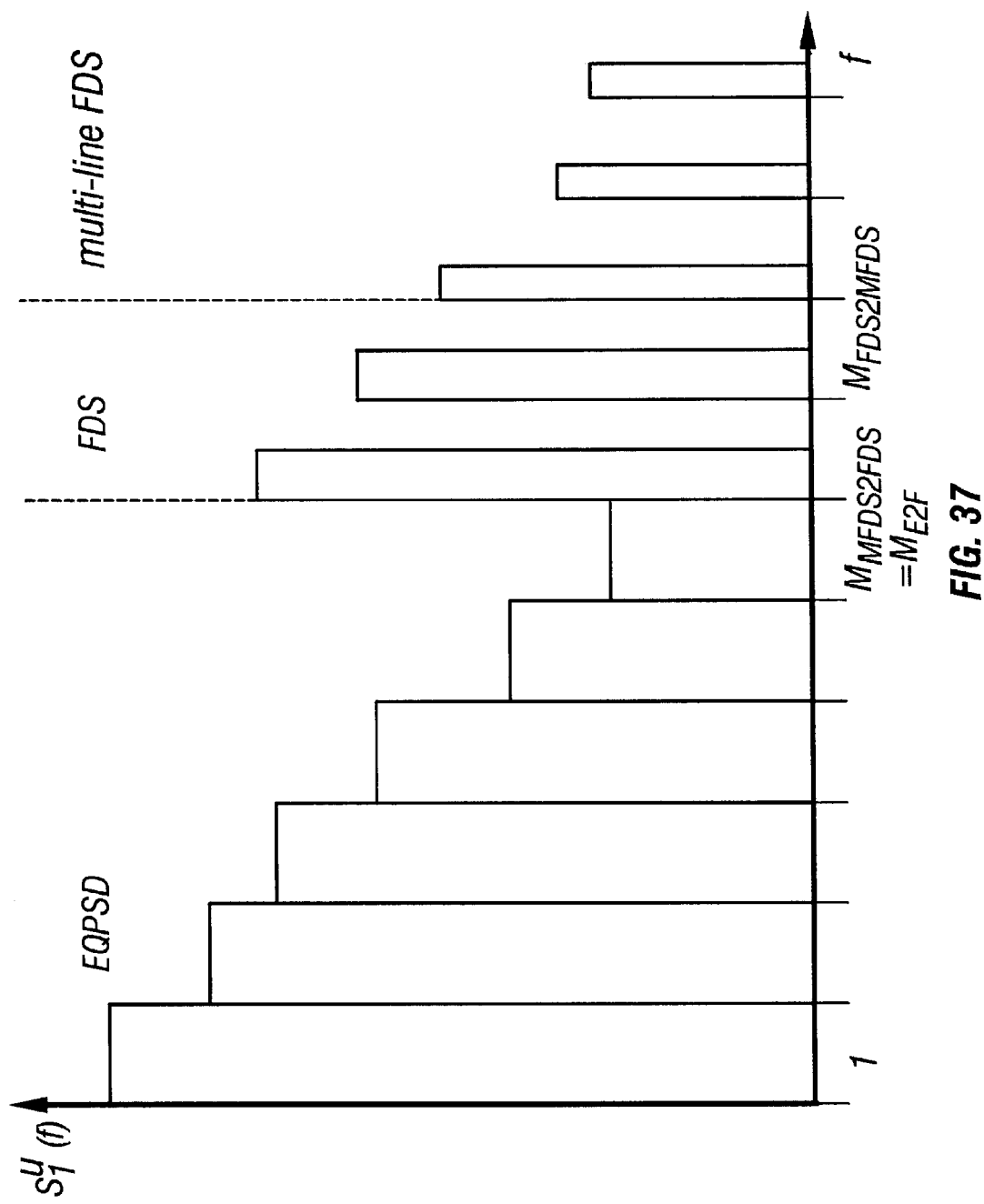
Figure 39A:
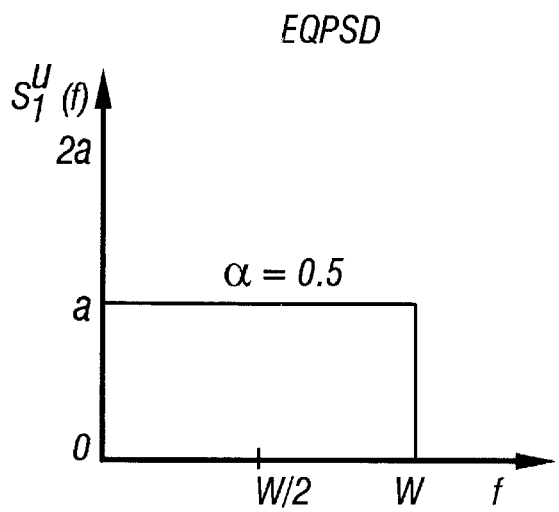
Figure 39B:
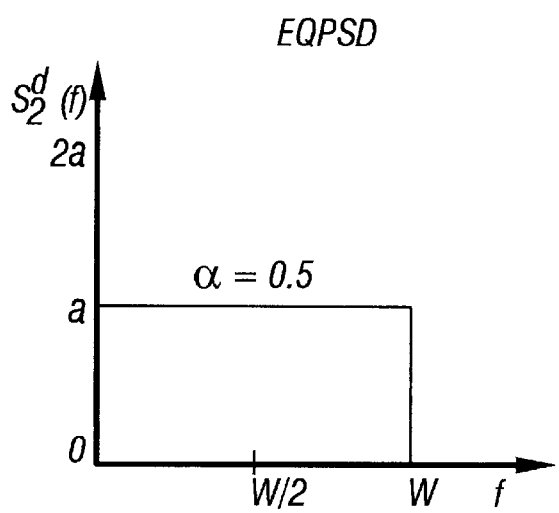
Figure 39C:
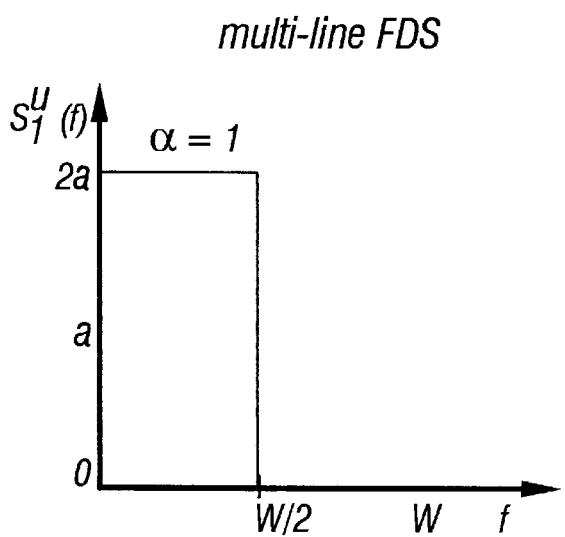
Figure 39D:
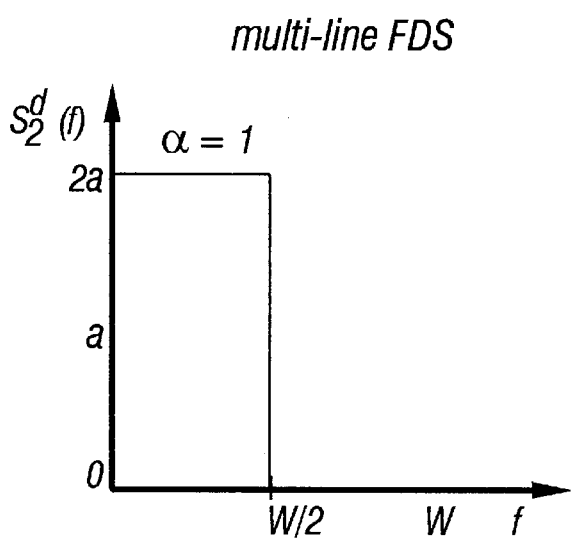
Figure 40:
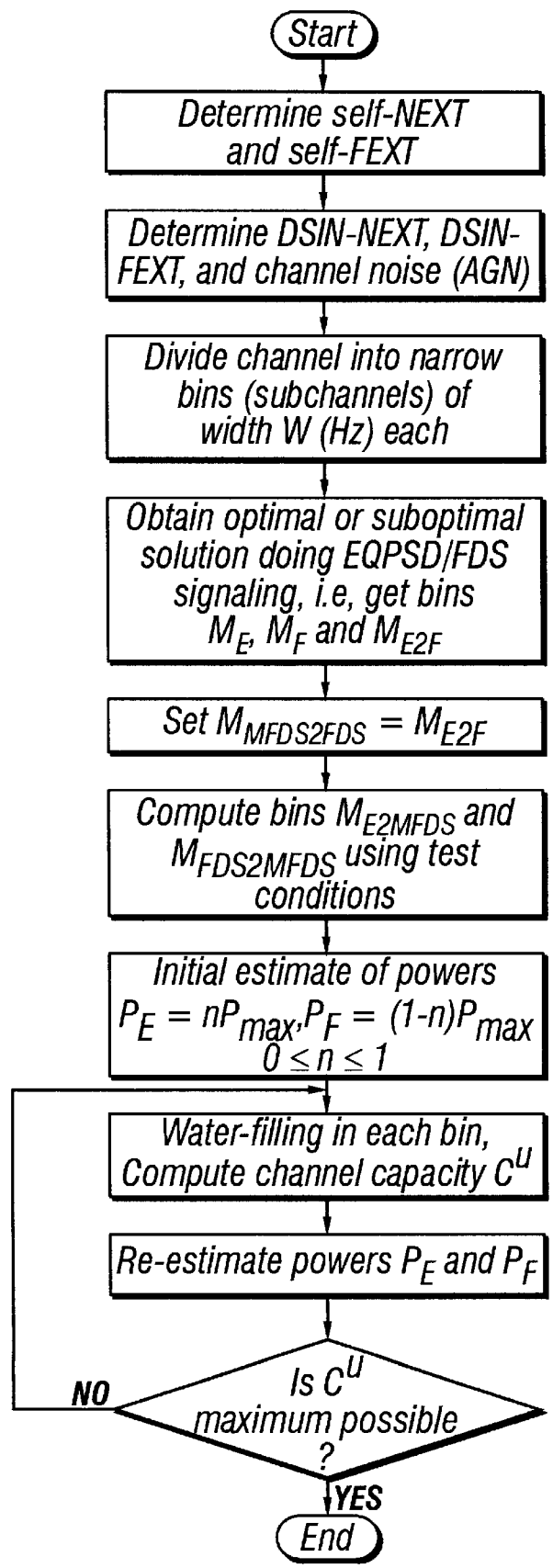
Figures 41A, 41B:
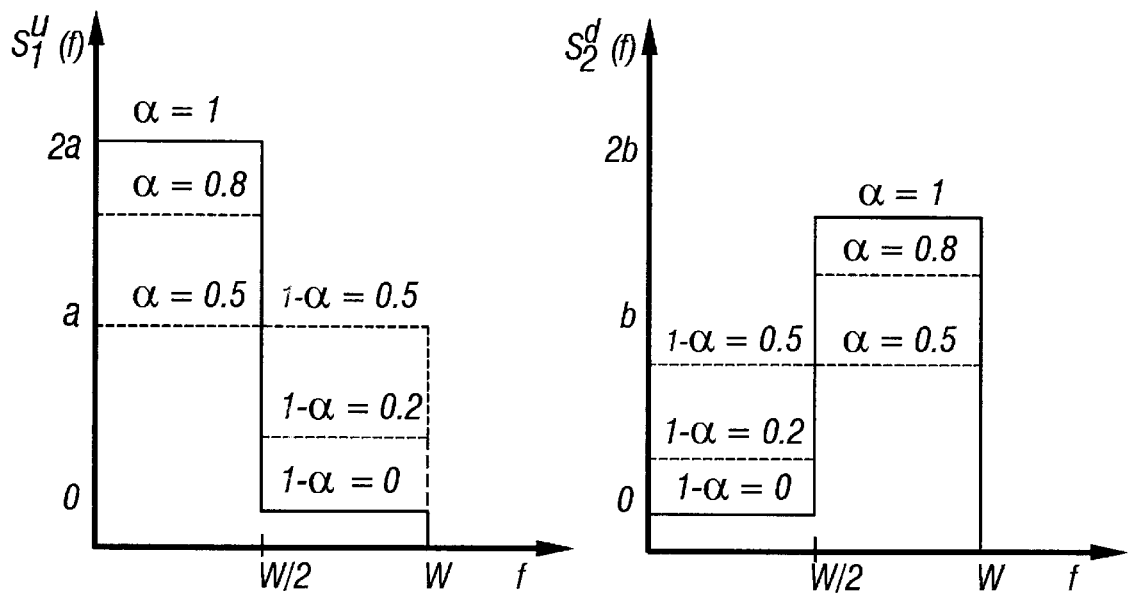
Figures 41C, 41D:
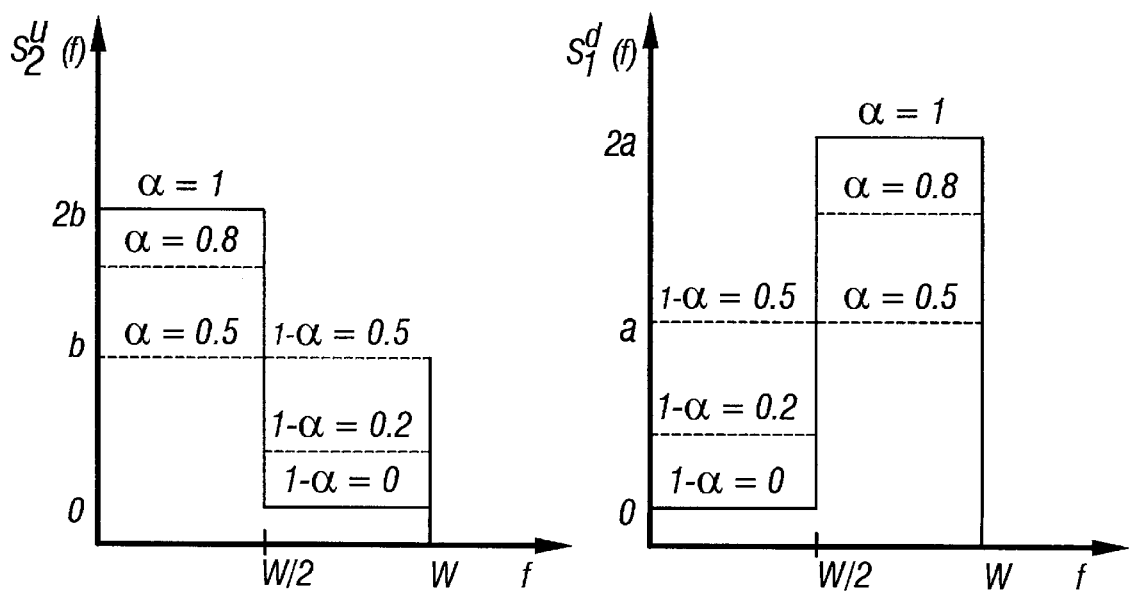
Figure 44:
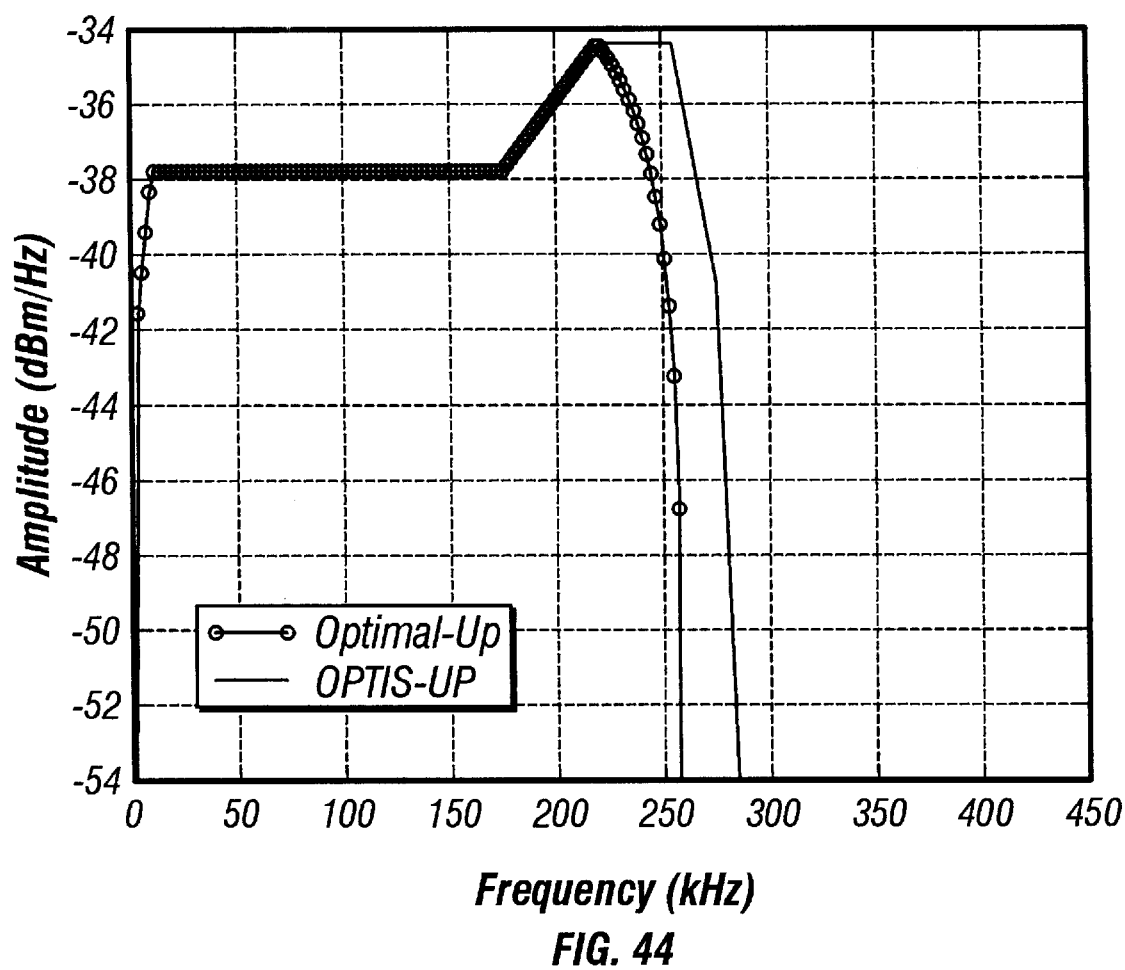
Figure 45A:
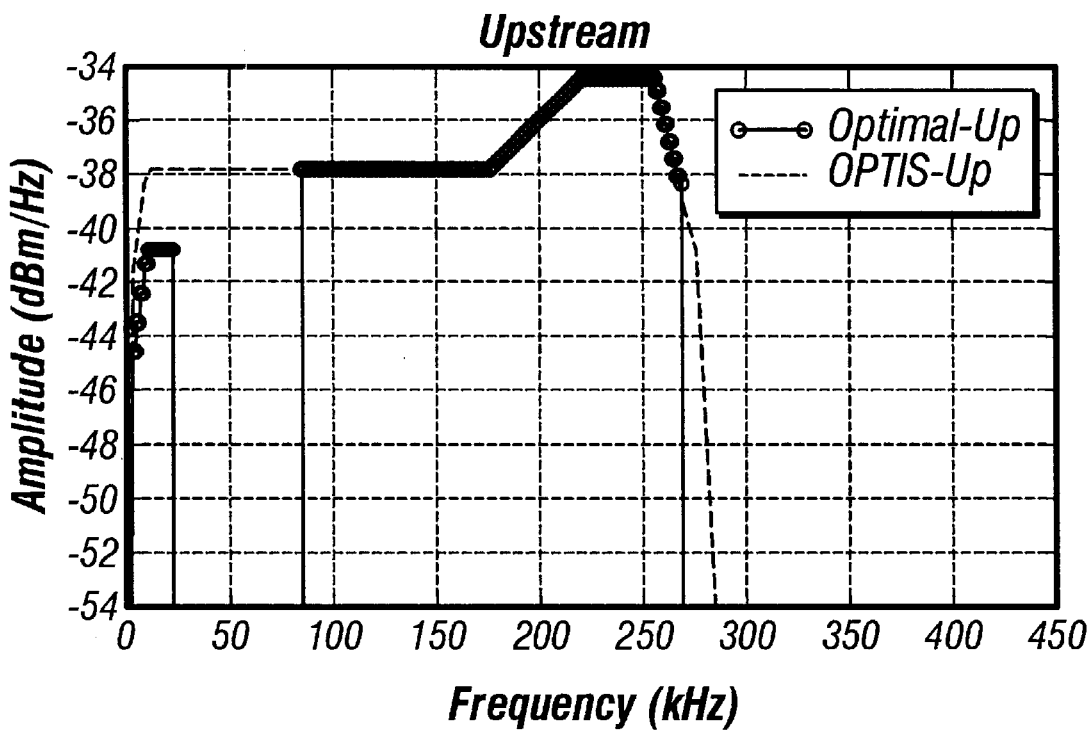
Figure 45B:
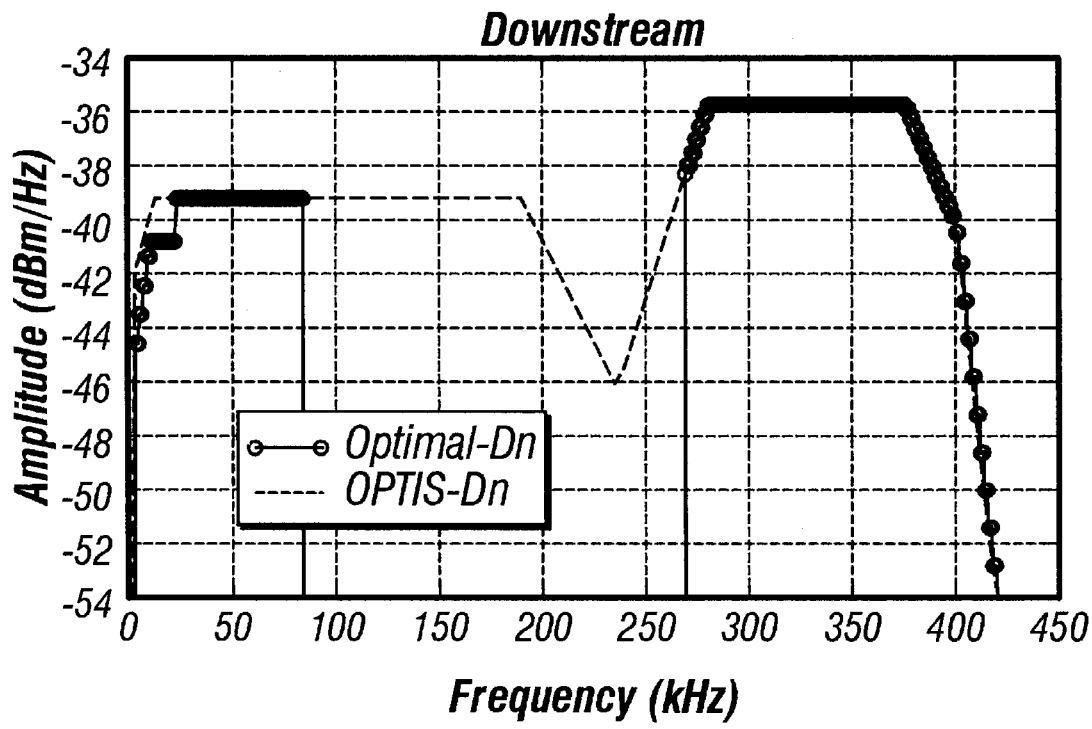
Figure 46A:
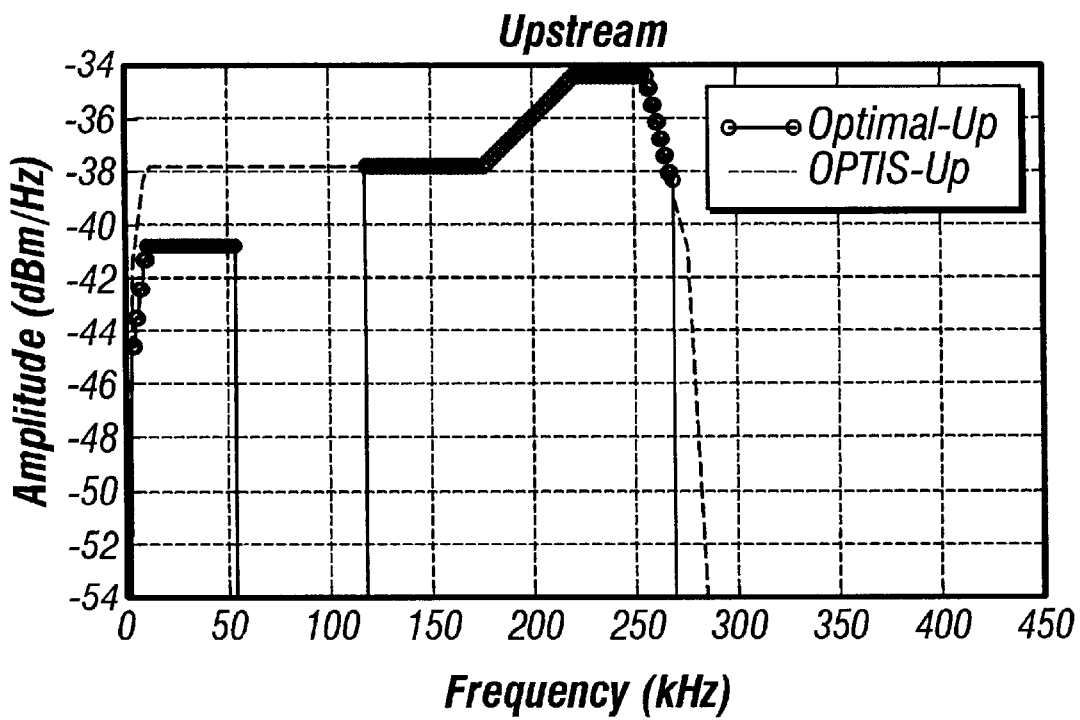
Figure 46B:
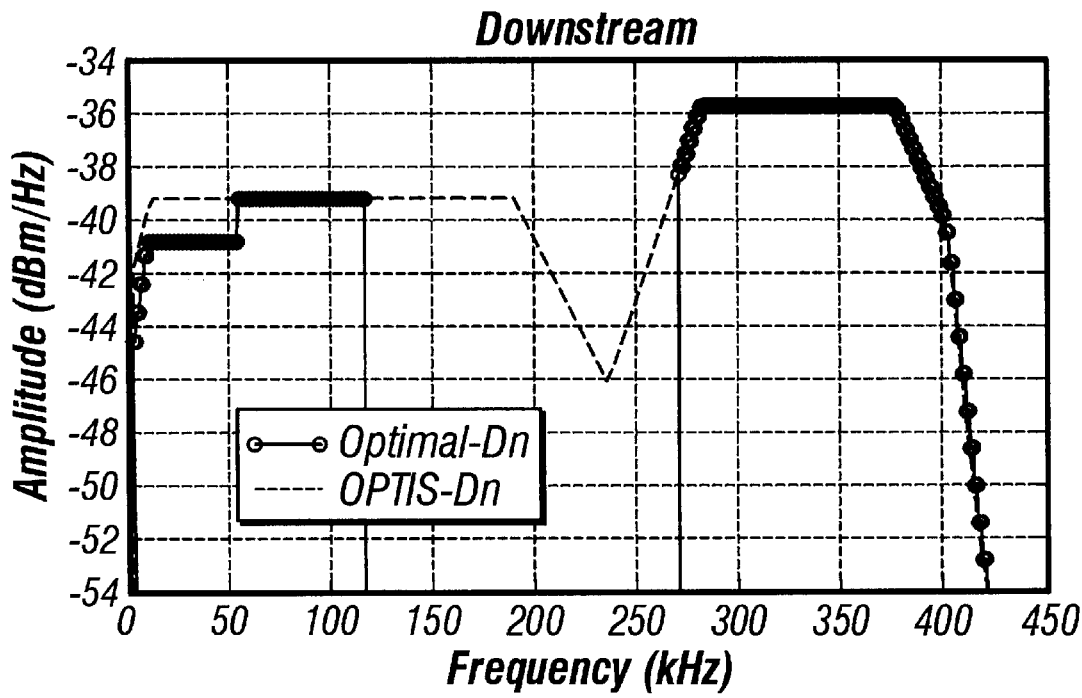
Figure 47A:
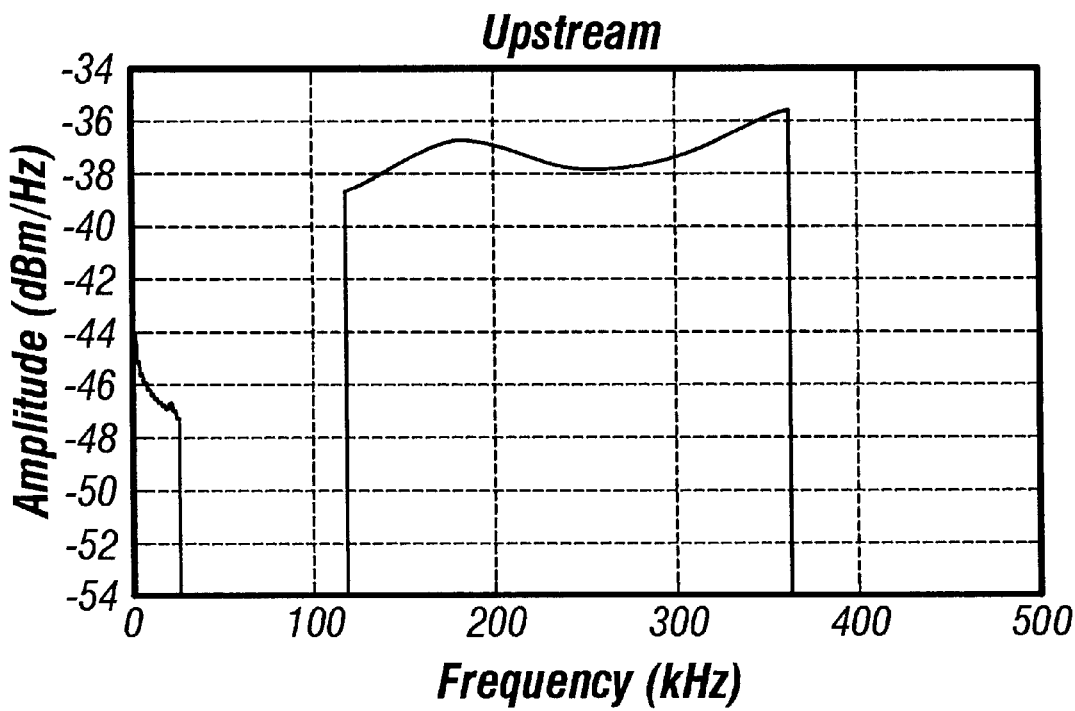
Figure 47B:
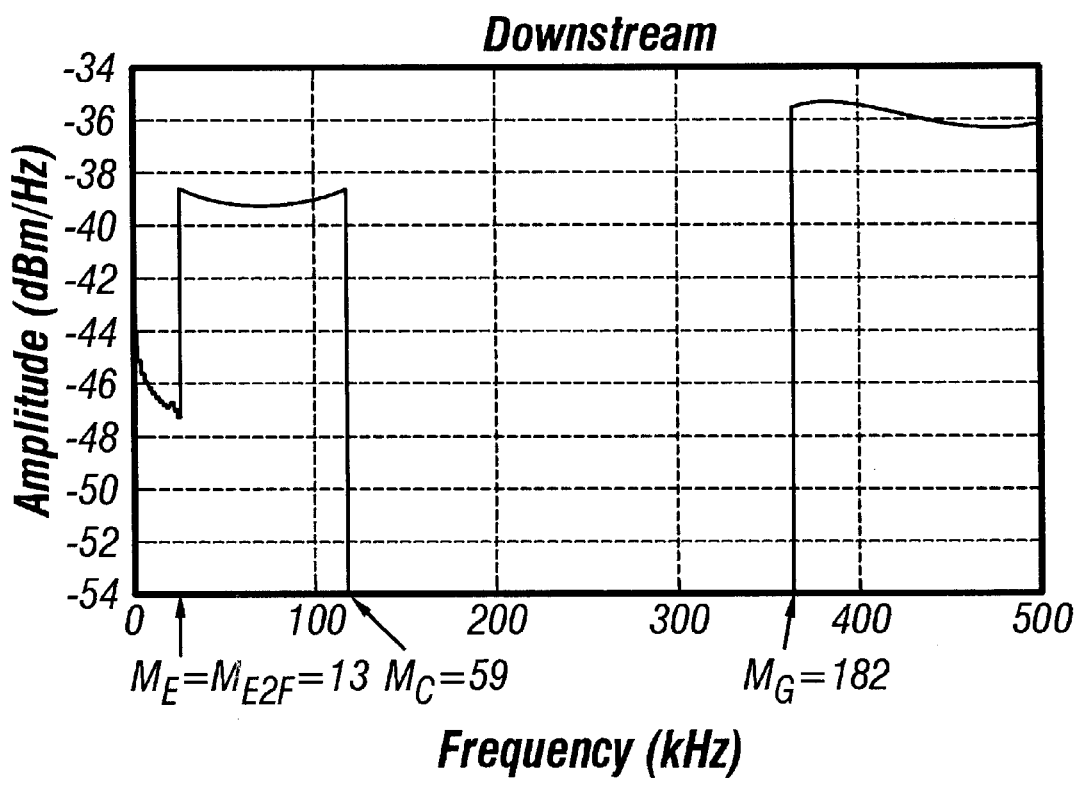
Figure 48A:
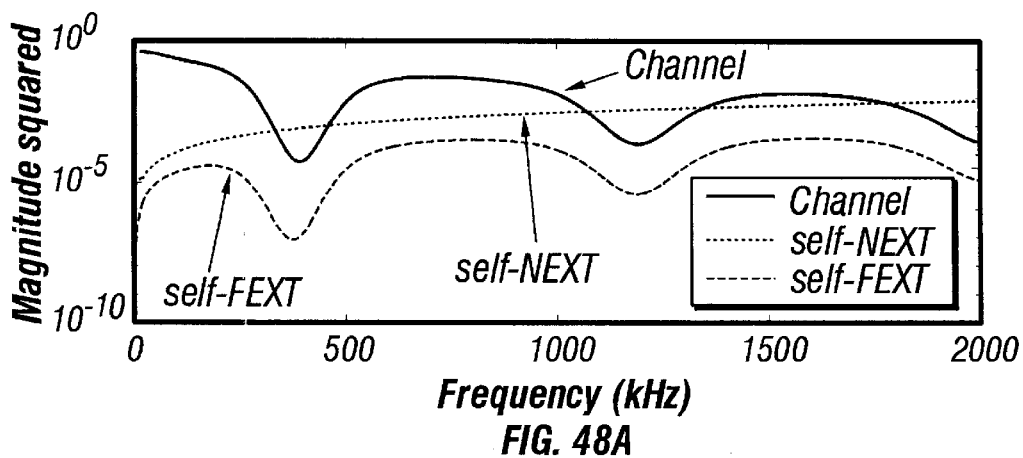
Figure 48B:
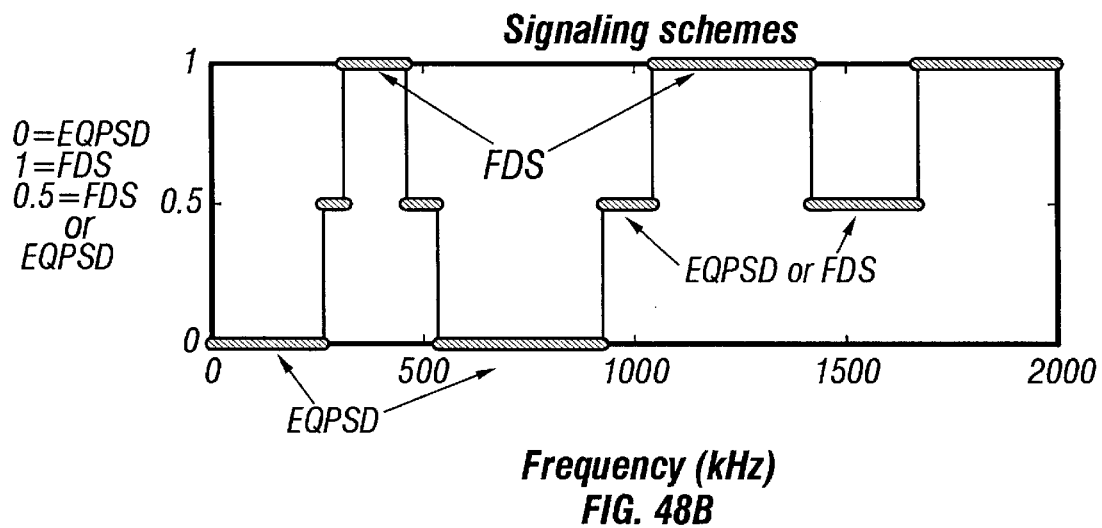
Figure 49:
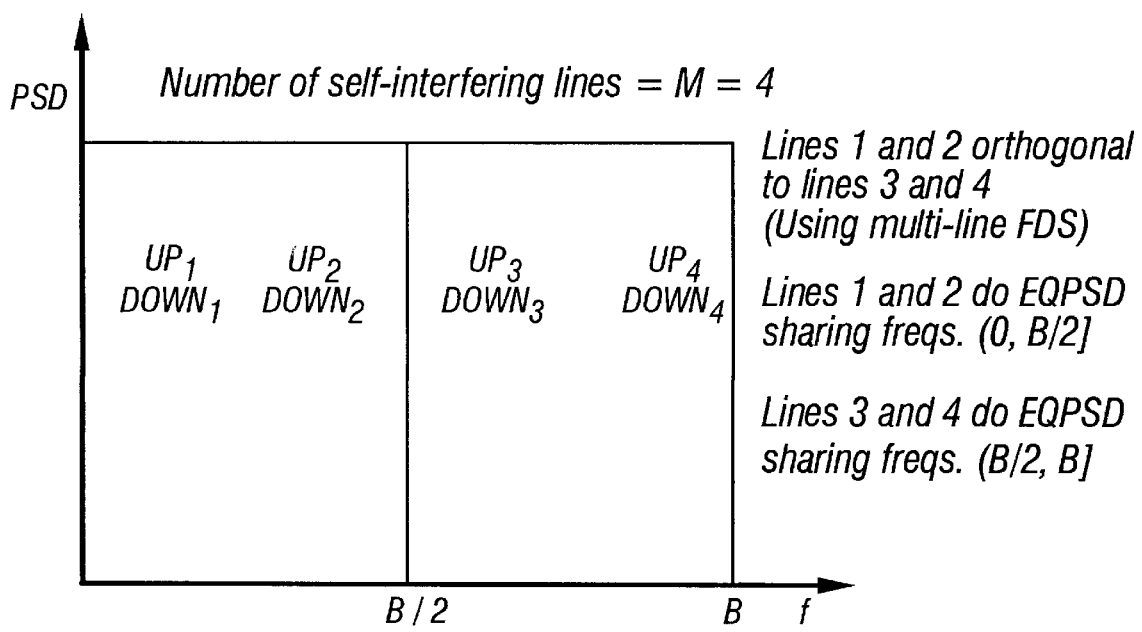

Other objects and advantages of the invention will become apparent upon reading the following detailed description and upon reference to the accompanying drawings in which:

FIG. 1 is an example of a frequency-response graph for a twisted pair telephone channel;

FIG. 2 shows NEXT and FEXT between neighboring lines in a telephone cable, with "Tx" and "Rx" indicating transmitters and receivers, respectively;

FIG. 3 shows how NEXT (DSIN-NEXT and self-NEXT) and FEXT (DSIN-FEXT and self-FEXT) are modeled as additive interference sources, with DSOUT-NEXT and DSOUT-FEXT representing the interference leaking out into other neighboring services;

FIG. 4 illustrates how multicarrier, or discrete multitone (DMT) modulation multiplexes the data onto multiple orthogonal carrier waves;

FIG. 5 and FIG. 5A are representative views of a subscriber-line communications system and a well-logging system that use the present invention;

FIG. 6 is a representative view of a home system using the present invention for DSL communications;

FIG. 7 is a block diagram of one embodiment of the computer from FIG. 6;

FIG. 8 is a block diagram of one embodiment of the DSL card from FIG. 7;

FIG. 9 is a flowchart for determining transmission characteristics for a communications system in one embodiment of the invention;

FIG. 10 is a flowchart for determining a transmit spectrum with preliminary analyses of self interference and FEXT levels;

FIG. 11 is a flowchart for determining a transmit spectrum with preliminary analyses of self interference levels;

FIG. 12 is a flowchart for determining a transmit spectrum;

FIG. 13 is a flowchart for method for transmitting data on a communications channel;

FIG. 14 is a flowchart for initiating a data transfer on the communications channel;

FIG. 15 is a flowchart for determining transmission characteristics for a communications system in one embodiment of the invention;

FIG. 16 is a frequency-response graph showing the channel sub-division into K narrow bins (subchannels), each of width W(Hz);

FIG. 17 shows the magnitude squared transfer function of the channel (CSA loop 6), with 39 self-NEXT interferers, and 39 self-FEXT interferers (see (1)–(3));

FIG. 18 shows transmit spectra for EQPSD, FDS and multi-line FDS signaling schemes in a single frequency bin k for the case where the number of lines is 3 (this also works for any number of lines);

FIG. 19 is a model for combined additive interference from other services (DSIN-NEXT and DSIN-FEXT) plus channel noise (AGN);

FIG. 20 is a flowchart of a method for determining an optimal transmit spectrum using only EQPSD signaling;

FIG. 21 is a graph of an optimal transmit spectrum of HDSL2 (on CSA loop 6) with 49 HDSL DSIN-NEXT interferers and AGN of −140 dBm/Hz;

FIG. 22 is a graph of an optimal transmit spectrum of HDSL2 (on CSA loop 6) with 25 T1 DSIN-NEXT interferers and AGN of −140 dBm/Hz;

FIG. 23 shows upstream and downstream transmit spectra in a single frequency bin ($\alpha=0.5\rightarrow$EQPSD signaling and $\alpha=1\rightarrow$FDS signaling);

FIG. 24 is a graph demonstrating that $R_A$ is monotonic in the interval $\alpha\in(0.5, 1]$;

FIG. 25 shows EQPSD and FDS signaling in a single frequency bin;

FIG. 26 shows upstream and downstream transmit spectra with regions employing EQPSD signaling (in bins [1, $M_{E2F}$]) and FDS signaling (in bins [$M_{E2F}$+1, K]);

FIG. 27 is a flowchart of the optimal and suboptimal schemes to determine the transmit spectrum using EQPSD and FDS signaling (and EQPSD/FDS transmit spectrum);

FIG. 28 shows joint EQPSD/FDS signaling for a channel with "discrete" and "contiguous" transmit spectra for upstream (top graphs) and downstream (bottom graphs) signaling;

FIG. 29 is a graph of an optimal upstream transmit spectrum for CSA Loop 6 using HDSL2 with 39 self-NEXT and 39 self-FEXT interferers, with EQPSD signaling taking place to the left of bin 9 (indicated by solid line) and FDS signaling taking place to the right (indicated by dashed line);

FIG. 30 shows graphs of optimal "contiguous" upstream and downstream transmit spectra for CSA Loop 6 using HDSL2 with 39 self-NEXT and 39 self-FEXT interferers (EQPSD signaling taking place to the left of bin 9);

FIG. 31 shows graphs of another set of optimal "contiguous" upstream and downstream transmit spectra for CSA Loop 6 using HDSL2 with 39 self-NEXT and 39 self-FEXT interferers, with the property that these spectra yield equal performance margins (equal capacities) and equal average powers in both directions of transmission (EQPSD signaling taking place to the left of bin 9);

FIG. 32 shows transmit spectra of signaling line (S), interfering line (Y and Z), and lumped channel noise (A) for two cases: the FDS scheme (Case 2) for interfering line yields higher capacity for signaling line (S) than other schemes like CDS (Case 1);

FIG. 33 shows EQPSD and multi-line FDS signaling in a single frequency bin k for the M=3 line case;

FIG. 34 shows FDS and multi-line FDS signaling in a single frequency bin k for the M=3 line case;

FIG. 35 is an example of an upstream transmit spectrum of line 1 ($S_l''(f)$) employing EQPSD, FDS and multi-line FDS signaling schemes for the M=3 line case, in which bins [1, $M_{E2MFDS}$] employ EQPSD, bins [$M_{E2MFDS}$+1, $M_{MFDS2FDS}$] employ multi-line FDS, bins [$M_{MFDS2FDS}$+1, $M_{FDS2MFDS}$] employ FDS, and bins [$M_{FDS2MFDS}$+1, K] employ multi-line FDS; The downstream spectrum of line 1 ($S_l^d(f)$) is similar to $S_l''(f)$ except for putting power in the complimentary halves of FDS bins; The upstream spectra of lines 2 and 3 are similar to $S_l''(f)$ except for putting power in complementary thirds of multi-line FDS bins; The downstream spectra for lines 2 and 3 are similar to $S_l''(f)$ except for putting power in the complementary halves of the FDS bins and in the complementary thirds of multi-line FDS bins;

FIG. 36 illustrates practical observation 1, a case of an EQPSD/FDS/MFDS transmit spectrum in which there is no FDS spectral region; bins [1, $M_{E2MFDS}$] employ EQPSD, and bins [$M_{E2MFDS}$+1, K] employ multi-line FDS;

FIG. 37 illustrates practical observation 2, a case of an EQPSD/FDS/MFDS transmit spectrum in which there is no multi-line FDS spectral portion within the EQPSD region; bins [1, $M_{MFDS2FDS}$] employ EQPSD, bins [$M_{MFDS2FDS}$+1, $M_{FDS2MFDS}$] employ FDS, and bins [$M_{FDS2MFDS}$+1, K] employ multi-line FDS;

FIG. 38 shows upstream and downstream transmit spectra in a single frequency bin ($\alpha 0.5\rightarrow$EQPSD signaling and $\alpha=1\rightarrow$multi-line FDS signaling);

FIG. 39 shows EQPSD and multi-line FDS signaling in a single frequency bin;

FIG. 40 is a flowchart of a scheme for determining an optimal transmit spectrum using EQPSD, FDS, and multi-line FDS signaling (an EQPSD/FDS/MFDS transmit spectrum);

FIG. 41 shows, for the case where the lines have different line characteristics, upstream and downstream transmit spectra in a single frequency bin ($\alpha=0.5\rightarrow$EQPSD signaling and $\alpha=1\rightarrow$multi-line FDS signaling);

FIG. 42 shows, for the case where the lines have different line characteristics, upstream and downstream transmit spectra in a single frequency bin ($\alpha=0.5\rightarrow$EQPSD signaling and $\alpha=1\rightarrow$multi-line FDS signaling);

FIG. 43 is a graph of an optimal downstream transmit spectrum for HDSL2 (on CSA loop 6) under an OPTIS downstream constraining PSD mask with 49 HDSL DSIN-NEXT interferers and AGN of −140 dBm/Hz (the 'o—o' line shows the peak-constrained optimal transmit spectrum and the '—' line shows the constraining OPTIS PSD mask);

FIG. 44 is a graph of an optimal upstream transmit spectrum for HDSL2 (on CSA loop 6) under an OPTIS upstream constraining PSD mask with 25 T1 DSIN-NEXT interferers and AGN of −140 dBm/Hz (the 'o—o' line shows the peak-constrained optimal transmit spectrum and the '—' line shows the constraining OPTIS PSD mask);

FIG. 45 shows graphs of optimal upstream and downstream transmit spectra for HDSL2 (on CSA loop 6) under the OPTIS upstream and downstream constraining PSD masks with 39 HDSL2 self-NEXT and self-FEXT interferers and AGN of −140 dBm/Hz (the 'o—o' lines show the peak-constrained optimal transmit spectra and the '—' lines show the constraining OPTIS PSD masks);

FIG. 46 shows graphs of optimal upstream and downstream transmit spectra for HDSL2 (on CSA loop 6) under the OPTIS upstream and downstream constraining PSD masks with 24 HDSL2 self-NEXT and self-FEXT interferers, 24 T1 interferers, and AGN of −140 dBm/Hz (the 'o—o' lines show the peak-constrained optimal transmit spectra and the '—' lines show the constraining OPTIS PSD masks);

FIG. 47 shows graphs of optimal "contiguous" upstream and downstream transmit spectra for HDSL2 (on CSA loop 4, with a non-monotonic channel function due to bridged taps) with 39 HDSL2 self-NEXT and self-FEXT interferers; these transmit spectra yield equal performance margins (equal capacities) and equal average powers in both directions of transmission (note that there is only one transition region from EQPSD to FDS signaling);

FIG. 48 shows (in the top graph) the channel transfer function, self-NEXT, and self-FEXT transfer functions for a short loop with bridged taps employing "GDSL" service (note that self-NEXT is very low for this hypothetical service), and shows (in the bottom graph) the distributed EQPSD and FDS spectral regions for the upstream and downstream transmit spectra, with a 0 indicating EQPSD signaling, a 1 indicating FDS, and a 0.5 indicating EQPSD or FDS signaling (note that in this case the non-monotonicity of the channel transfer function leads to several distributed signaling regions); and FIG. 49 shows an alternative signaling scheme: in the presence of high degrees of self-NEXT and self FEXT between group of lines 1 and 2 and lines 3 and 4, we employ multi-line FDS; there is EQPSD signaling within each group of lines (1 and 2 employ EQPSD as do 3 and 4) that have low self-interference.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The present invention comprises an improved system and method for communicating information such as voice, images, video, data, or other information on a transmission medium. The present invention provides improved communications on the transmission medium in the presence of interference. More specifically, the present invention operates to model and then minimize the effects of interference on the transmission medium. The interference may take the form of similar services being transmitted on neighboring transmission mediums and/or may take the form of uncorrelated interference from different services on neighboring transmission mediums and or interference from various noise sources which affect the transmission medium.

FIG. 5—Subscriber Line Embodiment

FIG. 5 illustrates a preferred embodiment for use of the present invention. FIG. 5 illustrates a first location, e.g., a home 10 that is coupled through a subscriber line 12 to a second location, e.g. a telephone company central office (CO) 14. It is noted that the first and second locations may be any of various types of sites, such as a home, an office, business, an office building, or a CO.

In this embodiment of the invention, the communication system and method is comprised in a digital subscriber line (DSL) device that operates to perform xDSL communications on subscriber line 12. Thus, this figure shows a configuration that includes subscriber line 12, e.g., a twisted-pair copper line, that is coupled between home 10 and CO 14. The present invention is comprised in each of home 10 and CO 14.

As discussed in the background section, subscriber lines are generally included in a cable that has a plurality of closely positioned transmission mediums, including other subscriber lines. Due to the close proximity of the transmission mediums comprised in a subscriber cable, a given subscriber line is subject to interference from neighboring transmission mediums, including self-NEXT and self-FEXT interference, and different service interference (DSIN). Some of the transmit spectra discussed herein are substantially optimized to maximize performance margins and avoid the effects of this interference, thereby providing improved communication.

By design, an optimal transmit spectra give increased performance margins (increased immunity against noise) and spectral compatibility margins as compared to one fixed transmit spectrum. The optimal transmit spectra described herein are typically obtained by fixing the average input power and choosing the best signaling strategies and optimal power distribution to maximize the bit rate or performance margin. The transmit spectra may also be used to minimize the required average input power where the desired performance margins or bit rates are fixed.

FIG. 5A—Well Logging Embodiment

FIG. 5A illustrates an alternate scenario for use of the communication system and method of the present invention. FIG. 5A illustrates a drill hole and/or well-logging scenario which utilizes the communication system of the present invention. As an example, in FIG. 5A communication equipment 16 on the surface communicates through a communication medium 12A to instrumentation 18 comprised in the borehole underground. The communication system and method operates to reduce the effects of interference in the well hole and to provide improved communications.

Although FIG. 5 and FIG. 5A illustrate two embodiments for use of the system and method of the present invention, it is noted that the present invention may be used in any of various types of systems or scenarios which involve communication of data on a transmission medium that is subject to noise or other interference. The present invention is particularly useful in scenarios where the transmission medium is in close proximity to various sources of interference that can be ascertained, identified, and modeled. In general, the present invention is applicable to reduce the effects of interference on transmission media that are subject to interference from known or unknown sources where the spectral characteristics of the interference can be modeled.

In the analyses presented herein, we use a generic DSL (xDSL) model. For concreteness, we present results optimizing DSL services such as HDSL2, "GDSL", and "VDSL2" in the face of noise and interference from neighboring services. The invention is not, however, limited to these services, but can be applied to any communications channel that exhibits crosstalk interference.

Although FIG. 5 illustrates a subscriber line embodiment, it is noted that the present invention may be used for any of various types of transmission media, e.g., copper wire, fiber optic, lines, co-axial cable, wave guides, etc. For example, the present invention is well suited for use in local and wide-area networks to minimize noise interference on networks, e.g., Ethernet, token ring, and wide area networks such as frame relay, Switched 56, ATM (asynchronous transfer mode), etc. Also, although FIG. 5 illustrates use of the present invention between a home 10 and a central office 14 over a subscriber loop or subscriber line 12, it is noted that the present invention may also be used for the various trunks comprised in the PSTN. The present invention is also useful in the various backbones or lines used for the Internet.

The present invention is also useful for wireless transmission applications, e.g., cellular telephones, cordless telephones, short wave radio, etc. as well as the various broadcast media such as the various digital satellite services providing television, Internet, data or voice services. In short, the present invention is applicable to any of various types of systems which involve the transmission of data over a wired or wireless medium. The present invention is also applicable to any of the various types of signaling protocols such as frequency division multiple access (FDMA), time division multiple access (TDMA) and code division multiple access (CDMA) as well as hybrids of these, among others.

Therefore, the present invention is applicable to a variety of communications channels in a number of communication scenarios. In the description that follows, the present invention is described with respect to the preferred embodiment, the preferred embodiment being a digital subscriber line application between a first location, e.g., a home or business 10, and a telephone company central office 14.

FIG. 6—Home DSL System

FIG. 6 illustrates a system 100 comprised in location 10, i.e., in the home or business 10 which performs digital subscriber line (DSL) communication operations over subscriber line 12. In a preferred embodiment, the DSL circuitry of the present invention is comprised in a computer system 102 coupled to subscriber line 12 through an xDSL port 106. In one embodiment, computer system 102 is also coupled to a telephone system 104. However, it is noted that the DSL system of the present invention may be comprised in any of various types of systems including computer systems, Internet appliances, televisions or dedicated boxes. In the preferred embodiment, the DSL system of the present invention is comprised in a DSL device on an add-in card to the general purpose computer system 102. In the preferred embodiment, the DSL card includes a port for coupling to a standard telephone jack, or "splitter," which in turn couples to the subscriber line 12. In this embodiment, the computer system 102 may be utilized as a virtual telephone which operates through the DSL device for voice communications over the subscriber line 12. In another embodiment, a separate telephone system 104 is coupled to a second port of the DSL card, as shown in FIG. 6.

FIG. 7—Computer System Block Diagram

Turning now to FIG. 7, a block diagram of one embodiment of computer system 102 is shown. Other embodiments are possible and contemplated. The depicted system includes a microprocessor or CPU 110 coupled to a variety of system components through a bus bridge 114. In the depicted system, a main memory 112 is also coupled to bus bridge 114. Finally, a plurality of PCI devices are coupled to bus bridge 114 through a PCI bus 116. In the depicted embodiment, the PCI devices include a video card 118 and a add-in card for the DSL device 120.

Bus bridge 114 provides an interface between microprocessor 110, main memory 112, and the devices attached to PCI bus 116. When an operation is received from one of the devices connected to bus bridge 114, bus bridge 114 identifies the target of the operation (e.g. a particular device or, in the case of PCI bus 116, that the target is on PCI bus 116). Bus bridge 114 routes the operation to the targeted device. Bus bridge 114 generally translates an operation from the protocol used by the source device or bus to the protocol used by the target device or bus.

Main memory 112 is a memory in which application programs are stored and from which microprocessor 110 primarily executes. A suitable main memory 112 comprises DRAM (Dynamic Random Access Memory), and preferably a plurality of banks of SDRAM (Synchronous DRAM).

FIG. 8—DSL Device

FIG. 8 is a block diagram illustrating DSL device 120 comprised in the computer 102 of FIG. 6. As noted above, although in the preferred embodiment the DSL device is comprised as a computer add-in card, DSL device 120 may take any of various types of forms including being comprised in a television system, Internet appliance, or dedicated device, among others systems. As shown, the DSL device or add-in card 120 comprises a first port 160 for coupling to an expansion bus of the computer system, preferably a PCI expansion bus port as shown. DSL device 120 also includes at least one subscriber line port 170 for coupling to the digital subscriber line 12. DSL device 120 may include any of various hardware elements for performing the communication operations of the present invention. For example, in one embodiment, the DSL communication device includes one or more programmable processing units which implement instructions from a memory. For example, the DSL communication device may include a programmable digital signal processor (DSP) 152, a general purpose processor, or other processors that execute instructions from a memory 156 to implement the communication operations of the present invention. Alternatively, or in addition, the DSL communication device 120 includes one or more application specific integrated circuits (ASICs) 154 and 158 or programmable logic devices such as FPGAs etc. that implement a portion or all of the present invention. In short, the communication system and method of the present invention may be implemented in any of various types of ways including programmable devices such as processing units, CPUs, DSPs, microcontrollers, etc., dedicated hardware such as ASICs, programmable logic devices such as FPGAs, or combinations of the above.

FIG. 9–FIG. 12—Method for Determining Transmission Characteristics

FIG. 9 is a flowchart for determining a transmit spectrum for use in communicating data on a communications channel according to one embodiment of the present invention. This method may be used in communicating data on the communications channel when the communications channel is subject to interference from one or more other communications channels. The communications channel of interest and one or more of the other communications channels carry a particular type of service, such as xDSL, ISDN, T1, or spread-spectrum, for example. The first steps in this method comprise determining a channel transfer function of the communications channel 210 and an amount of self interference 220 into the communications channel from the other communications channels that carry the same type of service. In step 230, the transfer function and the amount of self interference are examined, and in step 240 a transmit spectrum for the channel is determined based on the examining.

Determining the channel transfer function in step 210 of FIG. 9 may be done by directly measuring it. For example, a transmitter on one end of the communications channel, such as at CO 12 (in FIG. 1) or in well-logging instrumentation 18 (in FIG. 1A), may be directed to send a signal or a series of signals with predetermined intensities as a function of frequency, with which the a receiver at the other end of the channel may measure the attenuation, and perhaps also the phase shift, as a function of frequency. The measurement may be extended to determine nonlinear responses of the channel by repeating the measurement with varying source strengths. Alternately, the channel characteristics may be determined in advance of the communication and stored, for example in a database at the CO or in a memory on a DSL card. Determining the channel transfer function could then entail receiving it from the CO, the local memory storage, or other storage locations. In the case where the invention is used in a subscriber line system, receiving the channel transfer function from the CO is particularly useful since the CO may rapidly look up pre-stored information on the particular physical line being used for the communications channel.

Similarly, the amount of self interference may be determined in step 220 of FIG. 9 by receiving it or, if transmitter/receiver pairs are accessible on the other same-service channels, by measuring it. Determining the amount of self interference in step 220 may comprise determining a total self interference power, or a power distribution, or a coupling coefficient from the other same-service channels into the channel of interest, or a coupling coefficient with frequency dependence (such as a self-interference transfer function) from the other same-service channels into the channel of interest, or a combination of these characteristics, among others. The amount of self interference may also include a characterization of the self interference in terms of self-NEXT and self-FEXT interference. In a preferred embodiment of the invention, step 220 includes determining a self-NEXT transfer function and a self-FEXT transfer function from the other same-service channels into the channel of interest.

FIG. 10–FIG. 12 show various embodiments 240*a*–*c* of step 240, in which the transmit spectrum is determined.

In one embodiment of the invention, as shown in steps 241 and 245 of FIG. 10, determining the transmit spectrum in step 240 comprises determining an EQPSD transmit spectrum if the amount of self interference is substantially low or negligible. An EQPSD transmit spectrum is a transmit spectrum in which EQPSD signaling is used on at least one portion of the available spectrum of communication frequencies.

The method may also include steps 242 and 247, in which an EQPSD/FDS transmit spectrum is found if the amount of self interference is substantially high or non-negligible.

In general, an EQPSD/FDS transmit spectrum has a number of frequency regions in which EQPSD signaling is used, and a number of frequency regions in which FDS signaling is used. The locations of these regions in the available spectrum of communication frequencies and the transmission power as a function of frequency are preferably determined so that the data transmission rate on the channel is substantially maximized. An EQPSD/FDS transmit spectrum preferably includes at least one portion using FDS signaling and one portion using FDS signaling, but in a degenerate case, the maximization may be achieved by using only EQPSD or only FDS signaling. An EQPSD/FDS transmit spectrum is thus a transmit spectrum in which the available spectrum of communication frequencies includes at least one portion using EQPSD signaling or FDS signaling.

Still further, the method may also include step 249, in which an EQPSD/FDS/MFDS transmit spectrum is found if the amount of self interference is substantially high or non-negligible and if the amount of self-FEXT interference is substantially high. In multi-line FDS (MFDS) signaling, different channels carrying the same or similar services are orthogonally separated to reduce crosstalk interference.

In general, an EQPSD/FDS/MFDS transmit spectrum has a number of frequency regions in which EQPSD signaling is used, a number of frequency regions in which FDS signaling is used, and a number of frequency regions in which MFDS signaling is used. Again, the locations of these regions in the available spectrum of communication frequencies and the transmission power as a function of frequency are preferably determined so that the data transmission rate on the channel is substantially maximized. An EQPSD/FDS/MFDS transmit spectrum preferably includes at least one portion using FDS signaling, one portion using FDS signaling, and one portion using MFDS signaling, but in a degenerate case, the maximization may be achieved by using only EQPSD or only FDS or only MFDS signaling. An EQPSD/FDS/MFDS transmit spectrum is thus a transmit spectrum in which the available spectrum of communication frequencies includes at least one portion using EQPSD signaling or FDS signaling or MFDS signaling.

In another embodiment of the invention, as shown in FIG. 11, determining the transmit spectrum in step 240 comprises determining an EQPSD transmit spectrum (in step 245) if the amount of self interference is substantially low or negligible (according to step 241), and determining an EQPSD/FDS/MFDS transmit spectrum (in step 249) if the amount of self interference is substantially high or non-negligible.

In yet another embodiment of the invention, as shown in FIG. 12, determining the transmit spectrum in step 240 comprises determining an EQPSD/FDS/MFDS transmit spectrum (in step 249). For the degenerate cases in which only one or two of the EQPSD, FDS, and MFDS signaling techniques are needed for maximizing the data transmission rate, the EQPSD/FDS/MFDS transmit spectrum will reduce to the appropriate signaling techniques.

In a preferred embodiment of the invention, the method further comprises a step of determining an amount of uncorrelated interference, such as additive Gaussian noise (AGN), into the communications channel. If one or more of the other communications channels carry a different type of service than the service on the communications channel, then the uncorrelated interference may include different-service interference (DSIN) from the other communications channels carrying the different service. Thus, the uncorrelated interference includes a total noise interference that preferably comprises AGN, DSIN, and other noise and interference whose spectral characteristics are not controlled by the user. Determining the transmit spectrum in step 240 is then performed in response to the amount of uncorrelated interference.

FIG. 13–FIG. 14—Method for Transmitting Data

FIG. 13 is a flowchart of a method for transmitting data according to one embodiment of the present invention. This method may be used in communicating data on a communications channel when the communications channel is subject to interference from one or more other communications channels. The other communications channels may be located proximate to the communications channel, for example, in the case of multiple subscriber lines in a binder group of a telephone cable, or in the case of multiple radio transmission systems with closely located transmitters or overlapping coverage regions. The communications channel of interest carries a particular type of service, such as xDSL, ISDN, T1, or spread-spectrum, for example. The method comprises the steps of determining a channel transfer function of the communications channel in step 310, initiating a data transfer on the communications channel in step 320, and transferring the data on the communications channel using the transmit spectrum in step 330. As shown in FIG. 14, the step 320 of initiating the transfer comprises determining interference characteristics of the interfering communications channels in step 322, and determining a transmit spectrum in response to the channel transfer function and the interference characteristics in step 324.

As discussed earlier, step 310 of determining the channel transfer function may comprise measuring the channel transfer function, receiving the channel transfer function, or determining the channel transfer function through other means. The channel transfer function may be determined at power-up of a transmission system, or at regular intervals in time, or in response to temperature changes, or at other appropriate times.

The transmit spectrum is preferably determined in step 324 to substantially maximize the data transmission rate for the communications channel, so that the maximum information may be communicated per unit time on the communications channel in light of the various sources of noise and interference. The transmit spectrum is also preferably determined in such a manner that the communications channel has equal upstream and downstream capacities, and that the transmit spectrum is spectrally compatible (that is, determined with regard to spectral compatibility) with the one or more other communications channels.

In one embodiment of the present invention, the transmit spectrum is preferably determined so that it satisfies a predetermined average power constraint for the communications channel. Note that if the channel capacities depend on the transmit spectra of other lines carrying the same service, for example in the case of self interference, then the water filling technique may be carried out as described in reference [16]. If the channel capacity depends on channel noise and/or different-service interference, then the classical water-filling technique is used, as described in [14]. The transmit spectrum is preferably determined dynamically so that it may be optimized in response to changing interference conditions or a changing channel transfer function.

In another embodiment of the invention, the transmit spectrum is determined so that it satisfies both a predetermined average power constraint and a predetermined peak power constraint for the communications channel, and may be determined using a peak constrained water-filling technique. Note that if the channel capacities depend on the transmit spectra of other lines carrying the same service, for example in the case of self interference, then the peak constrained water filling technique may be carried out as described in section 4.8.3 (which presents a modification of the technique discussed in [16]). If the channel capacity depends on channel noise and/or different-service interference, then the peak constrained water-filling technique is used, as described in section 4.8.2. The transmit spectrum is preferably determined dynamically so that it may be optimized in response to changing interference conditions or a changing channel transfer function.

In another embodiment of the invention, the transmit spectrum is determined so that it satisfies only a predetermined peak power constraint for the communications channel, and may be determined using a peak constrained water-filling technique.

Dynamical determination of transmit masks

In a preferred embodiment of the invention, steps 322 and 324 of determining the interference characteristics and of determining the transmit spectrum are performed more than once so that the transmit spectrum is modified appropriately as the interference characteristics change in time. These steps 322 and 324 may be performed each time a data transfer is initiated. Or, if step 330 of transferring data occurs repeatedly at regular or irregular intervals in time, then steps 322 and 324 of determining the interference characteristics and of determining the transmit spectrum are preferably performed prior to each occurrence of transferring data in step 330. In one embodiment of the invention, a new transfer function or a new set of interference characteristics may be determined during a data transfer and used to calculate a new transmit spectrum. The new transmit spectrum may then be used in a subsequent portion of the data transfer. These measures of dynamically determining the transfer function enhance the data transfer by allowing the transfer function to adapt as the characteristics of the communications channel change in time.

Orthogonality for upstream/downstream separation and multi-line separation

In one embodiment of the present invention, the transmit spectrum is determined so that it specifies a pair of complimentary spectra: one for transmission in each of the two directions on the communications channel. These two spectra may be called the "upstream transmit spectrum" and the "downstream transmit spectrum." For example, in the case where the channel provides communication between home 10 and CO 14, the transmit spectrum used in transmission from home 10 may be designated the upstream transmit spectrum, while the transmit spectrum used in transmission from CO 14 may be designated the downstream transmit spectrum. Similarly, in other cases, such as a well-logging or a multiple-radio-transmitter embodiment, "upstream" and "downstream" indicate opposite directions of transmission as desired.

The upstream and downstream transmit spectra may include one or more regions of the spectrum that use FDS signaling. In these regions, the upstream and downstream transmit spectra are orthogonal with respect to each other. In a preferred embodiment of the present invention, this duplexing orthogonality is achieved by choosing two non-overlapping frequency subregions in the FDS region, using one of the subregions for upstream signaling, and using the other subregion for downstream signaling. More generally, the FDS region may be constructed by choosing two non-overlapping sets of frequency subregions in the FDS region, using one of the sets for upstream signaling, and using the other set for downstream signaling. In another embodiment of the invention the duplexing orthogonality is achieved by using code division signaling (CDS) to separate the upstream and downstream signals in the "FDS" region. In this embodiment, one access code is used in upstream signaling, and a second, orthogonal, access code is used in downstream signaling.

It is noted that there is an additional benefit to these transmit spectra with one or more regions of FDS signaling: as would be appreciated by one skilled in the art of communications electronics, using regions of orthogonally separated upstream and downstream signaling may reduce the overhead of echo cancellation.

The method indicated in FIG. 13 and FIG. 14 may be used in communicating data on a communications channel in a situation where one or more of the other communications channels carries the same type of service as the communications channel. Under such a condition, step 322 of determining interference characteristics preferably includes determining an amount of self interference into the communications from the other same-service communications channels. Step 324 of determining the transmit spectrum may then include examining the channel transfer function and the amount of self interference. The transmit spectrum is then preferably determined in step 324 in response to the channel transfer function and the amount of self interference.

In another embodiment of the present invention, the transmit spectrum is determined so that it specifies a number M of complimentary spectra: one for transmission on each of M channels in a subset of the one or more of the other communications channels that carry the same type of service. These M transmit spectra may include one or more regions of the spectrum that use MFDS signaling. In these regions, the M transmit spectra are orthogonal with respect to each other. In one embodiment of the present invention, this multi-line orthogonality is achieved by choosing M non-overlapping frequency subregions in the MFDS region, and using one of the subregions for transmission on each of the M lines. More generally, the MFDS region may be constructed by choosing M non-overlapping sets of frequency subregions in the MFDS region, and using one of the sets for transmission on each of the M channels. In another embodiment of the invention, the multi-line orthogonality is achieved by using multi-line code division signaling (multi-line CDS) in the "MEDS" region. In this embodiment, different orthogonal access codes are used on each of the M channels.

In another embodiment of the present invention, the transmit spectrum is determined so that it specifies a number M'(>M) of complimentary spectra: one for transmission on each of M channels in the subset of same-service channels, and additional spectra to provide orthogonal duplex separation on one or more of the M channels. These M' transmit spectra may include one or more regions of the spectrum that use FDS signaling as well as one or more regions of the spectrum that use MFDS signaling.

In a preferred embodiment of the invention, determining the amount of self interference comprises determining (1) a self-NEXT transfer function and (2) a self-FEXT transfer function that describe the coupling from near-end and far-end transmitters, respectively, on the other same-service communications channels. In this preferred embodiment determining the interference characteristics in step 322 further comprises determining an amount of uncorrelated interference arising from factors such as additive Gaussian noise (AGN) and crosstalk from one or more different-service channels, which carry a type of service different than the service on the channel of interest, among the one or more other channels. The transmit spectrum is then determined in response to the channel transfer function, an average power constraint or requirement for the channel, the self-NEXT and the self-FEXT transfer functions, and the amount of uncorrelated interference. In regions of the communications spectrum where the self interference is substantially low, the transmit spectrum is determined to be an EQPSD transmit spectrum. In regions where the self-NEXT interference is substantially high and the self-FEXT interference is not substantially high, the transmit spectrum is determined to be an FDS transmit spectrum. And in regions where the self-FEXT interference is substantially high, the transmit spectrum is determined to be an MFDS transmit spectrum. Some specific examples of techniques for determining regions of EQPSD, FDS, and MFDS signaling are presented below.

In other embodiments of the invention, determining the interference characteristics in step 322 includes determining some but not all of the self-NEXT and the self-FEXT transfer functions, and the amount of uncorrelated interference and the average power constraint or requirement for the channel may or may not be determined. The transmit spectrum is then determined in response to the channel transfer function and the determined quantities, and is preferably optimized in response to these quantities.

In one embodiment of the present invention, the transmit spectrum is determined in response to one or more characteristics of the communications channel and the sources of noise or crosstalk. Determining these characteristics comprises steps such as determining the channel transfer function, determining the self-NEXT transfer function, and determining the self-FEXT transfer function. In one preferred embodiment, the transmit spectrum is determined in response to the power-transfer characteristics of the communications channel, so determining these characteristics preferably comprises determining only the squared modulus of the mathematical transfer functions. Thus, in this preferred embodiment, determining the channel transfer function means determining the function $H(f) \equiv |H_C(f)|^2$, determining the self-NEXT transfer function means determining the function $X(f) \equiv |H_N(f)|^2$, and determining the self-FEXT transfer function means determining the function $F(f) \equiv |H_F(f)|^2$. In this preferred embodiment, the phases of the transfer functions $H_C(f)$, $H_N(f)$, and $H_F(f)$ may or may not be determined in addition to their squared modulii. In the case where a distinction is to be made between the various functions for different lines, the subscript i is used to indicate the different lines (as in $H_i(f)$, $X_i(f)$, and $F_i(f)$) with channel number i=1 being the channel for which the transmit spectrum is being determined.

Another characteristic of the communications channel and the sources of noise or crosstalk is the signal to noise ratio $G_i(f)$. In the case where a distinction is to be made between different lines, $G_i(f)$ indicates, at a frequency $f$; the ratio of the signal (specifically, the signal power spectral density at f) in channel number i to the noise (specifically, the noise spectral density at $f$) in channel number 1. Here, channel number i=1 is the channel for which the transmit spectrum is being determined, and channel number i (for i>1) is another channel that carries the same type of service as channel number 1, and which may provide interference into channel number 1.

Method for Determining Transmission Characteristics with Frequency Binning

Another embodiment of the present invention comprises a method for determining a transmit spectrum for use in communicating data on a communications channel, preferably by determining signaling techniques in one or more frequency bins in the available frequency band of the communications channel. This method is outlined in the flowchart of FIG. 15. This method may be used in communicating data on a communications channel when the communications channel is subject to interference from one or more other communications channels, some of which carry the same type of service as the communications channel of interest. Additionally, some of the other communications channels may carry different types of service than the communications channel of interest.

The first steps in this method comprise determining a channel transfer function of the communications channel 410. An amount of self interference 420 into the communications channel from the other communications channels carrying the same type of service is determined in step 420. An additional amount of uncorrelated interference is preferably determined in step 425. In step 430, the transfer function and the amount of self interference are examined, preferably along with the amount of uncorrelated interference. In step 440 a transmit spectrum for the channel is determined based on the examining.

In a preferred embodiment of the method, the transmit spectrum is determined in step 440 so that different signaling techniques may be used in different frequency ranges in the communications band. These frequency ranges, or frequency bins, are non-overlapping ranges of the frequency spectrum, preferably with uniform frequency widths, and preferably chosen so that they cover the communications band. In other embodiments of the present invention, the frequency bins have non-uniform widths or do not cover the entire communications band.

In this embodiment of the invention, the transmit spectrum operates to specify an amount of transmission power used in each frequency bin for at least one direction of communication on at least one communications channel. The amount of transmission power in each bin is preferably determined by a water-filling technique or a peak constrained water-filling technique.

In one embodiment of the invention, in a given frequency bin the transmit spectrum specifies EQPSD signaling if the amount of self interference is substantially low in that bin, and FDS signaling if the amount of self interference is substantially high in that bin.

In one embodiment of the invention, in a given frequency bin the transmit spectrum specifies MFDS signaling if the amount of self-FEXT interference is substantially high in that bin. Otherwise, the transmit spectrum specifies EQPSD signaling if the amount of self-NEXT interference is substantially low in that bin, and FDS signaling if the amount of self-NEXT interference is substantially high in that bin.

Under certain conditions, this method of the present invention may determine a transmit spectrum that includes one or more regions of neighboring bins using FDS signaling. In one embodiment of the present invention, the step of determining a transmit spectrum comprises determining a discrete FDS transmit spectrum in such regions of neighboring FDS bins. In the discrete FDS transmit spectrum, each bin has two subregions; one is used for transmission in the upstream direction, and one for transmission in the downstream direction. In another embodiment of the present invention, the step of determining a transmit spectrum comprises determining a contiguous FDS transmit spectrum in such regions of neighboring FDS bins. In the contiguous FDS transmit spectrum, the neighboring frequency bins are grouped into two sets of neighboring bins, one of the sets is used for transmission in the upstream direction, and the other set is used for transmission in the downstream direction. In one embodiment of the invention, the two sets of neighboring bins are chosen so that the contiguous FDS transmit spectrum provides equal upstream and downstream signaling capacities. Alternatively, the two sets of neighboring bins may be chosen so that the contiguous FDS transmit spectrum provides equal upstream and downstream average power. In a preferred embodiment, the two sets of neighboring bins are chosen so that the contiguous FDS transmit spectrum provides equal upstream and downstream signaling capacities and equal upstream and downstream average powers.

Similarly, under certain conditions, this method of the present invention may determine a transmit spectrum that includes one or more regions of neighboring bins using MFDS signaling. In one embodiment of the present invention, the step of determining a transmit spectrum comprises determining a discrete MFDS transmit spectrum in such regions of neighboring MFDS bins. In the discrete MFDS transmit spectrum, each bin has M subregions. Each of the M subregions is used for bi-directional transmission on one of the M same-service channels. In another embodiment of the present invention, the step of determining a transmit spectrum comprises determining a contiguous MFDS transmit spectrum in such regions of neighboring MFDS bins. In the contiguous MFDS transmit spectrum, the neighboring bins are grouped into M sets of neighboring bins. Each of the M sets of frequency bins is used for bi-directional transmission on one of the M same-service channels. The M sets of neighboring bins are preferably chosen so that the contiguous MFDS transmit spectrum provides equal signaling capacities on the M channels.

If the channel transfer function and the interference characteristics are substantially monotonic in frequency, the determination of which frequency bins use a particular type of signaling may be simplified by determining frequency values at which the different types of interference become substantially large or substantially small. Thus, in one embodiment of the present invention, determining the transmit spectrum in step 440 includes one or more steps of identifying "transition bins" that mark the endpoints (in the frequency spectrum) of different types of signaling techniques. These transitions bins may be rapidly identified by searching for bins in which certain characteristic quantities meet particular predetermined criteria. These searches, which are preferably implemented as binary searches, may be carried out in the step 430 of examining the channel transfer function and interference. The following list is a sample of transition bins that may be identified.

$M_E$: for bins with center frequencies < or $\leq$ the center frequency of $M_E$, EQPSD signaling is used.

$M_F$: for bins with center frequencies > or $\geq$ the center frequency of $M_F$, FDS signaling is used.

$M_{E2F}$: for bins with center frequencies < or $\leq$ the center frequency of $M_{E2F}$, EQPSD signaling is used, and FDS signaling is used in higher-frequency bins. In other words, $M_{E2F}$ indicates a transition from EQPSD signaling to FDS signaling.

$M_{E2MFDS}$: indicates a transition from EQPSD signaling to MFDS signaling.

$M_{MDS2FDS}$: indicates a transition from MFDS signaling to FDS signaling.

$M_{E2MFDS}$: indicates a transition from EQPSD signaling to FDS signaling.

Similarly, transition frequencies may be defined for particular frequencies that mark transitions from one form of signaling to another. For example, $f_{E2F}$ represents a transition frequency where EQPSD is used in a region with frequency less than $f_{E2F}$, and, and FDS signaling is used in a region with frequency less than $f_{E2F}$.

4 New, Optimized Signaling Techniques

The proposed techniques combine a number of ideas into one signaling system that optimizes its performance given many different possible combinations of interferers. These ideas include:

1. Given expressions for the crosstalk from other services (DSIN-NEXT and DSIN-FEXT) into an xDSL channel and channel noise (AGN), our scheme computes the optimal distribution of power across frequency that maximizes the capacity (see Section 4.4). This distribution uses the same transmit spectrum (EQPSD signaling) in both upstream and downstream directions.

2. Given expressions for the self-NEXT and self-FEXT crosstalk in an xDSL channel along with interference from other services (DSIN-NEXT and DSIN-FEXT) and channel noise (AGN), our scheme computes the optimal distribution of power across frequency that maximizes the capacity. This distribution involves equal PSD (EQPSD) signaling in frequency bands with low self-interference, orthogonal signaling (FDS) in frequency bands where self-NEXT dominates other interference sources (Section 4.5), and orthogonal signaling (multi-line FDS introduced in Section 4.3) in frequency bands where self-FEXT is high (Section 4.6).

3. Given different channel, noise, and interference characteristics between lines, our scheme chooses the optimal signaling strategy (EQPSD, FDS or multi-line FDS) in each frequency bin (see Section 4.7) to maximize the channel capacity.
4. Given an additional peak-power constraint in frequency, our scheme computes the optimal transmit spectra that maximize the capacity and choose the optimal joint signaling strategy (EQPSD, FDS and multi-line FDS) for a given channel, noise and interference characteristics (see Sections 4.8 and 4.9).
5. We present optimal and near-optimal signaling strategies in case of non-monotonic channel, self-NEXT and self-FEXT transfer functions (see Section 4.10 on bridged taps).

We will present the above ideas in the following sections in the context of a generic xDSL line carrying symmetric-data rate services like HDSL2, "GDSL", and "VDSL2" services. Note that the techniques developed here can be applied to a more general communications channel with interference characteristics characterized by self-interference and different-service interference models. Further, we can extend this work to apply to channels that support asymmetric data rates (different in each direction) (see Section 4.11), for e.g., ADSL, and VDSL. We can follow a similar approach of binning in frequency and then analyzing the signaling strategy in each bin. In the asymmetrical data-rate case, the ratio of the average power between upstream and downstream directions needs to be known.

We will present background material and our assumptions in Section 4.1. In Section 4.2 we give details about the interference models and the simulation conditions. Section 4.3 looks at the various signaling schemes we will employ. We will present the optimal transmit spectrum using EQPSD signaling in Section 4.4 in the presence of only different-service interference and AGN. Sections 4.5 and 4.6 detail the new signaling strategies to obtain an optimal and/or suboptimal transmit spectrum in the presence of self-interference, different-service interference and AGN. Section 4.7 derives some results applicable when neighboring lines vary in channel, noise and interference characteristics. Sections 4.8, and 4.9 present optimal transmit spectra under additional peak-power constraint in frequency. We present optimal and near-optimal signaling schemes for non-monotonic channel, self-NEXT, and self-FEXT transfer functions in Section 4.10. We discuss optimal signaling for asymmetrical data-rate channels in Section 4.11. Finally, Section 4.12 presents several new ideas, extending the results presented here.

Note: All the transmit spectra are optimal (i.e., yield the maximum possible bit rates or performance margins) given the assumptions in Section 4.1 (see Sections 4.4.2, 4.5.3, and 4.6.3 for additional assumptions) and that one of the specific joint signaling strategies is employed over the channel (see Sections 4.4, 4.5, and 4.6).

4.1 Assumptions, Notation, and Background

We present background material and some of the standard assumptions made for simulations. These assumptions apply throughout the document unless noted otherwise.
1. Channel noise can be modeled as additive Gaussian noise (AGN) [13].
2. Interference from other services (DSIN-NEXT and DSIN-FEXT) can be modeled as additive colored Gaussian noise [13].
3. We assume the channel can be characterized as a LTI (linear time invariant) system. We divide the transmission bandwidth B of the channel into narrow frequency bins of width W (Hz) each and we assume that the channel, noise and the crosstalk characteristics vary slowly enough with frequency that they can be approximated to be constant over each bin (For a given degree of approximation, the faster these characteristics vary, the more narrow the bins must be. By letting the number of bins K→∞, we can approximate any frequency characteristic with arbitrary precision).[1] We use the following notation for line i on the channel transfer function [10].

[1] We divide the channel into narrow frequency bins (or subchannels) for our analysis only. This does not necessarily mean that we need to use DMT as the modulation scheme.

$$|H_C(f)|^2 = \begin{cases} H_{i,k} & \text{if } |f - f_k| \leq \frac{W}{2}, \\ 0 & \text{otherwise,} \end{cases} \quad (1)$$

self-NEXT transfer function [8]

$$|H_N(f)|^2 = \begin{cases} X_{i,k} & \text{if } |f - f_k| \leq \frac{W}{2}, \\ 0 & \text{otherwise,} \end{cases} \quad (2)$$

and self-FEXT transfer function [9]

$$|H_F(f)|^2 = \begin{cases} F_{i,k} & \text{if } |f - f_k| \leq \frac{W}{2}, \\ 0 & \text{otherwise.} \end{cases} \quad (3)$$

Here $f_k$ are the center frequencies (see FIGS 16 and 17) of the K subchannels (bins) with index $k \in \{1, \ldots, K\}$. We will employ these assumptions in Sections 4.5.4, 4.6.6, 4.6.8 and 4.7.1. The DSIN-NEXT and DSIN-FEXT transfer functions are also assumed to vary slowly enough that they can be similarly approximated by a constant value in each frequency bin. Note that the concept of dividing a transfer function in frequency bins is very general and can include nonouniform bins of varying widths or all bins of arbitrary width (i.e., the bins need not be necessarily narrow).
4. Echo cancellation is good enough that we can ignore crosstalk from $T_i^o$ into $R_i^o$. We can relax this assumption in some cases where spectral regions employ FDS signaling (see Sections 4.5, 4.6, 4.7, 4.9, and 4.10).
5. All sources of DSIN-NEXT can be lumped into one PSD $DS_N(f)$ and all sources of DSIN-FEXT can be lumped into one PSD $DS_F(f)$.
6. All sources of self-NEXT can be added to form one overall self-NEXT source.
7. All sources of self-FEXT can be added to form one overall self-FEXT source.
8. Spectral optimization is done under the average input power constraint, i.e., the average input power is limited to $P_{max}$ (Watts).
9. The PSDs of the upstream and downstream transmission directions can be written using the notation introduced in Section 1.3.2. There are M interfering lines carrying the same service with index $i \in \{1, \ldots, M\}$. Denote the direction of transmission with index $o \in \{u, d\}$, with u=upstream (to CO) and d=downstream (from CO). Denote the upstream and downstream PSDs on line i as:

$S_i^u(f)$: PSD on twisted pair i in upstream direction u.
$S_i^d(f)$: PSD on twisted pair i in downstream direction d.
Further, we denote the upstream and downstream PSD on line i in a generic frequency bin (or subchannel) k as:
$s_i^u(f)$: PSD on twisted pair i in upstream direction u.

$s_i^d(f)$: PSD on twisted pair i in downstream direction d. Note: When we refer to $s_i^o(f)$ we mean PSD on twisted pair i in a generic bin, demodulated to baseband ($f\in[-W, W]$) for ease of notation. When we refer to $s^o(f)$ we mean PSD on a generic twisted pair in a generic bin, demodulated to baseband ($f\in[-W, W]$) for ease of notation.

10. We assume a monotone decreasing channel transfer function. However, in case the channel transfer function is non-monotonic (e.g., in the case of bridged taps on the line), our optimization techniques can be applied in each individual bin independently. This scenario makes the power distribution problem more difficult however (see Section 4.10).

11. We assume we desire equal channel capacities in upstream and downstream directions (except when the channel, noise, and interference characteristics between lines vary as in Section 4.7).

4.2 Interference models and simulation conditions

The interference models for different services have been obtained from Annex B of T1.413-1995 ([9], the ADSL standard), with exceptions as in T1E1.4/97-237 [7]. The NEXT coupling model is 2-piece Unger model as in T1E1.4/95-127 [8]. BER was fixed at $10^{-7}$. Our optimal case results were simulated using Discrete Multitone Technology (DMT) and were compared with that of MONET-PAM[1]. MONET-PAM uses Decision Feedback Equalizers (DFE) [20] in the receivers along with multi-level pulse amplitude modulation (PAM) scheme. The margin calculations for DFE margins were done per T1E1.4/97-180R1 [11], Section 5.4.2.2.1.1. AGN of power −140 dBm/Hz was assumed in both cases. MONET-PAM uses PAM with 3 bits/symbol and a baud rate of fbaud=517.33 ksymbols/s. The actual upstream and downstream power spectra can be obtained from [1]. MONET-PAM spectra is linearly interpolated from 2×1552/3 Hz sampled data. The PAM line-transformer hpf corner, that is, the start frequency is assumed to be at 1 kHz. A 500 Hz rectangular-rule integration is carried out to compute margins. The required DFE SNR margin for $10^{-7}$ BER is 27.7 dB.

To implement our optimal signaling scheme, we used DMT with start frequency 1 kHz and sampling frequency of 1 MHz. This gives us a bandwidth of 500 kHz and 250 carriers with carrier spacing of 2 kHz. No cyclic prefix (used to combat intersymbol interference (ISI)) was assumed, so the DMT symbol rate is same as the carrier spacing equal to 2 kHz. However, the scheme can easily be implemented by accounting for an appropriate cyclic prefix. The addition of cyclic prefix lowers the symbol rate and hence lowers the transmission rate. No limit was imposed on the maximum number of bits per carrier (this is often done for simulations). Even with a 15 bits/carrier limit, the results should not change very much, as some of the test runs show.

4.3 Signaling schemes

The joint signaling techniques used in the overall optimized signaling schemes use one of the basic signaling schemes (see FIG. 18) in different frequency bins depending on the crosstalk and noise combination in those bins.

FIG. 18 illustrates the three signaling schemes: EQPSD, FDS and multi-line FDS (in the case of three lines).[2] The Figure shows in frequency bin k the PSDs for each case (recall the notation introduced in Section 4.1, Item 9):

[2]The signaling schemes EQPSD, FDS, and multi-line FDS work in general for M lines.

When crosstalk and noise are not significant in a frequency bin, EQPSD signaling is preferred as it achieves higher bit rate than the other two orthogonal signaling schemes (see Section 4.5.5). In EQPSD signaling, the upstream and downstream PSDs are the same ($s_i^u(f)=S_i^d(f)$).

When self-NEXT is high and self-FEXT is low in a bin and there are a large number of neighboring lines carrying the same service together, FDS signaling yields the highest bit rates by eliminating self-NEXT (we prove this in Section 4.5.5). In FDS signaling, each frequency bin is further divided into two halves, with all the upstream PSDs being same for all the lines and all the downstream PSDs being same for all the lines ($s_i^u(f)\perp s_i^d(f)$). This type of orthogonal signaling completely eliminates self-NEXT but does not combat self-FEXT.

In frequency bins where self-FEXT is high, using FDS is not sufficient since self-FEXT still exists. In this case, doing multi-line FDS eliminates self-FEXT as well as self-NEXT and this achieves the highest bit rates when there are only a few lines and self-FEXT is high and dominant over self-NEXT (we prove this in Section 4.6). In multi-line FDS signaling each line gets a separate frequency slot (W/M for M lines carrying the same service) in each bin and the upstream and downstream PSDs for each line are the same ($s_i^o(f)\perp s_j^o(f)$ $\forall j\neq i$, $o\in\{u, d\}$).

We will see in future sections the exact relationships that allow us to determine which scheme is optimal given an interference and noise combination.

4.4 Optimization: Interference from Other Services (DSIN-NEXT and DSIN-FEXT)—Solution: EQPSD signaling In this scenario, each xDSL line experiences no self-interference (FIG. 19 with neither self-NEXT nor self-FEXT). There is only DSIN-NEXT and DSIN-FEXT from other neighboring services such as T1, ADSL, HDSL, etc., in addition to AGN. The solution is well known, but will be useful later in the development of the subsequent novel (Sections 4.5, 4.6, 4.7, and 4.12) signaling schemes.

4.4.1 Problem statement

Maximize the capacity of an xDSL line in the presence of AGN and interference (DSIN-NEXT and DSIN-FEXT) from other services under two constraints:

1. The average xDSL input power in one direction of transmission must be limited to $P_{max}$ (Watts).
2. Equal capacity in both directions (upstream and downstream) for xDSL.

Do this by designing the distribution of energy over frequency (the transmit spectrum) of the xDSL transmission.

4.4.2 Additional assumption

We add the following assumption to the ones in Section 4.1 for this case:

12. Both directions (upstream and downstream) of transmission experience the same channel noise (AGN) and different service interference (DSIN-NEXT and DSIN-FEXT).

4.4.3 Solution

Consider a line (line 1) carrying xDSL service. Line 1 experiences interference from other neighboring services (DSIN-NEXT and DSIN-FEXT) and channel noise $N_c(f)$ (AGN) but no self-NEXT or self-FEXT (see FIG. 19).

The DSIN-NEXT and DSIN-FEXT interference can be modeled as colored Gaussian noise for calculating capacity [13]. Recall that $DS_N(f)$ is the PSD of the combined DSIN-NEXT and let $DS_F(f)$ is the PSD of the combined DSIN-FEXT. Let $S^u(f)$ and $S^d(f)$ denote the PSDs of line 1 upstream (u) direction and downstream (d) direction transmitted signals respectively. Further, let $C^u$ and $C^d$ denote the upstream and downstream direction capacities of line 1 respectively. Let $H_C(f)$ denote the channel transfer function of line 1. The twisted pair channel is treated as a Gaussian channel with colored Gaussian noise. In this case the channel capacity (in bps) is given by [14]

$$C^u = \sup_{S^u(f)} \int_0^\infty \log_2\left[1 + \frac{|H_C(f)|^2 S^u(f)}{N_o(f) + DS_N(f) + DS_F(f)}\right] df \text{ and} \quad (4)$$

$$C^d = \sup_{S^d(f)} \int_0^\infty \log_2\left[1 + \frac{|H_C(f)|^2 S^d(f)}{N_o(f)) + DS_N(f) + DS_F(f)}\right] df. \quad (5)$$

The supremum is taken over all possible $S^u(f)$ and $S^d(f)$ satisfying $$S^u(f) \geq 0 \forall f, \; S^d(f) \geq 0 \forall f,$$

and the average power constraints for the two directions $$2\int_0^\infty S^u(f) df \leq P_{\max}, \text{ and } 2\int_0^\infty S^d(f) df \leq P_{\max}. \quad (6)$$

It is sufficient to find the optimal $S^u(f)$ which gives $C^u$, since setting $S^d(f)=S^u(f)\forall f$, gives the capacity $C^d=C^u$ as seen from (4) and (5). Thus, the optimal upstream and downstream channel capacities are equal ($C^u=C^d$).

The optimal power distribution in this case is obtained by the classical "water-filling" technique [16]. The optimal $S^u(f)$ is given by $$S_{opt}^u(f) = \begin{cases} \lambda - \dfrac{N_o(f) + DS_N(f) + DS_F(f)}{|H_C(f)|^2} & \text{for } f \in E \\ 0 & \text{otherwise,} \end{cases} \quad (7)$$

with λ a Lagrange multiplier and E the spectral region where $S^u(f) \geq 0$. We vary the value of λ such that $S_{opt}^u(f)$ satisfies with equality the average power constraint in (6). The equality is satisfied for a single value of λ giving us a unique optimal PSD $S_{opt}^u(f)$. Plugging the optimal PSD $S_{opt}^u(f)$ in (4) yields the capacity $C^u$ under the average power constraint. This procedure yields a unique optimal transmit spectrum $S_{opt}^u(f)$ [14].

Keynote: $S^d(f)=S^u(f)\forall f$—EQPSD signaling.

FIG. 20 gives a flowchart to obtain the optimal transmit spectrum using only EQPSD signaling in the presence of DSIN-NEXT, DSIN-FEXT and AGN. It uses the classic water-filling solution to obtain the transmit spectrum. The novelty is in applying this to xDSL scenario to achieve a dynamic transmit spectrum (different for each interference type).

The channel capacities can be calculated separately for each direction of transmission in case of nonuniform interference between the two directions, i.e., when the additional assumption in Section 4.4.2 does not hold. The transmit spectra in general will be different ($S^d(f) \neq S^u(f)$) for this case, but will still occupy the same bandwidth.

4.4.4 Examples

In this Section, we present some examples for the HDSL2 service. An average input power ($P_{max}$) of 20 dBm and a fixed bit rate of 1.552 Mbps was used for all simulations. The performance margin was measured in each simulation and the comparison with other static transmit spectra (obtained from static PSD masks) proposed is presented in Section 4.5.11. FIG. 21 shows the optimal upstream and downstream transmit spectrum for HDSL2 in the presence of DSIN-NEXT from 49 HDSL interferers and AGN (−140 dBm/Hz). Note the deep null in the transmit spectrum from approximately 80 to 255 kHz. This results from "water-filling"—the peak of the first main lobe of HDSL lies in the vicinity of 80 to 255 kHz.

FIG. 22 shows the optimal upstream and downstream transmit spectrum for HDSL2 in the presence of DSIN-NEXT from 25 T1 interferers and AGN (−140 dBm/Hz).

The optimal transmit spectra for the two cases are significantly different, evidence of the fact that the optimal transmit spectra will change depending on the nature of the interference.

Summary: Recall the discussion on static PSD masks of Section 3.1. We have seen that the optimal transmit spectrum varies significantly with the interference combination. The water-filling solution yields a unique transmit spectrum for each interference combination [14]. The optimal transmit spectrum adapts to minimize the effect of the interference combination. The optimal transmit spectra for upstream and downstream direction are the same (EQPSD signaling) and thus, employ the same average power in each direction.

4.5 Optimization: Interference from other services (DSIN-NEXT and DSIN-FEXT) plus self-interference (self-NEXT and low self-FEXT)—Solution: EQPSD and FDS signaling In this scenario each xDSL line experiences self-interference (high self-NEXT and low self-FEXT) in addition to AGN and DSIN-NEXT and DSIN-FEXT from other services (see FIG. 3) in a generic xDSL service. This is the case of interest for HDSL2 service.

4.5.1 Self-NEXT and self-FEXT rejection using orthogonal signaling

As we saw in Section 3.2, orthogonal signaling can completely reject self-NEXT. In addition, FDS gives better spectral compatibility with other services than other orthogonal schemes like CDS or TDS (see Section 4.5.12 for a proof). Therefore, we choose to use the FDS scheme for orthogonal signaling. Recall the FDS signaling tradeoff: FDS eliminates self-NEXT and therefore increases system capacity; however, FDS also reduces the bandwidth available to each transmitter/receiver pair and therefore decreases system capacity.

To eliminate self-FEXT using orthogonal signaling, we would force each upstream transmitter $T_i^u$ to be orthogonal to all other transmitters $T_j^u$, j≠i. Using multi-line FDS, we would separate each $T_i^u$ into different frequency bands. Unfortunately, this would reduce the bandwidth available to each transmitter to 1/M the overall channel bandwidth. In a typical implementation of HDSL2, M will lie between 1 and 49; hence orthogonal signaling (multi-line FDS) for eliminating self-FEXT is worth the decrease in capacity only when self-FEXT is very high. We will show later in Section 4.6 that multi-line FDS gives gains in capacity when there are only a few number of interfering lines carrying the same service (M=2 to 4)

In this scenario, we assume self-NEXT dominates self-FEXT and self-FEXT is not very high (see FIG. 17 and [8]), so we will design a system here with only self-NEXT suppression capability. However, self-FEXT still factors into our design in an important way. This is a new, non-trivial extension of the work of [3].

4.5.2 Problem statement

Maximize the capacity of an xDSL line in the presence of AGN, interference (DSIN-NEXT and DSIN-FEXT) from other services, and self-NEXT and self-FEXT under two constraints:

1. The average xDSL input power in each direction of transmission must be limited to $P_{max}$ (Watts), and
2. Equal capacity in both directions (upstream and downstream) for xDSL.

Do this by designing the distribution of energy over frequency (the transmit spectrum) of the up-stream and down-stream xDSL transmissions.

4.5.3 Additional assumptions

We add the following assumptions to the ones in Section 4.1 for this case:

12. The level of self-FEXT is low enough in all bins that it is not necessary to use orthogonal signaling between different transmitter/receiver pairs operating in the same direction (see Section 4.5.1).
13. All the M lines considered are assumed to have the same channel and noise characteristics and face the same interference combination (interference combination refers to combination of different interfering services) in both transmission directions (upstream and downstream). We will develop some results in Section 4.7 for when this does not hold true. Thus, we assume that the upstream PSDs of all lines are the same ($S^u(f)$) and the downstream PSDs of all lines are the same ($S^d(f)$). That is, $$S^u(f)=S_i^u(f), i\in\{1,\ldots,M\}$$

$$S^d(f)=S_i^d(f), i\in\{1,\ldots,M\} \qquad (8)$$

14. The coupling transfer functions of NEXT and FEXT interference are symmetrical between neighboring services. For example, each line has the same self-NEXT transfer function $H_N(f)$ and self-FEXT transfer function $H_F(f)$ for computing coupling of interference power with any other line. However, we develop some results in Section 4.7 when there are different NEXT and FEXT coupling transfer functions between lines.

4.5.4 Signaling scheme

Since the level of self-NEXT will vary with frequency (recall FIG. 17), it is clear that in high self-NEXT regions of the spectrum, orthogonal signaling (FDS, for example) might be of use in order to reject self-NEXT. However, in low self-NEXT regions, the loss of transmission bandwidth of FDS may outweigh any gain in capacity due to self-NEXT rejection. Therefore, we would like our signaling scheme to be general enough to encompass both FDS signaling, EQPSD signaling, and the spectrum of choices in between. Our approach is related to that of [3].

Key to our scheme is that the upstream and downstream transmissions use different transmit spectra. All upstream (to CO) transmitters $T_i^u$ transmit with the spectrum $S^u(f)$ All downstream (from CO) transmitters $T_i^d$ transmit with the spectrum $S^d(f)$ Implicit in our scheme is the fact that in this case, self-NEXT dominates self-FEXT and self-FEXT is small. If not, it would not be wise to constrain all $T_i^u$ to the same transmit PSD.

Our goal is to maximize the upstream capacity ($C^u$) and the downstream capacity ($C^d$) given an average total power constraint of $P_{max}$ and the equal capacity constraint $C^u=C_d$.

Consider the case of two lines with the same service. Line 1 upstream capacity is $C^u$ and line 2 downstream capacity is $C^d$. Under the Gaussian channel assumption, we can write these capacities (in bps) as $$C^u = \sup_{S^u(f),S^d(f)} \int_0^\infty \log_2\left[1+\frac{|H_C(f)|^2 S^u(f)}{N_o(f)+DS_N(f)+DS_F(f)+|H_N(f)|^2 S^d(f)+|H_F(f)|^2 S^u(f)}\right]df, \text{ and} \qquad (9)$$

$$C^d = \sup_{S^u(f),S^d(f)} \int_0^\infty \log_2\left[1+\frac{|H_C(f)|^2 S^d(f)}{N_o(f)+DS_N(f)+DS_F(f)+|H_N(f)|^2 S^u(f)+|H_F(f)|^2 S^d(f)}\right]df. \qquad (10)$$

The supremum is taken over all possible $S^u(f)$ and $S^d(f)$ satisfying $$S^u(f)\geq 0 \forall f,\ S^d(f)\geq 0 \forall f,$$

and the average power constraints for the two directions $$2\int_0^\infty S^u(f)df \leq P_{max}, \text{ and } 2\int_0^\infty S^d(f)df \leq P_{max}. \qquad (11)$$

We can solve for the capacities $C^u$ and $C^d$ using "water-filling" if we impose the restriction of EQPSD, that is $S^u(f)=S^d(f)\forall f$. However, this gives low capacities. Therefore, we employ FDS ($S^u(f)$ orthogonal to $S^d(f)$) in spectral regions where self-NEXT is large enough to limit our capacity and EQPSD in the remaining spectrum. This gives much improved performance.

To ease our analysis, we divide the channel into several equal bandwidth subchannels (bins) (see FIG. 16) and continue our design and analysis on one frequency bin k assuming the subchannel frequency responses (1)–(3). Recall that FIG. 17 shows that the channel and self-interference frequency responses are smooth and justifies our assuming them flat over narrow subchannels. For ease of notation, in this Section set $$H=H_{i,k},\ X=X_{i,k},\ F=F_{i,k} \text{ in (1)–(3)}, \qquad (12)$$

and $$N=N_o(f_k)+DS_N(f_k)+DS_F(f_k), \qquad (13)$$

the noise PSD in bin k. Note that N consists of both AGN plus any interference (DSIN-NEXT and DSIN-FEXT) from other services. Let $s^u(f)$ denote the PSD in bin k of line 1 upstream direction and $s^d(f)$ denote the PSD in bin k of line 2 downstream direction (recall the notation introduced in Section 4.1, Item 9). The corresponding capacities of the subchannel k are denoted by $c^u$ and $c^d$.

We desire a signaling scheme that includes FDS, EQPSD and all combinations in between in each frequency bin. Therefore we divide each bin in half[3] and define the upstream and downstream transmit spectra as follows (see FIG. 23):

[3]The power split-up in a bin does not necessarily have to be 50% to the left side of the bin and 50% to the right side of the bin as shown in FIG. 23. In general any 50%–50% power-complementary split-up between opposite direction bins will work.

$$s^u(f) = \begin{cases} \alpha 2\frac{P_m}{W} & \text{if } |f|\leq \frac{W}{2}, \\ (1-\alpha)2\frac{P_m}{W} & \text{if } \frac{W}{2}<|f|\leq W, \\ 0 & \text{otherwise} \end{cases} \qquad (14)$$

$$s^d(f) = \begin{cases} (1-\alpha)2\frac{P_m}{W} & \text{if } |f| \le \frac{W}{2}, \\ \alpha 2\frac{P_m}{W} & \text{if } \frac{W}{2} < |f| \le W, \\ 0 & \text{otherwise.} \end{cases} \quad (15)$$

Here $P_m$ is the average power over frequency range $[0, W]$ in bin k and $0.5 \le \alpha \le 1$. When $\alpha=0.5$, $s^u(f)=s^d(f) \forall f \in [0, W]$ (EQPSD signaling); when $\alpha=1$, $s^u(f)$ and $s^d(f)$ are disjoint (FDS signaling). These two extreme transmit spectra along with other possible spectra (for different values of $\alpha$) are illustrated in FIG. 23. The PSDs $s^u(f)$ and $s^d(f)$ are "symmetrical" or power complementary to each other. This ensures that the upstream and downstream capacities are equal ($c^u=c^d$). The factor a controls the power distribution in the bin, and W is the bandwidth of the bin.

Next, we show that given this setup, the optimal signaling strategy uses only FDS or EQPSD in each subchannel.

4.5.5 Solution: One frequency bin

If we define the achievable rate as $$R_A(s^u(f), s^d(f)) = \int_0^W \log_2\left[1 + \frac{s^u(f)H}{N + s^d(f)X + s^u(f)F}\right] df, \quad (16)$$

then $$c^u = \max_{0.5 \le \alpha \le 1} R_A(s^u(f), s^d(f)) \quad (17)$$

and $$c^d = \max_{0.5 \le \alpha \le 1} R_A(s^d(f), s^u(f)).$$

Due to the power complementarity of $s^u(f)$ and $s^d(f)$, the channel capacities $c^u$ and $c^d$ are equal. Therefore, we will only consider the upstream capacity $c^u$ expression. Further, we will use $R_A$ for $R_A(s^u(f), s^d(f))$ in the remainder of this Section. Substituting for the PSDs from (14) and (15) into (16) and using (17) we get the following expression for the upstream capacity $$c^u = \frac{W}{2} \max_{0.5 \le \alpha \le 1} \left\{ \log_2\left[1 + \frac{\alpha 2 P_m H / W}{N + \frac{(1-\alpha)2P_m X}{W} + \frac{\alpha 2 P_m F}{W}}\right] + \log_2\left[1 + \frac{(1-\alpha)2P_m H / W}{N + \frac{\alpha 2 P_m X}{W} + \frac{(1-\alpha)2P_m F}{W}}\right] \right\}. \quad (18)$$

Let $$G = \frac{2P_m}{WN}$$

denote the SNR in the bin. Then, we can rewrite (18) as $$c^u = \max_{0.5 \le \alpha \le 1} \frac{W}{2} \left\{ \log_2\left[1 + \frac{\alpha GH}{1 + (1-\alpha)GX + \alpha GF}\right] + \log_2\left[1 + \frac{(1-\alpha)GH}{1 + \alpha GX + (1-\alpha)GF}\right] \right\}. \quad (19)$$

Note from (17) and (19) that the expression after the max in (19) is the achievable rate $R_A$. Differentiating the achievable rate ($R_A$) expression in (19) with respect to $\alpha$ gives us $$\frac{\partial R_A}{\partial \alpha} = \frac{W}{2\ln 2} \left\{ \left[\frac{1 + (1-\alpha)GX + \alpha GF}{1 + (1-\alpha)GX + \alpha GF + \alpha GH} \times \frac{GH(1 + (1-\alpha)GX + \alpha GF) - \alpha GH(-GX + GF)}{(1 + (1-\alpha)GX + \alpha GF)^2}\right] + \left[\frac{1 + \alpha GX + (1-\alpha)GF}{1 + \alpha GX + (1-\alpha)GF + (1-\alpha)GH} \times \frac{-GH(1 + \alpha GX + (1-\alpha)GF) - (1-\alpha)GH(GX - GF)}{(1 + \alpha GX + (1-\alpha)GF)^2}\right] \right\} \quad (20)$$

$$= G(2\alpha - 1)[2(X - F) + G(X^2 - F^2) - H(1 + GF)]L, \quad (21)$$

with $L > 0 \forall \alpha \in (0, 1]$. Setting the derivative to zero gives us the single stationary point $\alpha=0.5$. The achievable rate $R_A$ is monotonic in the interval $\alpha \in (0.5, 1]$ (see FIG. 24). If the value $\alpha=0.5$ corresponds to a maximum, then it is optimal to perform EQPSD signaling in this bin. If the value $\alpha=0.5$ corresponds to a minimum, then the maximum is achieved by the value $\alpha=1$, meaning it is optimal to perform FDS signaling in this bin. No other values of $\alpha$ are an optimal option. See FIG. 25.

The quantity $\alpha=0.5$ corresponds to a maximum of $R_A$ (EQPSD) if and only if $$\frac{\partial R_A}{\partial \alpha} < 0$$

$\forall \alpha \in (0.5, 1]$. For all $\alpha \in (0.5, 1]$, the quantity $(2\alpha-1)$ is positive and $$\frac{\partial R_A}{\partial \alpha}$$

is negative if and only if (see (21))

$$2(X-F)+G(X^2-F^2)-H(1+GF)<0.$$

This implies that $$G(X^2-F^2-HF)<H-2(X-F).$$

Thus, the achievable rate $R_A$ is maximum at $\alpha=0.5$ (EQPSD)

$$\text{if } X^2 - F^2 - HF < 0 \text{ and } G > \frac{H - 2(X - F)}{X^2 - F^2 - HF} \quad (22)$$

or $$\text{if } X^2 - F^2 - HF > 0 \text{ and } G < \frac{H - 2(X - F)}{X^2 - F^2 - HF}. \quad (23)$$

In a similar fashion $\alpha=0.5$ corresponds to a minimum of $R_A$ if and only if $$\frac{\partial R_A}{\partial \alpha} > 0 \; \forall \alpha \in (0.5, 1].$$

This implies that $\alpha=1$ corresponds to a maximum of $R_A$ (FDS) since there is only one stationary point in the interval $\alpha \in [0.5, 1]$ (see FIG. 24). For all $\alpha \in (0.5,1]$ $$\frac{\partial R_A}{\partial \alpha}$$

is positive if and only if $$2(X-F)+G(X^2-F^2)-H(1+GF)>0.$$

This implies that $$G(X^2-F^2-HF) > H-2(X-F).$$

Thus, the achievable rate $R_A$ is maximum at a 1 (FDS)

$$\text{if } X^2 - F^2 - HF < 0 \text{ and } G < \frac{H - 2(X - F)}{X^2 - F^2 - HF} \quad (24)$$

$$\text{if } X^2 - F^2 - HF > 0 \text{ and } G > \frac{H - 2(X - F)}{X^2 - F^2 - HF}. \quad (25)$$

Thus, we can determine whether the value $\alpha=0.5$ maximizes or minimizes the achievable rate by evaluating the above inequalities. If $\alpha=0.5$ corresponds to a maximum of $R_A$, then we achieve capacity cu by doing EQPSD signaling. If $\alpha=0.5$ corresponds to a minimum of $R_A$, then we achieve capacity $c^u$ by doing FDS signaling. This can be summed in test conditions to determine the signaling nature (FDS or EQPSD) in a given bin. Using (22) and (24) we can write $$\text{If } X^2 - F^2 - HF < 0 \text{ then} \quad (26)$$

$$G = \frac{2P_m}{NW} \begin{array}{c} > \\ < \end{array} \frac{H - 2(X - F)}{X^2 - F^2 - HF} \begin{array}{c} \text{EQPSD} \\ \text{FDS} \end{array}.$$

Also, using (23) and (25) we can write $$\text{If } X^2 - F^2 - HF > 0 \text{ then} \quad (27)$$

$$G = \frac{2P_m}{NW} \begin{array}{c} < \\ > \end{array} \frac{H - 2(X - F)}{X^2 - F^2 - HF} \begin{array}{c} \text{EQPSD} \\ \text{FDS} \end{array}.$$

Thus, we can write the upstream capacity $c^u$ in a frequency bin k as $$c^u = \begin{cases} W \log_2\left[1 + \frac{P_m H}{NW + P_m(X + F)}\right], & \text{if } \alpha = 0.5, \\ \frac{W}{2} \log_2\left[1 + \frac{P_m H}{N\frac{W}{2} + P_m F}\right], & \text{if } \alpha = 1. \end{cases} \quad (28)$$

Note: Its always optimal to do either FDS or EQPSD signaling; that is, $\alpha=0.5$ or 1 only. FDS signaling scheme is a subset of the more general orthogonal signaling concept. However, of all orthogonal signaling schemes, FDS signaling gives the best results in terns of spectral compatibility under an average power constraint and hence is used here (see proof in Section 4.5.12). In the case of a peak power constraint in frequency, other orthogonal schemes, such as CDS, could be more appropriate (see Section 4.12.6).

4.5.6 Solution: All frequency bins

We saw in Section 4.5.5 how to determine the optimal signaling scheme (FDS or EQPSD) in one frequency bin for the upstream and downstream directions. In this Section we will apply the test conditions in (26) and (27) to all the frequency bins to determine the overall optimal signaling scheme. Further, using "water-filling" (this comprises of the classical water-filling solution [14] and an optimization technique to compute capacity in the presence of self-interference [16]) optimize the power distribution over the bins given the average input power ($P_{max}$).

We divide the channel into K narrow subchannels of bandwidth W (Hz) each (see FIG. 16). For each subchannel k, we compute the respective channel transfer function ($H_C(f_k)$, self-NEXT ($H_N(f_k)$), self-FEXT ($H_F(f_k)$), DSIN-NEXT ($DS_N(f_k)$), DSIN-FEXT ($DS_F(f_k)$) and AGN ($N_o(f_k)$). Then, by applying (26) and (27) to each bin k in the generic xDSL scenario (with the usual monotonicity assumptions as outlined in Section 4.1),[4] we can divide the frequency axis (K bins) into 3 major regions:

[4] When the channel transfer function is non-monotonic (as in the case of bridged taps) a bin-by-bin approach may be required to achieve the optimal power distribution (see Section 4.10).

1. The right side of (26)<0 for bins [1, $M_E$]. These bins employ EQPSD signaling (since power in every bin is $\geq 0$).
2. The right side of (27)<0 for bins [$M_F$, K]. These bins employ FDS signaling (since power in every bin is $\geq 0$) and $M_E < M_F$.
3. The signaling scheme switches from EQPSD to FDS signaling at some bin $M_{E2F}$, which lies in the range of bins ($M_E$, $M_F$).

FIG. 26 illustrates the situation of the 3 bins $M_E$, $M_F$ and $M_{E2F}$. In the next Section we develop an algorithm to find the optimal bin $M_{E2F}$ and the optimal power distribution.

4.5.7 Algorithm for optimizing the overall transmit spectrum

To find the optimal EQPSD to FDS switch-over bin $M_{E2F}$ and the optimal power distribution over all bins:

1. Set up equispaced frequency bins of width W (Hz) over the transmission bandwidth B of the channel. The bins should be narrow enough for the assumptions (1)–(3) of Section 4.1 to hold.
2. Estimate the interference (DSIN-NEXT, DSIN-FEXT, self-NEXT and self-FEXT) and noise (AGN) PSDs. Lump the corresponding interference PSDs together into one PSD.
3. Compute the bins $M_E$ and $M_F$ using (26) and (27) as outlined in Section 4.5.6.
4. Choose an initial estimate of $M_{E2F}$ ($M_E$ is a great start).
5. Choose an initial distribution of how much proportion of the total power ($P_{max}$) should go in the spectrum to the left of $M_{E2F}$ and how much should go to the right. Denote these powers by $P_E$ and $P_F = P_{max} - P_E$ respectively.
6. Use water-filling to distribute these powers ($P_E$ and $P_F$) optimally over frequency [14, 16] with EQPSD signaling in bins [1, $M_{E2F}$] and FDS signaling in bins [$M_{E2F}+1$, K]. Compute the subchannel capacity $c^u$ in each bin using (28). Calculate the channel capacity $C^u$ by summing all subchannel capacities.
7. Re-estimate the powers $P_E$ and $P_F$.
8. Repeat steps 6 to 7 for a range of powers $P_E$ and $P_F$ in search of the maximum channel capacity $C^u$. This search is guaranteed to converge [3].
9. Re-estimate the optimal EQPSD to FDS switch-over bin $M_{E2F}$.
10. Repeat steps 5 to 9 for a range of bin values for $M_{E2F}$.
11. Choose the bin number which yields the highest channel capacity $C^u$ as the true optimal bin $M_{E2F}$ after which the signaling switches from EQPSD to FDS.

Notes:

1. Standard minimization/maximization routines (like fmin in the software package MATLAB) can be used to search for the optimal powers $P_E$ and $P_F$.
2. We can use fast algorithms like the Golden Section Search [19] to find the optimal bin $M_{E2F}$. This routine tries to bracket the minimum/maximum of the objective function (in this case capacity) using four function-evaluation points. We start with a triplet (p, q, r) that brackets the minimum/maximum. We evaluate the function at a new point x ∈ (q, r) and compare this value with that at the two extremeties to form a new bracketing triplet (p, q, x) or (q, x, r) for the minimum/maximum point. We repeat this bracketing procedure till the distance between the outer points is tolerably small.

4.5.8 Fast, suboptimal solution for the EQPSD to FDS switch-over bin

In the estimation of the optimal bin $M_{E2F}$ we have observed in practice that $M_{E2F} \approx M_E$, typically within 1 or 2 bins especially when self-interference dominates the total crosstalk (see Section 4.5.11). In the case of low AGN and different-service interference the suboptimal solution is a substantially optimized solution. Thus, with significantly less computational effort than the algorithm described in Section 4.5.7, a near-optimal solution can be obtained. Even if a search is mounted for $M_{E2F}$, we suggest that the search should start at $M_E$ (and move to the right).

Algorithm to implement the suboptimal solution:
1. Perform Steps 1 and 2 of the algorithm of Section 4.5.7.
2. Compute the bin $M_E$ using (26) as outlined in Section 4.5.6.
3. Set the EQPSD to FDS switch-over bin $M_{E2F}$ equal to $M_E$.
4. Obtain the optimal power distribution and the channel capacity $C^u$ by performing Steps 5 through 8 of the algorithm in Section 4.5.7.

4.5.9 Flow of the scheme

Consider a line carrying an xDSL service satisfying the assumptions of Sections 4.1 and 4.5.3. Lines carrying the same xDSL service and different xDSL services interfere with the line under consideration. We wish to find the optimal transmit spectrum for the xDSL line under consideration (see problem statement in Section 4.5.2).

1. Determine the self-NEXT and self-FEXT levels due to other xDSL lines, bin by bin. These can be determined either through:
   (a) a worst-case bound of their levels determined by how many lines of that xDSL service could be at what proximity to the xDSL line of interest; or
   (b) an adaptive estimation (training) procedure run when the modem "turns on." In this process the CO will evaluate the actual number of active self-interfering xDSL lines and the proximity of those lines with the line of interest.
2. Determine DSIN-NEXT and DSIN-FEXT levels, bin by bin. These can be determined either through:
   (a) a worst-case bound of their levels determined by how many lines of which kinds of service could be at what proximity to the xDSL line of interest; or
   (b) an adaptive estimation (training) procedure run when the modem "turns on". In this procedure no signal transmission is done but we only measure the interference level on the xDSL line at the receiver. Finally, the combined DSIN-NEXT and DSIN-FEXT can be estimated by subtracting the self-interference level from the level measured at the receiver.
3. an adaptive estimation (training) procedure run when the modem "turns on".
4. Optimize the spectrum of transmission using the algorithms of Section 4.5.7 or 4.5.8.
5. Transmit and receive data.
6. Optional: Periodically update noise and crosstalk estimates and transmit spectrum from Steps 1–3.

FIG. 27 illustrates a flowchart showing the steps for the optimal and the suboptimal solution.

4.5.10 Grouping of bins and wider subchannels

The optimal and near-optimal solutions of Sections 4.5.7 and 4.5.8 divide the channel into narrow subchannels (bins) and employ the assumptions as discussed in Sections 4.1 and 4.5.3. In the case of self-interference, the resulting optimal transmit spectrum uses FDS and is "discrete" (a "line spectrum"). Such a transmit spectrum is easily implemented via a DMT modulation scheme, but is not easy to implement with other modulation schemes like PAM, multi-level PAM, or QAM [20]. In addition, the DMT scheme can introduce high latency which may be a problem in some applications. Thus, one may want to use other low-latency modulation schemes. In such a scenario, we can combine or group FDS bins to form wider subchannels and then employ other broadband modulation schemes. This may result in different performance margins but we believe that the change in margins would not be significant. An alternative broadband modulation scheme like multi-level PAM or QAM would use a decision feedback equalizer (DFE) [20] at the receiver to compensate for the channel attenuation characteristic (see Section 4.12.4 for further discussion).

FIG. 28 shows one possible way of grouping the bins. The left-hand-side figures show the optimal upstream and downstream "discrete" transmit spectra $S^u(f)$ and $s^d(f)$ as obtained by the algorithm of Section 4.5.7. The right-hand-side figures show the same optimal transmit spectra after appropriate grouping of bins resulting in "contiguous" transmit spectra. While grouping, only the bins employing FDS signaling are grouped together and the leftmost bins employing EQPSD signaling are retained as they are. In this particular case, we have grouped the bins such that the upstream and downstream capacities are equal ($C^u = C^d$). The upstream transmit spectrum is completely "contiguous" while the downstream spectrum is "contiguous" except for one "hole" as shown in FIG. 28.

Note: This is not the only way that the bins can be grouped. The bins can be grouped in a variety of different ways giving many different optimal transmit spectra. Particular modulation schemes and spectral compatibility with neighboring services may influence the way bins are grouped. Further, grouping of bins may lead to different input powers for opposite directions of transmission.

We look at another possible way of grouping bins such that we achieve equal performance margins and equal upstream and downstream average powers. This could be a preferred grouping for symmetric data-rate services.

Algorithm for "contiguous" optimal transmit spectra: Equal margins and equal average powers in both directions:
1. Solve for the optimal transmit spectrum $S^u(f)$ according to the algorithms in Sections 4.5.7, 4.5.8, or 4.6, where $S^u(f)$ is the water-filling solution (refer to [14] if the spectral region employs EQPSD or multi-line FDS signaling and to [16] if the spectral region employs FDS signaling) (see Sections 4.5 and 4.6). This gives a discrete transmit spectrum $S^u(f)$.
2. Denote the spectral region employing FDS signaling as $E_{FDS}$ and the spectral region employing EQPSD signaling as $E_{EQPSD}$.

Obtain $S^d(f)$ from $S^u(f)$ by symmetry, i.e., $S^d(f) = S^u(f)$ in EQPSD and multi-line FDS regions and $S^d(f) \perp S^u(f)$ in FDS spectral regions. Merge $S^d(f)$ and $S^u(f)$ to form $S(f)$ as $$S(f) = S^u(f) = S^d(f) \quad \forall f \text{ in } E_{EQPSD},$$

$$S(f) = S^u(f) \cup S^d(f) \quad \forall f \text{ in } E_{FDS}, \tag{29}$$

where ∪ represents the union of the two transmit spectra.

3. Estimate bins $M_C \in (M_{E2F}, K]$, and $M_G \in (M_C, K]$. Group the bins of $S(f)$ to obtain upstream and downstream transmit spectra as $$S_{opt}^u(f) = \begin{cases} S(f) & \forall f \text{ in } E_{EQPSD}, \text{ and} \\ & \forall f \text{ in bins}(M_C, M_G], \\ 0 & \text{otherwise,} \end{cases} \quad (30)$$

$$S_{opt}^d(f) = \begin{cases} S(f) & \forall f \text{ in } E_{EQPSD}, \text{ and} \\ & \forall f \text{ in bins}(M_{E2F}, M_C], \text{ and} \\ & \forall f \text{ in bins}(M_G, K], \\ 0 & \text{otherwise.} \end{cases} \quad (31)$$

4. Iterate previous step for various choices of $M_C$ and $M_G$. The bin $M_C$ is chosen such that we get equal performance margins in both directions of transmission and the bin $M_G$ is chosen such that upstream and downstream directions have equal average powers.

The resulting transmit spectra $S_{opt}^u(f)$ and $S_{opt}^d(f)$ are another manifestation of the grouping of bins and yield equal performance margins (equal capacities) and equal average powers in both directions of transmission.

4.5.11 Examples and results

In this Section, we present some examples and results for the HDSL2 service. AGN of −140 dBm/Hz was added to the interference combination in all simulations. Table 1 lists our simulation results performance margins and compares them with results from [1]. The simulations were done for the Carrier Serving Area (CSA) loop number 6, which is a 26 AWG, 9 kft line with no bridged taps. The column "Our-PAM" refers to our implementation using T1E1.4/97-180R1 [11] of the PAM scheme (MONET-PAM) suggested by the authors in [1] using their transmit spectra. We believe the slight differences in margins between MONET-PAM and "Our-PAM" exist due to slight differences in our channel, self-NEXT and self-FEXT models. The use of "Our-PAM" margins allows us a fair comparison of our optimal results with other proposed transmit spectra. The columns Up and Dn refer to the upstream and downstream performance margins respectively. The column Optimal refers to the performance margins obtained using the optimal transmit spectra. The column Diff shows the difference between the performance margins for the optimal transmit spectrum and the MONET-PAM transmit spectrum (using "Our-PAM" margins). A full-duplex bit rate of 1.552 Mbps and a BER of $10^{-7}$ was fixed in order to get the performance margins. The HDSL2 standards committee desires a high uncoded margin (preferably more than 6 dB). Table 1 shows that we achieve very high uncoded margins far exceeding current schemes.

TABLE 1

Uncoded performance margins (in dB) for CSA No. 6: MONET-PAM vs. Optimal.

| Crosstalk source | xDSL service | MONET-PAM | | "Our-PAM" | | | |
|---|---|---|---|---|---|---|---|
| | | Up | Dn | Up | Dn | Optimal | Diff |
| 49 HDSL | HDSL2 | 9.38 | 3.14 | 10.05 | 3.08 | 18.75 | 15.67 |
| 39 self | HDSL2 | 10.3 | 6.03 | 11.18 | 6.00 | 18.39 | 12.39 |
| 25 T1 | HDSL2 | 19.8 | 20.3 | 14.23 | 20.29 | 21.54 | 7.31 |

Bit rate fixed at 1.552 Mbps.
Diff = Difference between Optimal and worst-case "Our-PAM".

Table 2 shows the difference between the optimal solution of the signaling scheme (using the optimal $M_{E2F}$) and the fast approximate suboptimal solution (using $M_{E2F}=M_E$) for a variety of interfering lines. The column Diff (in dB) notes the difference in performance margins between the optimal scheme and the suboptimal scheme. Note that there is hardly any difference between the two when self-interference dominates the total crosstalk. This is a very significant result from an implementation view point for it shows that near-optimal signaling can be obtained with very little computational effort. The optimal solution requires a somewhat complicated optimization over the bins starting from $M_E$ and moving towards the right. Our results clearly indicate that the near-optimal solution can give extremely attractive results with no search for the optimal bin. Further, this suggests that the optimal bin $M_{E2F}$ is closer to $M_E$ $M_F$ and so one should search for it to the immediate right of $M_E$.

An optimal upstream transmit spectrum in the case of self-interference is illustrated in FIG. 29. The Figure shows the optimal upstream transmit spectrum for HDSL2 service in the presence of self-NEXT and self-FEXT from 39 HDSL2 disturbers and AGN of −140 dBm/Hz. The downstream transmit spectra for the HDSL2 service are symmetric with the upstream transmit spectra as discussed earlier.

FIG. 30 illustrates optimal "contiguous" transmit spectra for the same case of 39 self-NEXT and self-FEXT disturbers with AGN of −140 dBm/Hz. The "contiguous" transmit spectra were obtained by grouping the bins as outlined in Section 4.5.10 ($C^u=C^d$). The upstream and downstream

TABLE 2

Uncoded performance margins (in dB) for CSA No. 6: Optimal vs. Suboptimal.

| Crosstalk source | xDSL service | Optimal scheme (dB) | $M_{E2F}$ | Fast, suboptimal scheme (dB) | $M_E$ | Diff |
|---|---|---|---|---|---|---|
| 1 self | HDSL2 | 27.68 | 11 | 27.68 | 10 | 0 |
| 10 self | HDSL2 | 21.94 | 10 | 21.94 | 10 | 0 |
| 19 self | HDSL2 | 20.22 | 8 | 20.22 | 8 | 0 |
| 29 self | HDSL2 | 19.13 | 8 | 19.13 | 8 | 0 |
| 39 self | HDSL2 | 18.39 | 9 | 18.39 | 9 | 0 |
| 10 self + 10 HDSL | HDSL2 | 12.11 | 60 | 11.46 | 19 | 0.65 |
| 10 self + 10 T1 | HDSL2 | 7.92 | 27 | 7.90 | 23 | 0.02 |

Bit rate fixed at 1.552 Mbps.
Diff = Difference between Optimal and suboptimal scheme.

stream directions exhibit the same performance margins and use different powers.

FIG. 31 illustrates another set of optimal "contiguous" transmit spectra for the same case of 39 self-NEXT and self-FEXT disturbers with AGN of −140 dBm/Hz. These "contiguous" transmit spectra were obtained by grouping the bins as outlined in the algorithm of Section 4.5.10 such that now we have both equal performance margins (equal capacities) and equal average powers in both directions of transmission.

4.5.12 Spectral compatibility

When we optimize the capacity of an xDSL service in the presence of interferers, we must ensure that the optimized xDSL service is not spectrally incompatible with other services. That is, the performance margins of other services must not significantly degrade due to the presence of that xDSL. Our optimal xDSL transmit spectra involve waterfilling (after choosing the appropriate joint signaling strategy). To maximize xDSL capacity we distribute more power in regions of less interference and vice versa. This implies the services which interfere with xDSL see less interference in spectral regions where they have more power and vice versa. This suggests that the spectral compatibility margins for other services in the presence of optimized xDSL PSD should be high.

Table 3 lists our simulation results for HDSL2 service and compares them with results from [1]. The simulations were done for the CSA loop number 6 (26 AWG, 9 kft, no bridged taps) and CSA loop number 4 (26 AWG, bridged taps). The column "Our-PAM" refers to our implementation using T1E1.4/97-180R1 [11] of the PAM scheme (MONET-PAM) suggested by the authors in [1] using their transmit spectra. We believe the slight differences in margins between MONET-PAM and "Our-PAM" exist due to the differences in our channel, self-NEXT and self-FEXT models. The column Optimal lists the performance margins of the xDSL service under consideration using the optimal transmit spectrum only when HDSL2 is a crosstalk source. The use of "Our-PAM" margins allows us a fair comparison of our optimal margins with the other proposed transmit spectra. From Table 3, we can clearly see that the optimal transmit spectrum has a high degree of spectral compatibility with the surrounding interfering lines.

Our optimal results in case of self-NEXT and self-FEXT give rise to FDS signaling, which has a peaky PSD in bins employing FDS. All orthogonal schemes like FDS, TDS, and CDS give self-NEXT rejection and can transmit at the same bit rate. But, using FDS is better than CDS since there is a gain in the performance margin of the interfering line. We now prove that FDS signaling gives higher spectral compatibility margins than other orthogonal schemes like CDS.

Theorem: Let the line under consideration be the signaling line (with PSD S in a single bin) and the line that interferes with this line be the interfering line (with PSD $s^u(f)$ and $s^d(f)$ in a single bin). Then, using an FDS scheme instead of CDS scheme for the interfering line results in higher capacity for the signaling line under an average power constraint and a Gaussian channel model.

Proof: Consider, as usual the scenario of one single frequency bin of width W (Hz) as illustrated in FIG. 32. In this Figure, S is the transmit spectrum of the signaling line under consideration (for example T1, HDSL, ADSL, etc.), Y and Z represent the different service interference powers from a neighboring interfering line (for example HDSL2) and N represents the lumped channel noise (AGN) and other different-service interference. There are two cases of interest:

TABLE 3

Spectral-compatibility margins: MONET-PAM vs Optimal

| | | | "Our-PAM" | | Optimal | |
|---|---|---|---|---|---|---|
| Crosstalk | xDSL | MONET-PAM Dn | CSA | CSA | CSA | CSA |
| Src | Srvc | CSA 6 | CSA 4 | 6 | 4 | 6 | 4 |
| 49 HDSL | HDSL | 8.53 | 8.09 | 8.09 | 7.78 | | |
| 39 HDSL2 Up | HDSL | 10.1 | 10.9 | 9.74 | 10.53 | 15.44 | 15.60 |
| 39 HDSL2 Dn | HDSL | 8.28 | 7.99 | 7.74 | 7.53 | | |
| 39 HDSL | EC ADSL | 8.43 | 9.55 | 7.84 | 9.02 | | |
| 39 HDSL2 | EC ADSL | 9.70 | 11.7 | 8.17 | 10.00 | 6.93 | 9.10 |
| 49 HDSL | EC ADSL | 8.12 | 9.24 | 7.52 | 8.7 | | |
| 49 HDSL2 | HDSL | | | 7.10 | 6.91 | 14.95 | 15.12 |

Case 1: The interfering line uses a CDS signaling scheme. In this case the power in a single bin k ($P_m$) is uniformly distributed throughout the bin resulting in a flat PSD, i.e., $$s^u(f)=s^d(f)=a.$$

We assume the subchannel frequency responses (1)–(3) and the notation introduced in (12) and (13). We assume here that the NEXT and FEXT coupling transfer functions between different service lines are the same as that for same-service lines. Thus, we can write the different service interference power in signaling line bin k as $$DS_N(f) + DS_F(f) = s^u(f)X + s^d(f)F \qquad (32)$$
$$= aX + aF.$$

We define Y and Z as $$Y = a(X-F)$$

$$Z = 2aF. \qquad (33)$$

Using (33) we can write the interference power in (32) as $$DS_N(f)+DS_F(f)=Y+Z.$$

Case 2: The interfering line uses an FDS signaling scheme. In this case the power in a single bin k ($P_m$) is distributed in only half the bin, resulting in a peaky PSD, i.e., $$s^u(f) = \begin{cases} 2a, & \text{if } |f| \leq \frac{W}{2}, \\ 0, & \text{if } \frac{W}{2} < |f| \leq W, \end{cases}$$

and, $$s^d(f) = \begin{cases} 0, & \text{if } |f| \leq \frac{W}{2}, \\ 2a, & \text{if } \frac{W}{2} < |f| \leq W. \end{cases}$$

We assume the subchannel frequency responses (1)–(3) and the notation introduced in (12) and (13). We assume here that the NEXT and FEXT coupling transfer functions between different service lines are the same as that for same-service lines. Thus, we can write the different service interference power in signaling line bin k as $$DS_N(f) + DS_F(f) = s^u(f)X + s^d(f)F \qquad (34)$$
$$= \begin{cases} 2aX, & \text{if } |f| \leq \frac{W}{2}, \\ 2aF, & \text{if } \frac{W}{2} < |f| \leq W. \end{cases}$$

Using (33) we can write the interference power in (34) as $$DS_N(f) + DS_F(f) = \begin{cases} 2Y + Z, & \text{if } |f| \leq \frac{W}{2}, \\ Z, & \text{if } \frac{W}{2} < |f| \leq W. \end{cases}$$

Getting back to the problem, we consider a single signaling line (line 1). We divide the signaling line channel into narrow subchannels (or bins) and we analyze a narrow subchannel k. We use the standard assumptions of Section 4.1. We can write the upstream subchannel capacity of bin k of the signaling line in Case 1 as $$c_1^u(\text{Case 1}) = \frac{W}{2\ln 2}\left\{\ln\left[1+\frac{S}{Y+Z+N}\right]+\ln\left[1+\frac{S}{Y+Z+N}\right]\right\}, \quad (35)$$

and in Case 2 as $$c_1^u(\text{Case 2}) = \frac{W}{2\ln 2}\left\{\ln\left[1+\frac{S}{2Y+Z+N}\right]+\ln\left[1+\frac{S}{Z+N}\right]\right\}. \quad (36)$$

Compute the capacity differences in the two cases as $$D = c_1^u(\text{Case 2}) - c_1^u(\text{Case 1}) = \quad (37)$$

$$\frac{W}{2\ln 2}\ln\left[\frac{\left(1+\frac{S}{2Y+Z+N}\right)\left(1+\frac{S}{Z+N}\right)}{\left(1+\frac{S}{Y+Z+N}\right)^2}\right].$$

Taking the partial derivative of D with respect to Y we get $$\frac{\partial D}{\partial Y} = \frac{W}{\ln 2}S\left[\frac{1}{(Y+Z+N)(Y+Z+N+S)} - \frac{1}{(2Y+Z+N)(2Y+Z+N+S)}\right]. \quad 25$$

Let

U=Y+Z+N,

V=Y+Z+N+S.

Note that U, V≧0 and that we can rewrite the partial derivative of D with respect to Y as $$\frac{\partial D}{\partial Y} = \quad (38)$$

$$\frac{W}{\ln 2}S\left[\frac{1}{UV} - \frac{1}{(U+Y)(V+Y)}\right] = \frac{W}{\ln 2}S\left[\frac{Y^2+(U+V)Y}{UV(U+Y)(V+Y)}\right] \geq 0.$$

Further, $$\left(\frac{\partial D}{\partial Y}\right)\bigg|_{Y=0} = 0.$$

The slope of D with respect to Y is always positive and hence, $c_1''(\text{Case 2}) - c_1''(\text{Case 1})$ is always increasing with Y, which implies that $c_1''(\text{Case 2}) - c_1''(\text{Case 1}) \forall Y \geq 0.$ When Y<0, i.e., when FEXT is higher than NEXT in a bin (F>X), we can redefine Y and Z as Z=2aX, and, Y=a(F−X).

We can then follow the same analysis and show that the capacity $c_1''(\text{Case 2})$ is greater than $c_1''(\text{Case 1})$.

Thus, we have proven that FDS scheme rather than CDS scheme for interfering lines, results in higher capacities for signaling lines under an average power constraint. Q.E.D.

Interestingly, the power-peaky FDS transmit spectra should be very compatible with the ADSL standard, since ADSL can balance how many bits it places in each of its DMT subchannels using a bit loading algorithm [17].

Note: FDS beats CDS in terms of spectral compatibility margins only in the case of an average power constraint. In the case of a peak power constraint in frequency, we may not be able to use a power-peaky scheme like FDS in some spectral regions. Here, we may find that other orthogonal signaling schemes like CDS offer better spectral compatibility margins.

4.6 Optimization: Interference from other services (DSIN-NEXT and DSIN-FEXT) plus self-interference (self-NEXT and high self-FEXT)—Solution: EQPSD, FDS and multi-line FDS signaling In this scenario we have self-interference (self-NEXT and high self-FEXT) in addition to AGN and DSIN-NEXT and DSIN-FEXT from other services (see FIG. 3) in a generic xDSL service. This is the case of interest for "GDSL", "VDSL2", and HDSL2 (with a small number of lines).

4.6.1 Self-FEXT and self-NEXT rejection using multi-line FDS

To reject self-FEXT and self-NEXT, we use multi-line FDS (see Section 4.3 and FIG. 18). In multi-line FDS we separate each line by transmitting on each in different frequency bands. This reduces the transmission bandwidth to 1/M the total channel bandwidth, with M the number of lines carrying the service under consideration. Thus, multi-line FDS signaling can increase the capacity only when there are a few number of lines.

We will design a system here that has both self-NEXT and self-FEXT rejection capability. Thus, this serves as the complete solution under the assumptions in Section 4.1 and the constraints of limited average input power ($P_{max}$) and equal capacity in both directions.

4.6.2 Problem statement

Maximize the capacity of an xDSL line in the presence of AGN, interference (DSIN-NEXT and DSIN-FEXT) from other services, and self-NEXT and self-FEXT under two constraints:

1. The average xDSL input power in each direction of transmission must be limited to $P_{max}$ (Watts), and
2. Equal capacity in both directions (upstream and downstream) for xDSL.

Do this by designing the distribution of energy over frequency (the transmit spectrum) of the upstream and downstream xDSL transmissions.

4.6.3 Additional assumptions

We add the following assumptions to the ones in Section 4.1:

12. All the M lines carrying the xDSL service are assumed to have the same channel and noise characteristics and face the same interference combination in both transmission directions (upstream and downstream). Refer to Section 4.7 for results when this does not hold true.
13. The coupling transfer functions of NEXT and FEXT interference are symmetrical between neighboring services. For example, each line has the same self-NEXT transfer function $H_N(f)$ and self-FEXT transfer function $H_F(f)$ for computing coupling of interference power with any other line. However, we develop some results in Section 4.7 when there are different NEXT and FEXT coupling transfer functions between lines.

4.6.4 Signaling scheme

The level of self-NEXT and self-FEXT varies over frequency (recall FIG. 17). In regions of low self-NEXT and low self-FEXT, EQPSD signaling is the best choice. In spectral regions of high self-NEXT but low self-FEXT, orthogonal signaling scheme like FDS is preferred (due to its self-NEXT rejection, as we saw in Section 4.5). But, in regions of high self-FEXT, multi-line FDS signaling might be required for gaining capacity.

Key to our scheme is that the upstream and downstream transmissions of each of the M lines use different transmit spectra.

4.6.5 Solution using EQPSD and FDS signaling: All frequency bins

First, we assume that self-FEXT is small and then, using EQPSD or FDS signaling in each bin, we find the solution for all frequency bins as outlined in Sections 4.5.4–4.5.8. Thus, we obtain the optimal (or suboptimal) EQPSD to FDS switch-over bin $M_{E2F}$ under the low self-FEXT assumption.

Next, we relax the self-FEXT assumption and open the possibility of multi-line FDS. We search each bin to see if we need to switch from EQPSD to multi-line FDS or FDS to multi-line FDS. This may not necessarily yield the optimal solution for the transmit spectrum given that we use a joint signaling scheme comprising of the three signaling schemes (EQPSD, FDS and multi-line FDS). But, this analysis is tractable and gives significant gains in channel capacity and is presented next.

4.6.6 Switch to multi-line FDS: One frequency bin

Consider the case of M lines with significant self-FEXT interference between them. We divide the channel into several equal bandwidth (W Hz) bins (see FIG. 16) and perform our analysis on one frequency bin k assuming subchannel frequency responses (1)–(3). We employ the notation introduced in (12) and (13). Let $s_1^u(f)$ denote the PSD in bin k of line 1 upstream direction and $s_1^d(f)$ denote the PSD in bin k of line 1 downstream direction (recall the notation introduced in Section 4.1, Item 9). Let $P_m$ be the average power over the frequency range [0, W].

Next, we determine when we need to switch to multi-line FDS in a given bin to completely reject self-FEXT:

EQPSD to multi-line FDS: FIG. 33 illustrates the two possible signaling schemes EQPSD and multi-line FDS in bin k of each line for the case of M=3 lines. We will consider line 1 for our capacity calculations. Line 1 upstream and downstream capacities for EQPSD signaling are denoted by $c_{1,EQPSD}^u$ and $c_{1,EQPSD}^d$ respectively. Similarly, line 1 upstream and downstream capacities for multi-line FDS signaling are denoted by $c_{1,MFDS}^u$ and $c_{1,MFDS}^d$ respectively. Since the upstream and downstream transmit spectra of line 1 in bin k for EQPSD and multi-line FDS are the same, we have:

$$c_{1,EQPSD}^u = c_{1,EQPSD}^d, \quad c_{1,MFDS}^u = c_{1,MFDS}^d$$

Thus, we will consider only the upstream capacities in our future discussion.

Under the Gaussian channel assumption, we can define the EQPSD upstream capacity (in bps) as $$c_{1,EQPSD}^u = W\log_2\left[1 + \frac{s_1^u(f)H}{N + s_1^d X + s_1^u F}\right], \tag{39}$$

where $$s_1^u(f) = s_1^d(f) = \begin{cases} \frac{P_m}{W}, & \text{if } |f| \in [0, W], \\ 0 & \text{otherwise.} \end{cases}$$

Let $$G = \frac{2P_m}{WN}$$

denote the SNR in the bin. Then we can rewrite $C_{1,EQPSD}^u$ as $$c_{1,EQPSD}^u = W\log_2\left[1 + \frac{GH}{2 + GX + GF}\right]. \tag{40}$$

Similarly, we can define the multi-line FDS upstream capacity (in bps) as $$c_{1,MFDS}^u = \frac{W}{M}\log_2\left[1 + \frac{s_1^u(f)H}{N}\right], \tag{41}$$

where $$s_1^u(f) = \begin{cases} \frac{MP_m}{W}, & \text{if } |f| \in \left[0, \frac{W}{M}\right], \\ 0, & \text{otherwise,} \end{cases}$$

and $$G = \frac{2P_m}{WN}$$

is the SNR in the bin. Then we can rewrite $c_{1,MFDS}^u$ as $$c_{1,MFDS}^u = \frac{W}{M}\log_2\left[1 + \frac{M}{2}GH\right], \tag{42}$$

Define the difference between the two capacities as $$D = c_{1,MFDS}^u - c_{1,EQPSD}^u. \tag{43}$$

We wish to determine when it is better to do multi-line FDS than EQPSD, i.e., when is the capacity $c_{1,MFDS}^u$ greater than $C_{1,EQPSD}^u$. This means we need a condition for when D>0. Substituting from (40) and (42) into (43) we get D>0 iff $$F > \frac{[1 + G(X + H)] - \left(1 + \frac{M}{2}GH\right)^{\frac{1}{M}}(2 + GX)}{G\left(\left(1 + \frac{M}{2}GH\right)^{\frac{1}{M}} - 1\right)}. \tag{44}$$

Similarly, EQPSD is better (gives higher capacity) than multi-line FDS when D<0, i.e., iff $$F < \frac{[2 + G(X + H)] - \left(1 + \frac{M}{2}GH\right)^{\frac{1}{M}}(2 + GX)}{G\left(\left(1 + \frac{M}{2}GH\right)^{\frac{1}{M}} - 1\right)}. \tag{45}$$

We can combine (44) and (45) into one test condition that tells us the signaling scheme to use in a single frequency bin $$F \overset{\text{multi-line } FDS}{\underset{EQPSD}{\gtrless}} \frac{[2 + G(X + H)] - \left(1 + \frac{M}{2}GH\right)^{\frac{1}{M}}(2 + GX)}{G\left(\left(1 + \frac{M}{2}GH\right)^{\frac{1}{M}} - 1\right)}. \tag{46}$$

FDS to multi-line FDS: FIG. 34 illustrates the two possible signaling schemes FDS and multi-line FDS in bin k of each line for the case of M=3 lines. We will consider line 1 for our capacity calculations. Line 1 upstream and downstream capacities for FDS signaling are denoted by $C_{1,FDS}^u$ and $c_{1,FDS}{}^d$ respectively. Similarly, line 1 upstream and downstream capacities for multi-line FDS signaling are denoted by $c_{1,MFDS}{}^u$ and $c_{1,MFDS}{}^d$ respectively. Since the upstream and downstream transmit spectra of line 1 in bin k for EQPSD and multi-line FDS are the same, we have:

$$c_{1,FDS}{}^u = c_{1,FDS}{}^d, \quad c_{1,MFDS}{}^u = c_{1,MFDS}{}^d$$

Thus, we will consider only the upstream capacities in our future discussion. Under the Gaussian channel assumption we can define the FDS upstream capacity (in bps) as $$c_{1,FDS}^u = \frac{W}{2}\log_2\left[1 + \frac{s_1^u(f)H}{N + s_1^u F}\right], \quad (47)$$

where $$s_1^u(f) = \begin{cases} \frac{2P_m}{W}, & \text{if } |f| \in \left[0, \frac{W}{2}\right], \\ 0, & \text{otherwise.} \end{cases}$$

Let $$G = \frac{2P_m}{WN}$$

denote the SNR in the bin. Then we can rewrite $c_{1,FDS}{}^u$ as $$c_{1,FDS}^u = \frac{W}{2}\log_2\left[1 + \frac{GH}{1 + GF}\right]. \quad (48)$$

Similarly, we can define the multi-line FDS upstream capacity (in bps) as $$c_{1,MFDS}^u = \frac{W}{M}\log_2\left[1 + \frac{s_1^u(f)H}{N}\right], \quad (49)$$

where $$s_1^u(f) = \begin{cases} \frac{MP_m}{W}, & \text{if } |f| \in \left[0, \frac{W}{M}\right], \\ 0, & \text{otherwise,} \end{cases}$$

and $$G = \frac{2P_m}{WN}$$

is the SNR in the bin. Then we can rewrite $c_{1,MFDS}{}^u$ as $$c_{1,MFDS}^u = \frac{W}{M}\log_2\left[1 + \frac{M}{2}GH\right], \quad (50)$$

Define the difference between the two capacities as $$D = c_{1,MFDS}^u - c_{1,FDS}^u \quad (51)$$

We wish to find out when it is more appropriate to perform multi-line FDS than FDS, i.e., when the capacity $c_{1,MFDS}{}^u$ is greater than $c_{1,FDS}{}^u$. For this, we need a condition for when $D > 0$. Substituting from (48) and (50) into (51) we get $D > 0$ iff $$F > \frac{(1+GH) - \left(1 + \frac{M}{2}GH\right)^{\frac{2}{M}}}{G\left(\left(1 + \frac{M}{2}GH\right)^{\frac{2}{M}} - 1\right)}. \quad (52)$$

Similarly, FDS is better (gives higher capacity) than multi-line FDS when $D < 0$, i.e., iff $$F < \frac{(1+GH) - \left(1 + \frac{M}{2}GH\right)^{\frac{2}{M}}}{G\left(\left(1 + \frac{M}{2}GH\right)^{\frac{2}{M}} - 1\right)}. \quad (53)$$

We can combine (52) and (53) into one test condition which tells us the signaling scheme to use $$F \begin{array}{c} \text{multi-line } FDS \\ > \\ < \\ FDS \end{array} \frac{(1+GH) - \left(1 + \frac{M}{2}GH\right)^{\frac{2}{M}}}{G\left(\left(1 + \frac{M}{2}GH\right)^{\frac{2}{M}} - 1\right)}. \quad (54)$$

Thus, we can write the generic upstream capacity $c_1{}^u$ for bin k of line 1 as $$c_1^u = \begin{cases} W\log_2\left[1 + \frac{P_m H}{NW + P_m(X+F)}\right], & \text{if } EQPSD, \\ \frac{W}{2}\log_2\left[1 + \frac{P_m H}{N\frac{W}{2} + P_m F}\right], & \text{if } FDS, \\ \frac{W}{M}\log_2\left[1 + \frac{MP_m H}{WN}\right], & \text{if multi-line } FDS. \end{cases} \quad (55)$$

4.6.7 Switch to multi-line FDS: All frequency bins

We saw in the previous Section how to determine if we need to switch to multi-line FDS from EQPSD or FDS in a given bin. We already have the optimal solution assuming EQPSD and FDS signaling scheme (from Section 4.5). Now, we apply the conditions (46) and (54) to each bin k. Interestingly, due to the assumed monotonicity of self-FEXT, self-NEXT and channel transfer function, we can divide the frequency axis (all K bins) into 4 major regions:

1. Using test condition (46), we find that bins [1, $M_{E2MFDS}$] employ EQPSD signaling.
2. Using test condition (46), we find that bins [$M_{E2MFDS}$+1, $M_{MFDS2FDS}$] employ multi-line FDS signaling. Note that $M_{MFDS2FDS} = M_{E2F}$ obtained from optimization procedure of Section 4.6.5.
3. Using test condition (54), we find that bins [$M_{MFDS2FDS}$+1, $M_{FDS2MFDS}$] employ FDS signaling.
4. Using test condition (54), we find that bins [$M_{FDS2MFDS}$+1, K] employ multi-line FDS signaling.

FIG. 35 illustrates the 3 bins $M_{E2MFDS}$, $M_{MFDS2FDS}$ and $M_{FDS2MFDS}$ and the EQPSD, FDS and multi-line FDS regions. In practice we mainly see 2 scenarios:

1. If $M_{E2MFDS} < M_{MFDS2FDS}$ then $M_{FDS2MFDS} = M_{MFDS2FDS}$, and we get only 2 distinct spectral regions as shown in FIG. 36:
   (a) Bins [1, $M_{E2MFDS}$] employ EQPSD signaling.
   (b) Bins [$M_{E2MFDS}$+1, K] employ multi-line FDS signaling.

FDS signaling is not employed in this case.

2. If $M_{E2MFDS}=M_{MFDS2FDS}=M_{E2F}$ then we get 3 distinct spectral regions as shown in FIG. 37:
   (a) Bins [1, $M_{MFDS2FDS}$] employ EQPSD signaling.
   (b) Bins [$M_{MFDS2FDS}$+1, $M_{FDS2MFDS}$] employ FDS signaling.
   (c) Bins [$M_{FDS2MFDS}$+1, K] employ multi-line FDS signaling.

There is no switch to multi-line FDS signaling within the EQPSD signaling region (bins [1, $M_{E2F}$]).
Note that the bin $M_{MFDS2FDS}=M_{E2F}$ is fixed from the optimization procedure from Section 4.6.5.

4.6.8 Special case: Performance of 2 lines

Often in practice we may have only two twisted pair lines carrying the same service and interfering with each other. It is important to derive the optimal transmit spectrum for such a scenario. In this Section we focus on this special case of only 2 lines. We will see that in this case it is optimal to perform either multi-line FDS or EQPSD signaling in each bin. In this scenario with arbitrary self-FEXT and self-NEXT we easily see that there is no need to perform FDS signaling (reject self-NEXT only) as multi-line FDS rejects both self-NEXT and self-FEXT while achieving the same capacity as FDS. Thus, we choose between EQPSD and multi-line FDS signaling schemes for each bin to achieve the optimal transmit spectrum.

Let $S_1^u(f)$ and $S_1^d(f)$ denote the upstream and downstream transmit spectra of line 1 and $S_2^u(f)$ and $S_2^d(f)$ denote the upstream and downstream transmit spectra of line 2 respectively. Let the line 1 upstream capacity be $C_1^u$ and let the line 2 downstream capacity be $C_2^d$. Under the Gaussian channel assumption, we can write these capacities (in bps) as $$C_1^u = \sup_{S_1^u(f), S_2^d(f), S_2^u(f)} \int_0^\infty \log_2\left[1 + \frac{|H_C(f)|^2 S_1^u(f)}{N_o(f) + DS_N(f) + DS_F(f) + |H_N(f)|^2 S_2^d(f) + |H_F(f)|^2 S_2^u(f)}\right] df, \quad (56)$$

and $$C_2^d = \sup_{S_2^d(f), S_1^u(f), S_2^u(f)} \int_0^\infty \log_2\left[1 + \frac{|H_C(f)|^2 S_2^d(f)}{N_o(f) + DS_N(f) + DS_F(f) + |H_N(f)|^2 S_1^u(f) + |H_F(f)|^2 S_1^u(f)}\right] df. \quad (57)$$

The supremum is taken over all possible $S_1^u(f)$, $S_2^u(f)$, $S_1^d(f)$ and $S_2^d(f)$ satisfying $$S_1^u(f) \geq 0, \; S_1^d(f) \geq 0, \; S_2^u(f) \geq 0, \; S_2^d(f) > 0, \forall f,$$

and the average power constraints for the two directions $$2\int_0^\infty S_1^u(f) df \leq P_{\max}, \text{ and } 2\int_0^\infty S_2^d(f) df \leq P_{\max}. \quad (58)$$

We employ multi-line FDS ($S_1^u(f)$ and $S_2^d(f)$ orthogonal to $S_2^u(f)$ and $s_2^d(f)$) in spectral regions where the self-FEXT is large enough and EQPSD in the remaining spectrum. This gives optimal performance.

To ease our analysis, as usual, we divide the channel into several equal bandwidth subchannels (bins) (see FIG. 16) and continue our design and analysis on one frequency bin k assuming subchannel frequency responses (1)–(3). We use notation introduced in (12) and (13). Let $s_1^u(f)$ and $s_1^d(f)$ denote the PSDs in bin k of line 1 upstream and downstream directions and $S_2^u(f)$ and $s_2^d(f)$ denote the PSDs in bin k of line 2 upstream and downstream directions. The corresponding capacities of the subchannel k are denoted by $c_1^u$, $c_1^d$, $c_2^u$ and $c_2^d$.

We desire a signaling scheme that can have multi-line FDS, EQPSD and all combinations in between in each frequency bin. Therefore we divide each bin in half[5] and define the upstream and downstream transmit spectra as follows (see FIG. 38):

[5]The power split-up in a bin does not necessarily have to be 50% to the left side of the bin and 50% to the right side of the bin as shown in FIG. 38. In general any 50%–50% power complementary split-up between different-line bins will work.

$$s_1^u(f) = s_1^d(f) = \begin{cases} \alpha \frac{2P_m}{W} & \text{if } |f| \leq \frac{W}{2}, \\ (1-\alpha)\frac{2P_m}{W} & \text{if } \frac{W}{2} < |f| \leq W, \\ 0 & \text{otherwise,} \end{cases} \quad (59)$$

and $$s_2^u(f) = s_2^d(f) = \begin{cases} (1-\alpha)\frac{2P_m}{W} & \text{if } |f| \leq \frac{W}{2}, \\ \alpha 2\frac{P_m}{W} & \text{if } \frac{W}{2} < |f| \leq W, \\ 0 & \text{otherwise.} \end{cases} \quad (60)$$

Here, $P_m$ is the average power over frequency range [0, W] in bin k and $0.5 \leq \alpha \leq 1$. In this discussion we will only use the PSDs $s_1^u(f)$ and $s_2^d(f)$. When $\alpha=0.5$, $s_1^u(f)=s_2^d(f) \forall f \in [0, W]$ (EQPSD signaling); when $\alpha=1$, $s_1^u(f)$ and $s_2^d(f)$ are disjoint (multi-line FDS signaling). The PSDs $s_1^u(f)$ and $s_2^d(f)$ are "symmetrical" or power complementary to each other. This ensures the capacities of the two lines are equal ($c_1^u=c_2^d$). The factor a controls the power distribution in the bin and W is the bandwidth of the bin.

Next, we show that the optimal signaling strategy uses only multi-line FDS or EQPSD in each subchannel.

The achievable rate for one frequency bin can be written as $$R_A(s_1^u(f), s_2^d(f), s_2^u(f)) = \int_0^W \log_2\left[1 + \frac{s_1^u(f)H}{N + s_2^d(f)X + s_2^u(f)F}\right] df, \quad (61)$$

then $$c_1^u = \max_{0.5 \leq \alpha \leq 1} R_A(s_1^u(f), s_2^d(f), s_2^u(f)) \text{ and} \quad (62)$$

$$c_2^d = \max_{0.5 \leq \alpha \leq 1} R_A(s_2^d(f), s_1^u(f), s_2^u(f)).$$

Due to the power complementarity of $s_1^u(f)$ and $S_2^d(f)$, the channel capacities are equal ($c_1^u=c_2^d$). Therefore, we will only consider the upstream capacity $c_1^u$ expression. Further, we will use $R_A$ for $R_A(s_1^u(f), s_2^d(f), s_2^u(f))$ in the remainder of this Section. Substituting for the PSDs from (59) and (60) into (61) and using (62) we get the following expression for the upstream capacity $$c_1^u = \frac{W}{2} \max_{0.5 \le \alpha \le 1} \left\{ \log_2 \left[ 1 + \frac{\frac{\alpha 2 P_m H}{W}}{N + \frac{(1-\alpha)2P_m X}{W} + \frac{(1-\alpha)2P_m F}{W}} \right] + \log_2 \left[ 1 + \frac{\frac{(1-\alpha)2P_m H}{W}}{N + \frac{\alpha 2 P_m X}{W} + \frac{\alpha 2 P_m F}{W}} \right] \right\} \quad (63)$$

Let $$G = \frac{2P_m}{WN}$$

denote the SNR in the bin. Then, we can rewrite (63) as $$c_1^u = \frac{W}{2} \max_{0.5 \le \alpha \le 1} \left\{ \log_2 \left[ 1 + \frac{\alpha G H}{1 + (1-\alpha)GX + (1-\alpha)GF} \right] + \log_2 \left[ 1 + \frac{(1-\alpha)GH}{1 + \alpha GX + \alpha GF} \right] \right\} \quad (64)$$

Using (62) and differentiating the achievable rate ($R_A$) expression in (64) with respect to $\alpha$ gives us $$\frac{\partial R_A}{\partial \alpha} = (2\alpha - 1)[2(X+F) + G(X+F)^2 - H]L, \quad (65)$$

with $L > 0 \; \forall \alpha \in (0, 1]$. Setting the derivative to zero gives us the single stationary point $\alpha = 0.5$. Thus, the achievable rate $R_A$ is monotonic in the interval $\alpha \in (0.5, 1]$ (see FIG. 24). If the value $\alpha = 0.5$ corresponds to a maximum of $R_A$, then it is optimal to perform EQPSD signaling in this bin. If the value $\alpha = 0.5$ corresponds to a minimum of $R_A$, then the maximum of $R_A$ is achieved by the value $\alpha = 1$, meaning it is optimal to perform multi-line FDS signaling in this bin. No other values of $\alpha$ are an optimal option (see FIG. 39).

The quantity $\alpha = 0.5$ corresponds to a maximum of $R_A$ (EQPSD) if and only if $$\frac{\partial R_A}{\partial \alpha} < 0 \; \forall \alpha \in (0.5, 1].$$

For all $\alpha \in (0.5, 1]$, the quantity $(2\alpha - 1)$ is positive and $$\frac{\partial R_A}{\partial \alpha}$$

is negative iff (see (65))

$$2(X+F) + G(X+F)^2 - H < 0.$$

This implies that $$G < \frac{H - 2(X+F)}{(X+F)^2}. \quad (66)$$

In a similar fashion $\alpha = 0.5$ corresponds to a minimum of $R_A$ if and only if $$\frac{\partial R_A}{\partial \alpha} > 0 \; \forall \alpha \in (0.5, 1].$$

This implies that $\alpha = 1$ corresponds to a maximum (multi-line FDS) since there is only one stationary point in the interval $\alpha \in [0.5, 1]$ (see FIG. 24). For all $\alpha \in (0.5, 1]$, $$\frac{\partial R_A}{\partial \alpha}$$

is positive iff $$2(X+F) + G(X+F)^2 - H > 0.$$

This implies that $$G > \frac{H - 2(X+F)}{(X+F)^2}. \quad (67)$$

The above statements can be summed in a test condition to determine the signaling nature (multi-line FDS or EQPSD) in a given bin. Using (66) and (67) we can write $$G = \frac{2P_m}{NW} \begin{array}{c} \text{multi-line FDS} \\ > \\ < \\ \text{EQPSD} \end{array} \frac{H - 2(X+F)}{(X+F)^2}. \quad (68)$$

Thus, we can write the upstream capacity $c_1^u$ in a frequency bin k as $$c_1^u = \begin{cases} W \log_2 \left[ 1 + \frac{P_m H}{NW + P_m(X+F)} \right], & \text{if } \alpha = 0.5, \\ \frac{W}{2} \log_2 \left[ 1 + \frac{2P_m H}{NW} \right], & \text{if } \alpha = 1. \end{cases} \quad (69)$$

Note: It is globally optimal to employ either multi-line FDS or EQPSD signaling; that is, $\alpha = 0.5$ or 1, only in the case of 2 lines.

4.6.9 Flow of the scheme

1. Perform steps 1–3 of Section 4.5.9.
2. Compute bins $M_{E2MFDS}$, $M_{MFDS2FDS}$ and $M_{FDS2MFDS}$ and employ signaling schemes in bins as described in Section 4.6.5.
3. Transmit and receive data.
4. Optional: Periodically update noise and crosstalk estimates and transmit spectrum from Steps 1–3 of Section 4.5.9. Repeat Step 2 from above.

FIG. 40 gives a flowchart to obtain the optimal transmit spectrum using EQPSD, FDS, and multi-line FDS (MFDS) signaling in the presence of self-interference (self-NEXT and self-FEXT), DSIN-NEXT, DSIN-FEXT and AGN.

4.6.10 Examples and results

Optimal transmit spectra were used in all examples to compute performance margins and channel capacities.

HDSL2 service: Table 4 lists our simulation results performance margins and channel capacities using the EQPSD, FDS and multi-line FDS signaling schemes.

Notes:
1. Sampling frequency $f_s = 1000$ kHz, Bin width W=2 kHz and number of subchannels K=250. Average input power of 20 dBm in each transmission direction.

2. $C_i^u$ denotes the upstream capacity of line i using EQPSD and FDS signaling only and $C_i^u$(MFDS) denotes the upstream capacity of line i using EQPSD, FDS and multi-line FDS signaling schemes. All the rates are in Mbps.

3. The column Margin lists the performance margin when the bit rate is fixed at 1.552 Mbps. In each row in the top half the capacity is fixed at $C_i^u$=1.5520 and in the bottom half the capacity is fixed at $C_i^u$(MFDS)=1.5520.

1. Sampling frequency $f_s$=8000 kHz, Bin width W=2 kHz and number of subchannels K=2000. Average input power of 20 dBm in each transmission direction.

2. $C_i^u$ denotes the upstream capacity of line i using EQPSD and FDS signaling only and $C_i^u$(MFDS) denotes the upstream capacity of line i using EQPSD, FDS and multi-line FDS signaling schemes. All the rates are in Mbps.

3. The column Margin lists the performance margin when the bit rate is fixed at 25 Mbps. In each row in the top half

TABLE 4

Uncoded performance margins (in dB) and channel capacities (in Mbps) using EQPSD, FDS and multi-line FDS for HDSL2 (CSA No. 6).

| Xtalk Src | $M_{E2MFDS}$ | $M_{MFDS2FDS}$ | $M_{FDS2MFDS}$ | $C^u_i$ | $C^u_i$ (MFDS) | Margin | Diff |
|---|---|---|---|---|---|---|---|
| 1 HDSL2 | 8 | 11 | 11 | 1.5520 | 2.3763 | 27.682 | 9.852 |
| 1 HDSL2 | 0 | 0 | 0 | 0.8027 | 1.5520 | 37.534 | |
| 2 HDSL2 | 9 | 9 | 30 | 1.5520 | 1.8293 | 25.934 | 4.543 |
| 2 HDSL2 | 4 | 4 | 19 | 1.1861 | 1.5520 | 30.477 | |
| 3 HDSL2 | 8 | 8 | 112 | 1.5520 | 1.6067 | 24.910 | 0.985 |
| 3 HDSL2 | 7 | 7 | 100 | 1.4792 | 1.5520 | 25.791 | |
| 4 HDSL2 | 8 | 8 | 246 | 1.5520 | 1.5520 | 24.186 | 0 |

Diff = Difference between bottom half and top half of each row of Margin.

4. The column Diff denotes the gain in performance margins between using EQPSD and FDS versus EQPSD, FDS and multi-line FDS signaling, i.e., the difference in margins between the bottom half and top half of each row.

5. Each HDSL2 line contributes NEXT and FEXT calculated using 2-piece Unger model [8].

6. These runs were done with no different service (DS) interferers. The results would vary depending on the particular DS interferer(s) present.

Conclusions:

1. Significant gains in margin for small number of lines. The gains decrease with increase in number of lines.

2. There is no gain in margin using multi-line FDS for 5 or more lines (4 Crosstalk disturbers) for these line and interference models.

"GDSL" service: Table 5 lists our simulation results performance margins and channel capacities using the EQPSD, FDS and multi-line FDS signaling schemes in the case of "GDS2".

Notes:

the capacity is fixed at $C_i^u$=25 and in the bottom half the capacity is fixed at $C_i^u$(MFDS)=25.

4. The column Diff denotes the gain in performance margins between using EQPSD and FDS versus EQPSD, FDS and multi-line FDS signaling, i.e., the difference in margins between the bottom half and top half of each row.

5. Each "GDSL" line contributes self-NEXT and self-FEXT calculated using 2-piece Unger model [8]. In "GDSU" case the self-FEXT level is more dominant than self-NEXT. To model this we take only 1% of the self-NEXT power calculated using 2-piece Unger model in our simulations.

6. These runs were done with no different service (DS) interferers. The results would vary depending on the particular DS interferer(s) present.

Conclusions:

1. Significant gains in margin for small number of lines. The gains decrease with increase in number of lines.

2. There is no gain in margin using multi-line FDS for 5 or more lines (4 Crosstalk disturbers) for these line and interference models.

"VDSL2" service: Table 6 lists our simulation results performance margins and channel capacities using the EQPSD, FDS and multi-line FDS signaling schemes in the case of "VDSL2".

TABLE 5

Uncoded performance margins (in dB) and channel capacities (in Mbps) using EQPSD, FDS and multi-line FDS for "GDSL" (3 kft line).

| Xtalk Src | $M_{E2MFDS}$ | $M_{MFDS2FDS}$ | $M_{FDS2MFDS}$ | $C^u_i$ | $C^u_i$ (MFDS) | Margin | Diff |
|---|---|---|---|---|---|---|---|
| 1 GDSL | 505 | 1253 | 1253 | 25.0046 | 31.6188 | 8.21 | 8.49 |
| 1 GDSL | 245 | 981 | 981 | 16.5141 | 25.0007 | 16.70 | |
| 2 GDSL | 952 | 1214 | 1214 | 25.0007 | 27.3923 | 6.13 | 2.91 |
| 2 GDSL | 825 | 1116 | 1116 | 22.0076 | 25.0030 | 9.04 | |
| 3 GDSL | 1186 | 1212 | 1212 | 25.0004 | 25.6686 | 5.05 | 0.75 |
| 3 GDSL | 1145 | 1186 | 1186 | 24.2172 | 25.0008 | 5.80 | |
| 4 GDSL | 1222 | 1222 | 2000 | 25.0018 | 25.0018 | 4.37 | 0 |

Diff = Difference between bottom half and top half of each row of Margin.

Notes:
1. Sampling frequency $f_s$=8000 kHz, Bin width W=2 kHz and number of subchannels K=2000. Average input power of 20 dBm in each transmission direction.
2. $C_i^u$ denotes the upstream capacity of line i using EQPSD and FDS signaling only and $C_i^u$(MFDS) denotes the upstream capacity of line i using EQPSD, FDS and multi-line FDS signaling schemes. All the rates are in Mbps.
3. The column Margin lists the performance margin when the bit rate is fixed at 12.4 Mbps. In each row in the top half the capacity is fixed at $C_i^u$=12.4 and in the bottom half the capacity is fixed at $C_i^u$(MFDS)=12.4.
4. The column Diff denotes the gain in performance margins between using EQPSD and FDS versus EQPSD, FDS and multi-line FDS signaling, i.e., the difference in margins between the bottom half and top half of each row.
5. Each VDSL2 line contributes self-NEXT and self-FEXT calculated using 2-piece Unger model [8]. In VDSL2 case self-NEXT and self-FEXT both are high but self-NEXT dominates self-FEXT.

TABLE 6

Uncoded performance margins (in dB) channel capacities (in Mbps) using EQPSD, FDS and multi-line FDS for "VDSL2" (3 kft line).

| Xtalk Src | $M_{E2MFDS}$ | $M_{MFDS2FDS}$ | $M_{FDS2MFDS}$ | $C^u_i$ | $C^u_i$ (MFDS) | Margin | Diff |
|---|---|---|---|---|---|---|---|
| 1 VDSL2 | 58  | 236 | 236  | 12.4011 | 24.8234 | 16.022 | 18.913 |
| 1 VDSL2 | 8   | 50  | 50   | 2.5552  | 12.4001 | 34.935 |        |
| 2 VDSL2 | 160 | 219 | 219  | 12.4003 | 18.8073 | 14.074 | 13.476 |
| 2 VDSL2 | 46  | 78  | 78   | 4.4478  | 12.4036 | 27.550 |        |
| 3 VDSL2 | 217 | 217 | 217  | 12.4028 | 15.6002 | 12.985 | 7.765  |
| 3 VDSL2 | 127 | 127 | 127  | 7.3365  | 12.4002 | 20.750 |        |
| 4 VDSL2 | 219 | 219 | 553  | 12.4016 | 13.7787 | 12.250 | 3.275  |
| 4 VDSL2 | 179 | 179 | 359  | 10.1474 | 12.4012 | 15.525 |        |
| 5 VDSL2 | 224 | 224 | 1014 | 12.4014 | 12.9039 | 11.705 | 1.005  |
| 5 VDSL2 | 211 | 211 | 878  | 11.6945 | 12.4014 | 12.710 |        |
| 6 VDSL2 | 231 | 231 | 1455 | 12.4025 | 12.5278 | 11.280 | 0.212  |
| 6 VDSL2 | 229 | 229 | 1412 | 12.2521 | 12.4018 | 11.492 |        |
| 7 VDSL2 | 240 | 240 | 1880 | 12.4004 | 12.4049 | 10.945 | 0.007  |
| 7 VDSL2 | 240 | 240 | 1878 | 12.3954 | 12.4001 | 10.952 |        |

Diff = Difference between bottom half and top half of each row of Margin.

Conclusions:
1. Significant gains in margin for small number of lines. The gains decrease with increase in number of lines.
2. There is no gain in margin using multi-line FDS for 9 or more lines (8 crosstalk disturbers). These runs were done with no different service (DS) interferers. The results would vary depending on the particular DS interferer present.

4.7 Joint signaling for lines differing in channel, noise and interference characteristics We have so far looked at a scenario where all the lines in a binder have the same channel characteristics and experience similar noise and interference characteristics in both directions of transmission. These assumptions made the signaling scheme solutions more tractable. We also need to look at a scenario between neighboring lines in binder groups where the channel characteristics vary (e.g., different length and different gauge lines) and we have different noise and interference characteristics between upstream and downstream transmission (e.g., asymmetrical services like ADSL and VDSL; different coupling transfer function in different directions). In this Section, we derive results for neighboring lines carrying the same service when they differ in channel, noise and interference characteristics. Specifically, we develop test conditions to determine the signaling nature in a given bin k.

4.7.1 Solution for 2 lines: EQPSD and FDS signaling
Consider the case of 2 lines with different channel, noise and interference characteristics. We again divide the channel into several equal bandwidth bins (see FIG. 16) and continue our design and analysis on one frequency bin k assuming the subchannel frequency responses (1)–(3). For ease of notation in this Section, for line 1 we set $$H_1=H_{i,k}, X_1=X_{i,k}, F_1=F_{i,k} \text{ as in (1)–(3)}, \tag{70}$$

and let $$N_1=N_o(f_k)+DS_N(f_k)+DS_F(f_k), \tag{71}$$

be the lumped noise PSD in line 1 bin k. Further, let $P_{m1}$ and $P_{m2}$ be the average powers over range [0, W] Hz in bin k of line 1 and 2 respectively. Let $s_1^{u(f)}$ and $s_1^d(f)$ denote the PSDs in bin k of line 1 upstream and downstream directions and $s_2^u(f)$ and $s_2^d(f)$ denote the PSDs in bin k of line 2 upstream and downstream directions (recall the notation introduced in Section 4.1, Item 9). The corresponding capacities of the subchannel k are denoted by $c_1^u$, $c_1^d$, $c_2^u$ and $c_2^d$.

We desire a signaling scheme that can have FDS, EQPSD and all combinations in between in a frequency bin. Therefore we divide each bin in half and define the upstream and downstream transmit spectra as follows (see FIG. 41):

$$s_1^u(f) = \begin{cases} \alpha \dfrac{2P_{m1}}{W} & \text{if } |f| \le \dfrac{W}{2}, \\ (1-\alpha)\dfrac{2P_{m1}}{W} & \text{if } \dfrac{W}{2} < |f| \le W, \\ 0 & \text{otherwise,} \end{cases} \tag{72}$$

$$s_2^d(f) = \begin{cases} (1-\alpha)\dfrac{2P_{m2}}{W} & \text{if } |f| \le \dfrac{W}{2}, \\ \alpha \dfrac{2P_{m2}}{W} & \text{if } \dfrac{W}{2} < |f| \le W, \\ 0 & \text{otherwise,} \end{cases} \tag{73}$$

$$s_2^u(f) = \begin{cases} \alpha \dfrac{2P_{m2}}{W} & \text{if } |f| \le \dfrac{W}{2}, \\ (1-\alpha)\dfrac{2P_{m2}}{W} & \text{if } \dfrac{W}{2} < |f| \le W, \\ 0 & \text{otherwise,} \end{cases} \tag{74}$$

and $$s_1^d(f) = \begin{cases} (1-\alpha)\frac{2P_{ml}}{W} & \text{if } |f| \leq \frac{W}{2}, \\ \alpha\frac{2P_{ml}}{W} & \text{if } \frac{W}{2} < |f| \leq W, \\ 0 & \text{otherwise,} \end{cases} \quad (75)$$

where $0.5 \leq \alpha \leq 1$. We assume that the upstream and downstream transmit spectra obey power complementarity, i.e. line 1 puts less power where line 2 puts more and vice versa. When $\alpha=0.5$, $s_1^u(f) = s_1^d(f)$, $s_2^u(f) = s_2^d(f) \forall f \in [0, W]$ (EQPSD signaling); when $\alpha=1$, $s_1^u(f)$ and $s_2^u(f)$ are disjoint (FDS signaling). The capacities of opposite directions are equal for each line:

$$c_1^u = c_1^d \text{ and } c_2^u = c_2^d.$$

The factor $\alpha$ controls the power distribution in the bin, and W is the bandwidth of the bin.

Next, we show that the optimal signaling strategy uses only FDS or EQPSD in each subchannel. We also derive a test condition to determine the optimal signaling scheme to use.

The achievable rate for one frequency bin can be written as $$R_A(s_1^u(f), s_2^d(f), s_2^u(f)) = \int_0^W \log_2\left[1 + \frac{s_1^u(f)H_1}{N_1 + s_2^d(f)X_1 + s_2^u(f)F_1}\right] df. \quad (76)$$

Thus, $$c_1^u = \max_{0.5 \leq \alpha \leq 1} R_A(s_1^u(f), s_2^d(f), s_2^u(f)). \quad (77)$$

We will consider the upstream capacity $c_1^u$ expression for our analysis. Further, we will use $R_A$ for $R_A(s_1^u(f), s_2^d(f), s_2^u(f))$ in the remainder of this Section. Substituting for the PSDs from (72), (73) and (74) into (76) and using (77) we get the following expression for the upstream capacity $$c_1^u = \frac{W}{2} \max_{0.5 \leq \alpha \leq 1} \left\{ \log_2\left[1 + \frac{\alpha 2 P_{ml} H_1/W}{N_1 + \frac{(1-\alpha)2P_{m2}X_1}{W} + \frac{\alpha 2 P_{m2} F_1}{W}}\right] + \log_2\left[1 + \frac{(1-\alpha)2P_{ml} H_1/W}{N_1 + \frac{\alpha 2 P_{m2} X_1}{W} + \frac{(1-\alpha)2P_{m2}F_1}{W}}\right] \right\}. \quad (78)$$

Let $$G_1 = \frac{2P_{ml}}{WN_1}, \text{ and } G_2 = \frac{2P_{m2}}{WN_1}$$

denote the SNRs in the bin due to line 1 and line 2 respectively. Then, we can rewrite (78) as $$c_1^u = \max_{0.5 \leq \alpha \leq 1} \frac{W}{2} \left\{ \log_2\left[1 + \frac{\alpha G_1 H_1}{1 + (1-\alpha)G_2 X_1 + \alpha G_2 F_1}\right] + \log_2\left[1 + \frac{(1-\alpha)G_1 H_1}{1 + \alpha G_2 X_1 + (1-\alpha)G_2 F_1}\right] \right\} \quad (79)$$

Using (77) and differentiating the achievable rate ($R_A$) expression in (79) with respect to $\alpha$ gives us $$\frac{\partial R_A}{\partial \alpha} = (2\alpha - 1)[G_2^2(X_1^2 - F_1^2) + 2G_2(X_1 - F_1) - G_1 H_1(G_2 F_1 + 1)]L, \quad (80)$$

with $L > 0 \; \forall \alpha \in (0, 1]$. Setting the derivative to zero gives us the single stationary point $\alpha=0.5$. Thus, the achievable rate $R_A$ is monotonic in the interval $\alpha \in (0.5, 1]$ (see FIG. 24). If the value $\alpha=0.5$ corresponds to a maximum of $R_A$, then it is optimal to perform EQPSD signaling in this bin. If the value $\alpha=0.5$ corresponds to a minimum of $R_A$, then the maximum is achieved by the value $\alpha=1$, meaning it is optimal to perform FDS signaling in this bin. No other values of $\alpha$ are an optimal option.

The quantity $\alpha=0.5$ corresponds to a maximum of $R_A$ (EQPSD) if and only if $$\frac{\partial R_A}{\partial \alpha} < 0 \; \forall \alpha \in (0.5, 1].$$

For all $\alpha \in (0.5, 1]$, $$\frac{\partial R_A}{\partial \alpha}$$

is negative if and only if (see (80))

$$G_2^2(X_1^2 - F_1^2) + 2G_2(X_1 - F_1) - G_1 H_1(G_2 F_1 + 1) < 0.$$

This implies that $$G_1 > \frac{G_2^2(X_1^2 - F_1^2) + 2G_2(X_1 - F_1)}{G_2 F_1 H_1 + H_1}. \quad (81)$$

In a similar fashion $\alpha=0.5$ corresponds to a minimum of $R_A$ if and only if $$\frac{\partial R_A}{\partial \alpha} > 0 \; \forall \alpha \in (0.5, 1].$$

This implies that $\alpha=1$ corresponds to a maximum (FDS) since there is only one stationary point in the interval $\alpha \in [0.5, 1]$ (see FIG. 24). For all $\alpha \in (0.5, 1]$, $$\frac{\partial R_A}{\partial \alpha}$$

is positive if and only if (see (80))

$$G_2^2(X_1^2 - F_1^2) + 2G_2(X_1 - F_1) - G_1 H_1(G_2 F_1 + 1) > 0.$$

This implies that $$G_1 < \frac{G_2^2(X_1^2 - F_1^2) + 2G_2(X_1 - F_1)}{G_2 F_1 H_1 + H_1}. \quad (82)$$

The above statements can be summed in a test condition to determine the signaling nature (FDS or EQPSD) in a given bin. Using (81) and (82) we can write $$G_1 = \frac{2P_{ml}}{N_1 W} \overset{EQPSD}{\underset{FDS}{\gtrless}} \frac{G_2^2(X_1^2 - F_1^2) + 2G_2(X_1 - F_1)}{G_2 F_1 H_1 + H_1}. \quad (83)$$

Thus, we can write the upstream capacity $c_1^u$ of line 1 in bin k as $$c_1^u = \begin{cases} W\log_2\left[1 + \frac{P_{ml}H_1}{N_1 W + P_{m2}(X_1 + F_1)}\right], & \text{if } \alpha = 0.5, \\ \frac{W}{2}\log_2\left[1 + \frac{2P_{ml}H_1}{N_1 W + 2P_{m2}F_1}\right], & \text{if } \alpha = 1. \end{cases} \quad (84)$$

4.7.2 Solution for M lines: EQPSD and FDS signaling
It is straightforward to generalize the result in the previous Section to M lines where each line i has parameters $H_i$, $G_i$, $P_{mi}$, $X_i$ and $F_i$ for $i \in \{1, \ldots, M\}$. Further, we assume that the self-NEXT and self-FEXT coupling transfer functions between lines 2, ..., M and line 1 are all the same. The test condition to determine signaling nature (EQPSD or FDS) in bin k of line 1 for M line case can be written as $$G_1 = \frac{2P_{ml}}{N_1 W} \overset{EQPSD}{\underset{FDS}{\gtrless}} \frac{\left(\sum_{i=2}^{M} G_i\right)^2 (X_1^2 - F_1^2) + 2\left(\sum_{i=2}^{M} G_i\right)(X_1 - F_1)}{\left(\sum_{i=2}^{M} G_i\right) F_1 H_1 + H_1}. \quad (85)$$

We can write the upstream capacity of line 1 in bin k as $$c_1^u = \begin{cases} W\log_2\left[1 + \frac{P_{ml}H_1}{N_1 W + \left(\sum_{i=2}^{M} P_{mi}\right)(X_1 + F_1)}\right], & \text{if } \alpha = 0.5, \\ \frac{W}{2}\log_2\left[1 + \frac{2P_{ml}H_1}{N_1 W + 2\left(\sum_{i=2}^{M} P_{mi}\right)F_1}\right], & \text{if } \alpha = 1. \end{cases} \quad (86)$$

4.7.3 Solution for 2 lines: EQPSD and multi-line FDS signaling
We saw in Section 4.6.8 that in the case of two lines it is optimal to use multi-line FDS instead of FDS signaling. In this Section we will derive a test condition to determine the signaling nature in a given bin. We use the notation as introduced in Section 4.7.1.

We desire a signaling scheme that supports multi-line FDS, EQPSD, and all combinations in between in a frequency bin. Therefore we divide each bin in half and define the upstream and downstream transmit spectra as follows (see FIG. 42):

$$s_1^u(f) = s_1^d(f) = \begin{cases} \alpha \frac{2P_{ml}}{W} & \text{if } |f| \leq \frac{W}{2}, \\ (1-\alpha)\frac{2P_{ml}}{W} & \text{if } \frac{W}{2} < |f| \leq W, \\ 0 & \text{otherwise}, \end{cases} \quad (87)$$

$$s_2^d(f) = s_2^u(f) = \begin{cases} (1-\alpha)\frac{2P_{m2}}{W} & \text{if } |f| \leq \frac{W}{2}, \\ \alpha \frac{2P_{m2}}{W} & \text{if } \frac{W}{2} < |f| \leq W, \\ 0 & \text{otherwise}, \end{cases} \quad (88)$$

where $0.5 \leq \alpha \leq 1$. We assume that the upstream and downstream transmit spectra obey power complementarity, i.e., line 1 puts less power where line 2 puts more and vice versa. In further discussion we will use transmit spectra $s_1^u(f)$ and $s_2^d(f)$. When $\alpha=0.5$, $s_1^u(f)=s_2^d(f)$, $\forall f \in [0, W]$ (EQPSD signaling); when $\alpha=1$, $s_1^u(f)$ and $s_2^d(f)$ are disjoint (FDS signaling). The capacities of opposite directions are equal for each line:

$$c_1^u = c_1^d \text{ and } c_2^u = c_2^d.$$

The factor $\alpha$ controls the power distribution in the bin and W is the bandwidth of the bin.

Next, we show that the optimal signaling strategy uses only EQPSD or multi-line FDS in each subchannel and derive a test condition to determine the signaling scheme to use.

The achievable rate for one frequency bin can be written as $$R_A(s_1^u(f), s_2^d(f), s_2^u(f)) = \int_0^W \log_2\left[1 + \frac{s_1^u(f) H_1}{N_1 + s_2^d(f) X_1 + s_2^u(f) F_1}\right] df, \quad (89)$$

then $$c_1^u = \max_{0.5 \leq \alpha \leq 1} R_A(s_1^u(f), s_2^d(f), s_2^u(f)). \quad (90)$$

We will consider the upstream capacity $c_1^u$ expression for our analysis. Further, we will use $R_A$ for $R_A(s_1^u(f), s_2^d(f), s_2^u(f))$ in the remainder of this Section. Substituting for the PSDs from (72) and (73) into (89) and using (90) we get the following expression for the upstream capacity $$c_1^u = \frac{W}{2} \max_{0.5 \leq \alpha \leq 1} \left\{ \log_2\left[1 + \frac{\alpha \frac{2P_{ml} H_1}{W}}{N_1 + \frac{(1-\alpha)2P_{m2}X_1}{W} + \frac{(1-\alpha)2P_{m2}F_1}{W}}\right] + \log_2\left[1 + \frac{\frac{(1-\alpha)2P_{ml} H_1}{W}}{N_1 + \frac{\alpha 2P_{m2}X_1}{W} + \frac{\alpha 2P_{m2}F_1}{W}}\right] \right\}. \quad (91)$$

Let $$G_1 = \frac{2P_{ml}}{W N_1}, \text{ and } G_2 = \frac{2P_{m2}}{W N_1}$$

denote the SNRs in the bin due to line 1 and line 2 respectively. Then, we can rewrite (91) as $$c_1^u = \max_{0.5 \leq \alpha \leq 1} \frac{W}{2} \left\{ \log_2\left[1 + \frac{\alpha G_1 H_1}{1 + (1-\alpha)G_2 X_1 + (1-\alpha)G_2 F_1}\right] + \log_2\left[1 + \frac{(1-\alpha) G_1 H_1}{1 + \alpha G_2 X_1 + \alpha G_2 F_1}\right] \right\}. \quad (92)$$

Using (90) and differentiating the achievable rate ($R_A$) expression in (92) with respect to $\alpha$ gives us $$\frac{\partial R_A}{\partial \alpha} = (2\alpha - 1)\left[G_2^2(X_1 + F_1)^2 + 2G_2(X_1 + F_1) - G_1 H_1\right] L, \quad (93)$$

with $L > 0 \ \forall \alpha \in (0, 1]$. Setting the derivative to zero gives us the single stationary point $\alpha=0.5$. Thus, the achievable rate $R_A$ is monotonic in the interval $\alpha \in (0.5, 1]$ (see FIG. 24). If the value $\alpha=0.5$ corresponds to a maximum of $R_A$, then it is optimal to perform EQPSD signaling in this bin. If the value $\alpha=0.5$ corresponds to a minimum of $R_A$, then the maximum is achieved by the value $\alpha=1$, meaning it is optimal to perform multi-line FDS signaling in this bin. No other values of $\alpha$ are an optimal option.

The quantity $\alpha=0.5$ corresponds to a maximum of $R_A$ (EQPSD) if and only if $$\frac{\partial R_A}{\partial \alpha} < 0 \; \forall \, \alpha \in (0.5, 1].$$

For all $\alpha \in (0.5, 1]$, $$\frac{\partial R_A}{\partial \alpha}$$

is negative if and only if (see (93))

$$G_2^2(X_1+F_1)^2 + 2G_2(X_1+F_1) - G_1 H_1 < 0.$$

This implies that $$G_1 > \frac{G_2^2(X_1+F_1)^2 + 2G_2(X_1+F_1)}{H_1}. \tag{94}$$

In a similar fashion $\alpha=0.5$ corresponds to a minimum of $R_A$ if and only if $$\frac{\partial R_A}{\partial \alpha} > 0 \; \forall \, \alpha \in (0.5, 1].$$

This implies that $\alpha=1$ corresponds to a maximum of $R_A$ (multi-line FDS) since there is only one stationary point in the interval $\alpha \in [0.5, 1]$ (see FIG. 24). For all $\alpha \in (0.5, 1]$, $$\frac{\partial R_A}{\partial \alpha}$$

is positive if and only if (see (93))

$$G_2^2(X_1+F_1)^2 + 2G_2(X_1+F_1) - G_1 H_1 > 0.$$

This implies that $$G_1 < \frac{G_2^2(X_1+F_1)^2 + 2G_2(X_1+F_1)}{H_1}. \tag{95}$$

The above statements can be summed in a test condition to determine the signaling nature (EQPSD or multi-line FDS) in a given bin. Using (94) and (95) we can write $$G_1 = \frac{2P_{ml}}{N_1 W} \begin{array}{c} \text{EQPSD} \\ > \\ < \\ \text{multi-line FDS} \end{array} \frac{G_2^2(X_1+F_1)^2 + 2G_2(X_1+F_1)}{H_1}. \tag{96}$$

Thus, we can write the upstream capacity cu of line 1 in bin k as $$c_1^u = \begin{cases} W \log_2\left[1 + \frac{P_{ml} H_1}{N_1 W + P_{m2}(X_1+F_1)}\right], & \text{if } \alpha = 0.5, \\ \frac{W}{2} \log_2\left[1 + \frac{2 P_{ml} H_1}{N_1 W}\right], & \text{if } \alpha = 1. \end{cases} \tag{97}$$

4.8 Optimizing under a PSD mask constraint: No self-interference

In this Section we will impose an additional peak power constraint in frequency, i.e., a limiting static PSD mask constraint. This implies that no transmit spectrum can lie above the PSD mask constraint. This constraint is in addition to the average power constraint. We shall obtain optimal transmit spectra for an xDSL line under these constraints, in the absence of self-interference.

4.8.1 Problem statement

Maximize the capacity of an xDSL line in the presence of AGN and interference (DSIN-NEXT and DSIN-FEXT) from other services under two constraints:

1. The xDSL transmit spectra are limited by constraining static PSD masks; $Q^u(f)$ for upstream and $Q^d(f)$ for downstream.
2. The average xDSL input power in each direction of transmission must be limited to $P_{max}$ (Watts).

Do this by designing the distribution of energy over frequency (the transmit spectrum) of the xDSL transmission.

4.8.2 Solution

Consider a line (line 1) carrying an xDSL service. Line 1 experiences interference from other neighboring services (DSIN-NEXT and DSIN-FEXT) and channel noise $N_o(f)$ (AGN) but no self-NEXT or self-FEXT (see FIG. 19).

The twisted pair channel can be treated as a Gaussian channel with colored Gaussian noise [13]. Recall that $DS_N(f)$ is the PSD of the combined DSIN-NEXT and $DS_F(f)$ is the PSD of the combined DSIN-FEXT. Let $S^u(f)$ and $S^d(f)$ denote the PSDs of line 1 upstream (u) direction and downstream (d) direction transmitted signals, respectively. Further, let $C^u$ and $C^d$ denote the upstream and downstream direction capacities of line 1 respectively. Let $H_C(f)$ denote the channel transfer function of line 1.

The channel capacities (in bps) are given by [14]

$$C^u = \sup_{S^u(f)} \int_0^\infty \log_2\left[1 + \frac{|H_C(f)|^2 S^u(f)}{N_o(f) + DS_N(f) + DS_F(f)}\right] df \tag{98}$$

and $$C^d = \sup_{S^d(f)} \int_0^\infty \log_2\left[1 + \frac{|H_C(f)|^2 S^d(f)}{N_o(f) + DS_N(f) + DS_F(f)}\right] df. \tag{99}$$

The supremum is taken over all possible $S^u(f)$ and $S^d(f)$ satisfying the average power constraints for the two directions $$2\int_0^\infty S^u(f) df \leq P_{max} \text{ and } 2\int_0^\infty S^d(f) df \leq P_{max}, \tag{100}$$

and the positivity and new peak power constraints $$0 \leq S^u(f) \leq Q^u(f) \forall f \text{ and } 0 \leq S^d(f) \leq Q^d(f) \forall f, \tag{101}$$

Note that these equations are the same as (4)–(6) except for the additional peak power constraint in frequency. For discussion purposes, we will focus on the upstream transmission. The same analysis can be applied to the downstream channel.

We wish to maximize (98) subject to the constraints (100), (101). The constraints (100), (101) are differentiable and concave. Further, the objective function to be maximized (98) is also concave (the log function is concave). Any solution to this problem must satisfy the necessary KKT (Karush-Kuhn-Tucker) [22] conditions for optimality. For a concave objective function and concave, differentiable constraints, any solution that satisfies the necessary KKT conditions is a unique globally optimal solution [22]. Thus, we seek any solution that satisfies the KKT conditions, since it is automatically the unique optimal solution.

The optimal solution to (98), (99), (100), (101) is basically a "peak-constrained water-filling".[6] The optimal transmit spectrum is given by

[6]Peak-constrained water-filling can be likened to filling water in a closed vessel with uneven top and bottom surfaces.

$$S_{opt}^u(f) = \begin{cases} \lambda - \dfrac{N_o(f) + DS_N(f) + DS_F(f)}{|H_C(f)|^2} & \text{for } f \in E_{pos}, \\ Q^u(f) & \text{for } f \in E_{max}, \\ 0 & \text{otherwise,} \end{cases} \quad (102)$$

with $\lambda$ a Lagrange multiplier. The spectral regions $E_{pos}$ and $E_{max}$ are specified by $$E_{pos} = \{f: 0 \leq S^u(f) \leq Q^u(f)\}, \text{ and}$$

$$E_{max} = \{f: S^u(f) > Q^u(f)\}. \quad (103)$$

We vary the value of $\lambda$ to achieve the optimal transmit spectrum $S_{opt}^u(f)$ that satisfies the average and peak power constraints (100), (101). It can be easily shown that this solution satisfies the KKT conditions for optimality. Substituting the optimal PSD $S_{opt}^u(f)$ into (98) yields the capacity $C^u$ under the average and peak power constraints.

Note that if the maximum allowed average power ($P_{max}$) exceeds the power under the constraining mask then the optimal transmit spectrum is the constraining PSD mask itself. In the absence of an average power constraint (but with a peak power constraint) the optimal transmit spectrum is again the constraining PSD mask.

4.8.3 Examples

In this Section we consider a line carrying HDSL2 service under the OPTIS [5] constraining PSD mask and input power specifications. An average input power ($P_{max}$) of 19.78 dBm and a fixed bit rate of 1.552 Mbps was used for all simulations.

FIG. 43 shows the optimal downstream transmit spectrum for HDSL2 with OPTIS downstream constraining mask in the presence of DSIN-NEXT from 49 HDSL interferers and AGN (−140 dBm/Hz). The key features in the case of HDSL interferers are:

1. Comparing the peak-constrained transmit spectrum in FIG. 43 with the unconstrained in peak power one in FIG. 21 indicates that the peak-constrained optimal solution tries to follow the unconstrained in peak power optimal solution. The peak-constrained optimal solution has a null in the spectrum around 150 kHz similar to the one in the unconstrained in peak power spectrum. The null in the transmit spectra occurs in order to avoid the interfering HDSL transmit spectrum.

2. An OPTIS transmit spectrum, achieved by tracking 1 dBm/Hz below the OPTIS PSD mask throughout, does not yield good performance margins (see Table 7). The OPTIS transmit spectrum looks different from the peak-constrained optimal spectrum (see FIG. 43). The null in the peak-constrained optimal spectrum (which is not seen in the OPTIS transmit spectrum) indicates that it is suboptimal to distribute power according to the OPTIS transmit spectrum.

TABLE 7

Uncoded performance margins (in dB) for CSA No. 6: OPTIS vs. Peak-constrained Optimal "under OPTIS"

| Crosstalk Src | xDSL service | OPTIS | | Optimal | | Diff | |
|---|---|---|---|---|---|---|---|
| | | Dn | Up | Dn | Up | Dn | Up |
| 49 HDSL | HDSL2 | 12.24 | 2.7 | 13.74 | 3.74 | 1.54 | 1.03 |
| 25 T1 | HDSL2 | 17.5 | 19.9 | 18.81 | 20.43 | 1.31 | 0.53 |
| 39 self | HDSL2 | 9.0 | 2.1 | 15.51 | 17.58 | 6.51 | 15.48 |
| 24 self + 24 T1 | HDSL2 | 1.7 | 4.3 | 4.74 | 4.52 | 3.04 | 0.22 |

Bit rate fixed at 1.552 Mbps.
Average Input power = 19.78 dBm.
Diff (Dn) = Difference in Downstream margins (Optimal − OPTIS)
Diff (Up) = Difference in Upstream margins (Optimal − OPTIS)

FIG. 44 shows the optimal upstream transmit spectrum for HDSL2 with OPTIS upstream constraining mask in the presence of DSIN-NEXT from 25 T1 interferers and AGN (−140 dBmV/Hz). Again, we compare the peak-constrained transmit spectrum in FIG. 44 with the unconstrained in peak power one in FIG. 22. Note that the peak-constrained optimal transmit spectrum puts no power in the high-frequency spectrum (to avoid T1 interference) as opposed to an OPTIS transmit spectrum.

4.9 Optimizing Under a PSD Mask Constraint: With Self-interference

The solution outlined in the previous Section applies only in the absence of self-interference. In this Section we will find an optimal transmit spectrum in the presence of additional self-NEXT and self-FEXT. We will impose a peak power constraint in frequency, i.e., a limiting static PSD mask constraint, in addition to the average power and symmetric bit-rate constraints. We will obtain the optimal transmit spectra for an xDSL line under these constraints in the presence of self-interference.

4.9.1 Problem statement

Maximize the capacity of an xDSL line in the presence of AGN, interference (DSIN-NEXT and DSIN-FEXT) from other services, and self-interference (self-NEXT and self-FEXT) under three constraints:

1. The xDSL transmit spectra are limited by constraining static PSD masks; $Q^u(f)$ for upstream and $Q^d(f)$ for downstream.

2. The average xDSL input power in each direction of transmission must be limited to $P_{max}$ (Watts).

3. Equal capacity in both directions (upstream and downstream) for xDSL.

Do this by designing the distribution of energy over frequency (the transmit spectra) of the xDSL transmissions.

Additional assumptions are made in this case as given in Section 4.5.3 or 4.6.3 depending on the signaling scheme used.

4.9.2 Solution

Consider a line (line 1) carrying xDSL service. Line 1 experiences interference from other neighboring services (DSIN-NEXT and DSIN-FEXT), channel noise $N_o(f)$ (AGN), and self-interference (self-NEXT and self-FEXT) (see FIG. 3).

We need to find peak-constrained optimal transmit spectra for upstream and downstream transmission. We let the constraining PSD mask $Q(f)$ be the maximum of the two upstream and downstream constraining masks ($Q^u(f)$ and $Q^d(f)$). We then employ the solutions as described in Sections 4.5 or 4.6 but limit the peak power to the constraining mask $Q(f)$. Thus, we obtain a peak-constrained transmit spectrum $S^{opt}(f)$. Using this mask, we optimally group the bins (see Section 4.5.10) to obtain optimal upstream and downstream transmit spectra ($S_1^u(f)$ and $S_1^d(f)$).

4.9.3 Algorithm for peak-constrained optimization of the transmit spectra

1. Choose the constraining PSD mask as $$Q(f)=\max(Q^u(f), Q^d(f)) \forall f.$$

2. Solve for the optimal transmit spectrum $S_{opt}^u(f)$ according to the algorithms in Sections 4.5.7, 4.5.8, or 4.6 with the following added constraint:

$$S_{opt}^u(f) = \begin{cases} Q(f) & \forall f \text{ where } S^u(f) > Q(f), \\ S^u(f) & \text{otherwise,} \end{cases} \quad (104)$$

where $S^u(f)$ is the water-filling solution (refer to [14] if the spectral region employs EQPSD or multi-line FDS signaling and to [16] if the spectral region employs FDS signaling) (see Sections 4.5 and 4.6). This is the peak-constrained water-filling solution in the presence of self-interference. As argued in the previous Section, this solution satisfies the necessary KKT conditions for optimality and therefore is the unique optimal solution.

3. Denote the spectral region employing FDS signaling as EFDS and the spectral region employing EQPSD signaling as $E_{EQPSD}$.

Obtain $S_{opt}^d(f)$ from $S_{opt}^u(f)$ by symmetry, i.e., $S_{opt}^d(f) = S_{opt}^u(f)$ in EQPSD and multi-line FDS regions and $S_{opt}^d(f) \perp S_{opt}^u(f)$ in FDS spectral regions. Merge $S_{opt}^d(f)$ and $S_{opt}^u(f)$ to form $S_{opt}(f)$ as $$S_{opt}(f)=S_{opt}^u(f)=S_{opt}^d(f) \; \forall f \text{ in } E_{EQPSD},$$

$$S_{opt}(f)=S_{opt}^u(f) \cup S_{opt}^d(f) \; \forall f \text{ in } E_{FDS}, \quad (105)$$

where $\cup$ represents the union of the two transmit spectra. Group the bins to obtain upstream and downstream masks as $$S_1^u(f)=S_{opt}(f) \; \forall f \text{ in } E_{FDS} \text{ and where } Q^u(f) \geq Q^d(f),$$

$$S_1^d(f)=S_{opt}(f) \; \forall f \text{ in } E_{FDS} \text{ and where } Q^u(f) < Q^d(f) \quad (106)$$

in $E_{FDS}$ and $$S_1^u(f)=S_1^d(f)=S_{opt}(f) \; \forall \kappa \text{ in } E_{EQPSD}. \quad (107)$$

4. Check if the average power constraint is violated for upstream or downstream transmission.

5. If the average power constraint is violated for direction o (i.e., the total transmit power in the direction o is more than $P_{max}$)[7] then transfer power from $S_i^o(f)$ to $S_1^{\bar{o}}(f)$. Transfer power first from spectral regions of $S_1^o(f)$ to $S_1^{\bar{o}}(f)$ with the least $S_1^o(f)-S_1^{\bar{o}}(f)$ difference. Repeat this successively in spectral regions with increasing $S_1^o(f)-S_1^{\bar{o}}(f)$ difference until the average power in both directions is the same.[8] We transfer power from one direction o to the other direction $\bar{o}$ in spectral regions where the difference in power between the two transmission directions is the least until the power between the two directions becomes equal. This power transfer scheme is in a sense optimal as it tries to even out the powers between the two directions, with the least loss in the total sum of the transmit powers of the two directions.

If the difference $S_1^o(f)-S_1^{\bar{o}}(f)$ is the same (or marginally varying) for a range of frequencies, then transfer power from direction o to direction $\bar{o}$ in those spectral regions that give the maximum gain in bit rates for direction $\bar{o}$.

[7]Note that if the total transmit power in direction o is more than $P_{max}$ then the transmit power in direction $\bar{o}$ is less than $P_{max}$.
[8]This approach of transferring power from direction o to direction $\bar{o}$ can be likened to "stealing from the rich and giving to the poor."

4.9.4 Examples and results

In this Section we consider a line carrying HDSL2 service under the OPTIS [5] constraining PSD mask and input power specifications. An average input power ($P_{max}$) of 19.78 dBm and a fixed bit rate of 1.552 Mbps was used for all simulations.

FIG. 45 shows the optimal upstream and downstream transmit spectra for HDSL2 with OPTIS constraining masks in the presence of self-NEXT and self-FEXT from 39 HDSL2 interferers and AGN (−140 dBm/Hz). Note that the optimal upstream and downstream transmit spectra are separated in frequency (using FDS signaling) in a large spectral region in order to avoid high self-NEXT. On the other hand, OPTIS transmit spectra have a large spectral overlap at lower frequencies (self-NEXT is high here) that significantly reduces its performance margins (see Table 7).

FIG. 46 shows the optimal upstream and downstream transmit spectra for HDSL2 with OPTIS constraining masks in the presence of self-NEXT and self-FEXT from 24 HDSL2 interferers, DSIN-NEXT from 24 T1 interferers, and AGN (−140 dBmlHz). Again, we see that the upstream and downstream optimal spectra are separated in frequency (using FDS signaling) over a large spectral region. However, the EQPSD spectral region towards the beginning of the spectrum is larger here than in the previous example, since we have more DSIN-NEXT from T1.

Key here is that optimal transmit spectra employ optimal separation in frequency of upstream and downstream services in the presence of interference. The "1 dB below OPTIS" transmit spectra do not do this, and so have inferior performance.

Table 7 compares the performance margins of the OPTIS transmit spectra (obtained from the OPTIS PSD mask by uniformly subtracting 1 dBm/Hz over the entire frequency range as in [5]) with the optimal transmit spectra under the OPTIS PSD mask constraints. Table 7 shows that the optimal scheme significantly out performs OPTIS in the case of self-interference. In cases involving different service interferers (HDSL and T1) the optimal scheme consistently outperforms OPTIS by 1 dB or more. Further, comparing these results with those in Table 1 suggests that the OPTIS PSD mask is not a good constraining PSD mask, since the unconstrained in peak power margins in Table 1 are significantly higher than the ones in Table 7. Comparing Tables 1 and 7 suggests that optimal signaling with no peak power constraint (static PSD mask) gives high performance margin gains.

4.10 Bridged Taps

Bridged taps (BTs) are short segments of twisted pairs that attach to another twisted pair that carries data between the subscriber and the CO. BTs are terminated at the other end with some characteristic impedance. BTs reflect the signals on the data-carrying line. These reflections destructively interfere with the transmitted signal over certain frequencies. This leads to nulls in the channel transfer function and the self-FEXT transfer function at these frequencies (see FIG. 48). These nulls in the channel transfer function significantly reduce the data transmission rate. Thus, bridged taps pose an important problem in achieving high bit rates over xDSL lines.[9]

[9]Bridged taps can be removed from xDSL lines, but this is an expensive (labor-intensive) procedure.

Bridged taps presence, location, and length vary according to each loop setup. Thus, the effect of BTs on the transmission signals is different for each loop. This means that the channel transfer function nulls (in frequency) vary for each separate line. We need to adapt the transmit spectrum to the channel conditions in order to achieve high bit-rates. We need the optimal power distribution that maximizes the bit-rates in the presence of bridged taps and interference. This further enforces the need for optimal dynamic transmit spectra and indicates that static transmit spectra are not a good idea. In this Section, we present optimal and near-optimal solutions to find the transmit spectra in the presence of BTs.

4.10.1 Optimal transmit spectra

Optimal signaling is more computationally expensive to implement in the presence of bridged taps [3], as the channel transfer function has nulls and thus loses its monotonicity. In this scenario, even the self-FEXT transfer function has nulls. In spite of this, the overall optimal solution can be obtained by a bin by bin analysis:

1. Divide the frequency axis into narrow bins or subchannels. Compute channel transfer function, various interference transfer functions, and AGN.
2. Choose an initial power distribution of $P_{max}$ over all bins.
3. Given the powers in each bin decide the optimal signaling scheme in each bin. Compute capacities for each bin and hence compute channel capacity.
4. Re-distribute the powers in each bin by water-filling [14], [16], decide the optimal signaling scheme in each bin, and re-calculate the channel capacity. Repeat this step until we find the maximum possible channel capacity. It can be exceedingly computationally intensive to find the optimal power distribution over all bins. There can be several local maxima for the channel capacity curve, and there is no guarantee that a search algorithm will converge to the global maximum.

The optimal power distribution algorithm suggests that EQPSD, FDS, and multi-line FDS bins could be randomly distributed throughout the transmission bandwidth. The search for the optimal switchover bins from one signaling scheme to the other could be exceedingly expensive (involving a multi-dimensional search).

4.10.2 Suboptimal transmit spectra

We saw in the previous Section that the optimal transmit spectrum could be very expensive to obtain. However, we can always get a good suboptimal solution for line i as follows:

1. Divide the frequency axis into narrow bins or subchannels as in Section 4.1. Compute channel transfer function ($H_C(f)$), the various interference transfer functions ($H_N(f)$, $H_F(f)$, $DS_N(f)$, and $DS_F(f)$), and AGN ($N_o(f)$). Obtain subchannel values ($H_{i,k}$, $X_{i,k}$, $F_{i,k}$) for each bin using (1)–(3) and (13). Let k denote the bin number.
2. Use the condition evaluations in (26) and (27) to determine the signaling scheme (EQPSD or FDS) in each bin. For each bin:
   If $(X_{i,k}^2 - F_{i,k}^2 - H_{i,k}F_{i,k} < 0)$ and the right side of (26)<0, then employ EQPSD signaling in that bin (since power in every bin $\geq 0$).
   If $(X_{i,k}^2 - F_{i,k}^2 - H_{i,k}F_{i,k} > 0)$ and the right side of (27)<0, then employ FDS signaling in that bin (since power in every bin $\geq 0$).
   Employ FDS signaling if both the above conditions are not satisfied.
3. Perform the optimal power distribution under average power constraint of $P_{max}$ using water-filling technique [14], [16].
4. Use condition evaluations in (46) and (54) to determine bins employing multi-line FDS. Redistribute power optimally using water-filling technique. This step is optional and indicates which bins employ multi-line FDS signaling.

The suboptimal solution determines the signaling strategy in each bin by simple, fast comparisons involving transfer functions and SNRs. This is followed by a simple optimal power distribution scheme using the water-filling technique.

Note that the optimal and suboptimal algorithms can be implemented under a peak frequency-domain power constraint (static PSD mask). This is achieved by using peak-constrained water-filling technique (instead of just water-filling) for optimal power distribution (see Sections 4.8 and 4.9) in the algorithms given in Sections 4.10.1 and 4.10.2.

4.10.3 Examples and discussion

Optimal transmit spectra: Theoretically, the optimal transmit spectrum in the presence of BTs can have several switchover bins from one signaling scheme to the other (for e.g., EQPSD to FDS and FDS to EQPSD switchover bins). However, we argue that in most of the symmetrical data-rate services (like HDSL2 and "VDSL2") there is only one switchover bin from EQPSD to FDS inspite of bridged taps.

As frequency increases, the self-NEXT transfer function rapidly increases but the self-FEXT and the channel transfer functions generally decrease even for bridged taps case (see FIGS. 17 and 48). Thus, the quantity $X_{i,k}^2 - F_{i,k}^2 - H_{i,k}F_{i,k}$ tends to be an increasing function of frequency or bin number k, and stays positive once it becomes positive. Similarly, the quantity $H_{i,k} - 2(X_{i,k} - F_{i,k})$ tends to decrease with frequency or bin number k and stays negative once it becomes negative. Using the condition evaluations (26) and (27) for all the frequency bins indicate that there is only one EQPSD to FDS switchover bin. Our studies indicate that is indeed true for a wide range of loops having bridged taps and employing HDSL2, "VDSL2" or similar symmetric services. The optimal switchover bin along with the optimal transmit spectrum can be determined using the algorithm in Section 4.5.7.

FIG. 47 illustrates a case of "contiguous" optimal transmit spectra in case of a loop with bridged taps (CSA loop 4). We can clearly see that the optimal transmit spectra have only one transition region from EQPSD to FDS signaling. The transmit spectra were obtained such that we have equal performance margins and equal average powers in both directions of transmission.

Suboptimal transmit spectra: We presented strong arguments in support of only one EQPSD to FDS switchover bin in the previous paragraph. However, there can be exceptions when the arguments do not hold, and we have multiple EQPSD and FDS regions (see FIG. 48).

Consider a hypothetical case of a short loop (1.4 kft with 3 bridged taps) carrying the "GDSL" service. The channel transfer function, self-NEXT, and self-FEXT transfer functions are illustrated at the top of FIG. 48. Note that for "GDSL" service the self-NEXT is assumed very low. Since the self-NEXT is low, the non-monotonicity of the self-FEXT and the channel transfer function lead to distributed EQPSD and FDS regions across the transmission bandwidth as illustrated in the bottom of FIG. 48. In such a scenario, the optimal power distribution algorithm of Section 4.10.1 is exceedingly difficult to implement. However we can easily implement the suboptimal solution as given in Section 4.10.2

4.11 Optimization: Asymmetrical Data-rate Channels

Asymmetrical data-rate channels have different upstream and downstream transmission rates, for e.g., ADSL and VDSL services. These channels also employ different average powers in the two transmission directions. We find joint signaling strategies and optimal power distribution for these channels using similar approaches as described in previous Sections (see Sections 4.5, and 4.6). In this case we assume the knowledge of the ratio of average powers between upstream and downstream directions.

4.12 Extensions

4.12.1 More general signaling techniques

The signaling techniques outlined earlier are not the only techniques that can give us improved capacity results. One possible scheme is illustrated in FIG. 49. In this Figure, $UP_i$ and $DOWN_i$ refer to line i, upstream and downstream direction PSDs respectively. In this scheme, we use multi-line FDS between group of lines (1 and 2) having high self-NEXT and high self-FEXT with other group of lines (3 and 4). However, there is EQPSD among group of lines (1 and 2 employ EQPSD as do 3 and 4) that have low self-NEXT and low self-FEXT within the group. This scheme can be extended for M self-interfering lines (with different self-NEXT and self-FEXT combinations between them) using combination of EQPSD, FDS, and multi-line FDS signaling schemes between different lines and frequency bins.

The above scheme can be applied in the case of groups of lines with different self-interference (self-NEXT and self-FEXT) characteristics between different set of lines.

4.12.2 More general interferer models

If the self-NEXT and self-FEXT interferer model cannot be easily characterized by monotonicity in regions, (that is, if they vary rapidly and non-monotonously from one subchannel to the other), then we must search for the overall optimal solution on a bin by bin basis. This search is outlined in the Section 4.10 on bridged taps.

4.12.3 Channel variations

Some channels (e.g., the geophysical well-logging wireline channel) undergo a significant change in channel transfer function $H_c(f)$ as a function of temperature. Temperature variations are a part of nature and hence we need to continuously update our channel transfer functions. Changes in channel characteristics can change the channel capacity. We can develop an adaptive optimal transmit spectrum to adjust to these as well as any other variations.

4.12.4 Broadband modulation schemes

We saw in Section 4.5.10 that we can easily group the bins of the optimal transmit spectrum to make it smoother (with fewer discontinuities), so that we could apply different broadband modulation schemes. One can apply different broadband modulation schemes (like multi-level PAM, QAM, CAP, etc.) over large spectral regions to the optimal transmit spectrum obtained after grouping the bins and determine the performance margins. In this case, we need to use a DFE at the receiver to compensate for the severe channel attenuation characteristics. All these broadband modulation schemes do not suffer from latency as DMT does, but the DFE structure is complex. It is worth-while to compare the margins obtained with broadband modulation schemes with those obtained using DMT as well as compare the complexity and implementation issues involved.

4.12.5 Linear power constraints in frequency

We saw in earlier Sections 4.4–4.10, optimal power distribution using water-filling technique under an average power constraint, and peak-constrained water-filling technique under a peak power constraint in frequency or average plus peak power constraint in frequency. In general, we can determine the optimal power distribution under any set of general linear power constraints in frequency. Further, we can employ one of the joint signaling techniques discussed in this document under these new constraints using similar analysis.

4.12.6 CDS signaling under a peak power constraint in frequency

In case of a limiting static PSD mask, (see Sections 4.8 and 4.9), or otherwise, one may be required to limit the peak power in one or all the frequency bins. In this case a power-peaky signaling scheme like FDS or multi-line FDS will no longer be optimal as now we have a peak power constraint instead of the average power constraint. For this case, CDS or multi-line CDS signaling [20] would be a better orthogonal signaling technique and would give increased capacity benefits without compromising spectral compatibility.

Recall, that in frequency bins where self-NEXT is high and self-FEXT is low, we need orthogonal signaling (FDS, TDS, or CDS) between upstream and downstream transmissions, i.e., $$s_i^u(f) \perp s_j^d(f), \forall i \neq j. \tag{108}$$

Under an average power constraint, FDS signaling is the optimal signaling strategy (see Section 4.5.12). In FDS signaling $s_i^u(f)$ and $s_j^d(f)$ occupy distinct separate frequency bands that are twice as higher than those using EQPSD signaling (see FIG. 25). In CDS signaling the transmit spectra $s_i(f)$ and $s_j^d(f)$ look similar to EQPSD signaling but the upstream and downstream spectra are separated using two orthogonal codes. Under a peak power constraint in frequency CDS signaling is preferred. Towards this end, we can group together bins using FDS into one spectral region EFDS. We can implement spread spectrum CDS (SS-CDS) over this spectral region EFDS such that $$S_i^u(f) \perp S_j^d(f), \forall i \neq j, \forall f \in E_{FDS} \tag{109}$$

Further, recall that in frequency bins where self-FEXT is high, we need to use orthogonal signaling (multi-line FDS, TDS, or multi-line CDS) between upstream and downstream transmissions of all the M lines, i.e., $$s_i^o(f) \perp s_j^o(f), \forall i \neq j, o \in \{u, d\}. \tag{110}$$

Multi-line CDS separates the M interfering lines using M orthogonal codes and is less power-peaky in frequency than multi-line FDS. Under an average power constraint, multi-line FDS signaling strategy is preferred. In multi-line FDS each line gets a separate frequency slot within each bin for transmission. The PSD $s_i^o(f)$ in each bin is M times higher (or taller) than the corresponding PSD using EQPSD signaling (see FIG. 18). Clearly, under a peak power constraint an alternative orthogonal signaling scheme like multi-line CDS is preferred. We can group together bins using multi-line FDS into one spectral region EMFDS. We can implement SS-CDS over this spectral region EMFDS such that $$S_i^o(f) \perp S_j^o(f), \forall i \neq j, o \in \{u,d\}, \text{ and } \forall f \in E_{MFDS} \tag{111}$$

Note that implementation of SS-CDS cannot give perfectly orthogonal codes; instead we have only codes with very low cross-correlation. However, use of CDS or multi-line CDS signaling yields similar capacity (in the limit as cross-correlation between codes→0) as FDS or multi-line FDS schemes.

4.12.7 Multi-user detector at central office

We have seen that self-interference is a major limiter in achieving higher channel capacity. We can extend the work in previous Sections and construct a multi-user detector [21] at the central office that uses the self-interference for joint detection of each user (or line). In this sense the self-interference is not treated as only noise but can be used as information to achieve further significant gains in capacity of twisted pair lines.

5 SUMMARY OF CONTRIBUTIONS

The key differences from the prior art are:

1. Increased capacity for xDSL lines using optimal and suboptimal transmit spectra involving joint signaling schemes.
2. "Symmetrical" (or power complementary) upstream and downstream optimal transmit spectrum for a xDSL line in presence of self-NEXT, self-FEXT, AGN, and other interfering lines like T1, HDSL, and ADSL using EQPSD and FDS signaling.
3. Fast near-optimal solution for the transmit spectrum which is computationally very attractive and very easy to implement for xDSL lines.
4. Spectral optimization gives good spectral compatibility with other services (FDS better than CDS for spectral compatibility under an average power constraint).
5. Dynamic transmit spectrum that adjusts automatically according to the interference type.
6. Multi-line FDS signaling technique to combat self-FEXT.
7. Increased capacity for HDSL2, "GDSL", and "VDSL2" lines using multi-line FDS signaling when appropriate.
8. Increased capacity in generic xDSL lines when neighboring lines have different channel, noise and interference characteristics.
9. Concept of static estimation of interference values by reading look-up table of the topology of the cables (which self-interfering lines are where) at powerup. The self-interference values can be estimated in this manner. Dynamic measurement of interference values is done by "listening" to the interference during powerup. (Subtract the estimated self-interference from this measured interference to get the different service interference.)
10. We can also interpret our results as capacity estimates given a fixed margin in the presence of fixed interferers.

Final notes:

1. We have framed our work within the context of the HDSL2, "GDSU", and "VDSL2" transmission formats. However, our results are more general, and apply to all channels that exhibit crosstalk interference from neighboring channels. We summarize a few channels where this technique could be potentially applied:
   (a) Twisted pair lines (standard telephone lines)
   (b) Untwisted pairs of copper lines
   (c) Unpaired cables
   (d) Coaxial cables
   (e) Power lines
   (f) Geophysical well-logging telemetry cables
   (g) Wireless channels.
2. If a static mask is desired (e.g., for ease of implementation), we propose that a thorough study be made of the optimal solutions in different interference and noise scenarios as proposed in this document and then a best static compromising PSD mask be chosen.

References

[1] S. McCaslin, "Performance and Spectral Compatibility of MONET-PAM HDSL2 with Ideal Transmit Spectra-Preliminary Results," T1E1.4/97-307.

[2] M. Rude, M. Sorbara, H. Takatori and G. Zimmerman, "A Proposal for HDSL2 Transmission: OPTIS," T1E1.4197-238.

[3] A. Sendonaris, V. Veeravalli and B. Aazhang, "Joint Signaling Strategies for Approaching the Capacity of Twisted Pair Channels," *IEEE Trans. Commun.*, vol. 46, no. 5, May 1998.

[4] S. McCaslin and N. V. Bavel, "Performance and Spectral Compatibility of MONET(R1) HDSL2 with Ideal Transmit Spectra-Preliminary Results," T1E1.4/97-412.

[5] J. Girardeau, M. Rude, H. Takatori and G. Zimmerman, "Updated OPTIS PSD Mask and Power Specification for HDSL2," T1E1.4/97-435.

[6] J. A. C. Bingham, "Multicarrier Modulation for Data Transmission: An Idea Whose Time has Come," *IEEE Commun. Magazine*, May 1990.

[7] G. Zimmerman, "Performance and Spectral Compatibility of OPTIS HDSL2," T1E1.4/97-237.

[8] K. Kerpez, "Full-duplex 2B1Q Single-pair HDSL Performance and Spectral Compatibility," T1E1.4/95-127.

[9] American National Standard for Telecommunications, "Network and Customer Installation Interfaces-Asymmetric Digital Subscriber Line (ADSL) Metallic Interface," T1.413-1995, Annex B.

[10] American National Standard for Telecommunications, "Network and Customer Installation Interfaces-Asymmetric Digital Subscriber Line (ADSL) Metallic Interface," T1.413-1995, Annex E.

[11] G. Zimmerman, "Normative Text for Spectral Compatibility Evaluations," T1E1.4/97-180R1.

[12] M. Barton and M. L. Honig, "Optimization of Discrete Multitone to Maintain Spectrum Compatibility with Other Transmission Systems on Twisted Copper Pairs," *IEEE J. Select. Areas Commun.*, vol. 13, no. 9, pp. 1558–1563, December 1995.

[13] K. J. Kerpez, "Near-End Crosstalk is almost Gaussian," *IEEE Trans. Commun.*, vol. 41, no. 1, January 1993.

[14] R. G. Gallager, "Information Theory and Reliable Communication," New York: Wiley, 1968.

[15] I. Kalet, "The Multitone Channel," *IEEE Trans. Commun.*, vol. 37, no. 2, February 1989.

[16] J. T. Aslanis and J. M. Cioffi, "Achievable Information Rates on Digital Subscriber Loops: Limiting Information Rates with Crosstalk Noise," *IEEE Trans. Commun.*, vol. 40, no. 2, February 1992.

[17] P. S. Chow, J. M. Cioffi and J. A. C. Bingham, "A Practical Discrete Multitone Transceiver Loading Algorithm for Data Transmission over Spectrally Shaped Channels," *IEEE Trans. Commun.*, vol. 43, nos. 2/3/4, February/March/April 1995.

[18] I. Kalet and S. Shamai (Shitz), "On the Capacity of a Twisted-Wire Pair: Gaussian Model," *IEEE Trans. Commun.*, vol. 38, no. 3, Man: 1990.

[19] W. H. Press, S. A. Teukolsky, W. T. Vellerling and B. P. Flannery, "Numerical recipes in C—The Art of Scientific Computing," *Cambridge University Press*, 2nd edition, 1997.

[20] J. G. Proakis, "Digital Communications," *McGraw Hill*, 3rd edition, 1995

[21] S. Verdu, "Recent-Progress in Multiuser Detection" in "Multiple Access Communications," Edited by N. Abramson IEEE press, 1993

[22], R. Horst, P. M. Pardalos and N. V. Thoai, "Introduction to Global Optimization," *Kluwer Academic Publishers*, 1995

| Glossary | |
|---|---|
| ADSL: | Asymmetrical digital subscriber line |
| AGN: | Additive Gaussian noise |
| BER: | Bit error rate (or probability) |
| BT: | Bridged tap |
| CAP: | Carrierless amplitude/pulse modulation |
| CDMA: | Code-division multiple access |
| CDS: | Code-division signaling |
| CO: | Central office |
| CSA: | Carrier serving area |
| DFE: | Decision feedback equalization |
| DMT: | Discrete multitone technology |
| DSL: | Digital subscribe line |
| EQPSD: | Equal power spectral density signaling |
| FDS: | Frequency division signaling |
| FEXT: | Far-end crosstalk |
| "GDSL": | General digital subscriber line |
| HDSL: | High bit-rate digital subscriber line |
| HDSL2: | High bit-rate digital subscriber line 2 |
| ISDN: | Integrated services digital network |
| ISI: | Intersymbol interference |
| MFDS: | Multi-line Frequency division signaling |
| NEXT: | Near-end crosstalk |
| PAM: | Pulse amplitude modulation |
| POTS: | Plain old telephone services |
| PSD: | Power spectral density |
| QAM: | Quadrature amplitude modulation |
| SNR: | Signal to noise ratio |
| SS-CDS: | Spread spectrum code-division signaling |
| T1: | Transmission 1 standard |
| TDS: | Time division signaling |
| VDSL: | Very high bit-rate DSL |
| "VDSL2": | Very high bit-rate DSL 2 |
| xDSL: | Any generic DSL service |

| Notation | |
|---|---|
| $\perp$: | Orthdgonal |
| $\cup$: | Union |
| A: | Kind of service, such as ADSL, HDSL, HDSL2, VDSL, etc. |
| B: | Channel transmission bandwidth |
| C: | Channel capacity or line capacity |
| D: | Difference between two capacities |
| E: | Spectral region |
| F: | Magnitude squared Far-end crosstalk (self-FEXT) transfer function in a single bin |
| G: | Signal to noise ratio (SNR) in a single bin |
| H: | Magnitude squared channel transfer function in a single bin |
| J: | Kind of signaling scheme, such as EQPSD, FDS, multi-line FDS, etc. |
| K: | Total number of bins within channel transmission bandwidth |
| L: | Function of line parameters (G, F, X, H) in a single bin; it is always a positive quantity |
| M: | Number of interfering lines carrying the same service |
| N: | Total additive Gaussian noise (AGN) power plus total different service interference |
| P: | Power |
| Q: | Constraining PSD mask |
| R: | Receiver |
| S: | Power spectral density (PSD) |
| T: | Transmitter |
| U: | Positive quantity equal to Y + Z + N |
| V: | Positive quantity equal to Y + Z + N + S |
| W: | Bandwidth of a bin or a subchannel |
| X: | Magnitude squared Near-end crosstalk (self-NEXT) transfer function in a single bin |
| Y: | Part of crosstalk power that couples into another service line |
| Z: | Part of crosstalk power that couples into another service line |
| a: | An amplitude level of a transmit spectrum |
| b: | An amplitude level of a transmit spectrum |

-continued

| Notation | |
|---|---|
| c: | Capacity of a bin or a subchannel |
| d: | Downstream direction |
| f: | Frequency |
| i: | Line number |
| j: | Line number |
| k: | Bin index |
| n: | Fraction to choose power distribution $0 \leq n \leq 1$ |
| o: | Direction index $o \in \{u, d\}$ |
| u: | Upstream direction |
| $C^o_i$: | Capacity of line i in transmission direction o |
| $C^o$: | Capacity of a line in direction o |
| $C_i$: | Capacity of a line i |
| $E_{FDS}$: | Spectral region employing FDS signaling |
| $E_{MFDS}$: | Spectral region employing multi-line FDS signaling |
| $F_{i,k}$: | Magnitude squared self-FEXT transfer function on line i and bin k |
| $F_i$: | Magnitude squared self-FEXT transfer function of line i in a single bin |
| $G_i$: | Ratio of signal power in line i to noise power in line 1 in a single bin |
| $H_{i,k}$: | Magnitude squared channel transfer function of line i and bin k |
| $H_i$: | Magnitude squared channel transfer function of line i in a single bin |
| $N_o(f)$: | Channel noise |
| $N_i$: | AGN plus different service interference on line i |
| $P_{mi}$: | Power in positive frequency range ([O, W]) of a single bin of line i |
| $P_m$: | Power in positive frequency range ([O, W]) of a single bin |
| $P_{max}$: | Total average power over the entire frequency range ([−B, B]) of the channel |
| $Q^o(f)$: | Constraining PSD mask in direction o |
| $R_A$: | Achievable rate in a single bin or subchannel |
| $R^o_i$: | Receiver on line i in direction o |
| $S^o_i(f)$: | PSD of line i in direction o |
| $S^o(f)$: | PSD of a line in direction o |
| $T^o_i$: | Transmitter on line i in direction o |
| $X_{i,k}$: | Magnitude squared self-NEXT transfer function on line i and bin k |
| $X_i$: | Magnitude squared self-NEXT transfer function on line i in a single bin |
| $c^o_{i,J}$: | Capacity of a single bin of line i using signaling scheme J. |
| $c^o_i$: | Capacity of a single bin of line i in direction o |
| $c^o$: | Capacity of a single bin in direction o |
| $s^o_i(f)$: | PSD in a single bin of line i in direction o |
| $s^o(f)$: | PSD in a single bin in direction o |

We claim:

1. A method for determining a transmit spectrum for use in communicating data on a communications channel, wherein the communications channel is subject to interference from one or more other communications channels, wherein the communications channel carries a first type of service, wherein the one or more other communications channels includes a first subset of communications channels that carry the first type of service, the method comprising:

determining a channel transfer function of the communications channel;

determining interference characteristics of the communications channel, wherein said determining interference characteristics includes at least one of:

a) determining an amount of self interference into the communications channel that results from interference from the first subset of communications channels that carry the first type of service, wherein the self interference includes self-FEXT, and b) determining an amount of uncorrelated interference into the communications channel, wherein the uncorrelated interference includes non-white noise;

examining the channel transfer function and the interference characteristics;

determining the transmit spectrum in response to said examining, wherein the transmit spectrum is useable in communicating data on the communications channel, and wherein the transmit spectrum includes a portion using MFDS signaling.

2. The method of claim 1, further comprising:
transmitting data on the communications channel using the transmit spectrum.

3. The method of claim 1, wherein the transmit spectrum uses MFDS signaling in spectral portions for which said examining indicates that the amount of self interference is substantially high.

4. The method of claim 1, wherein said determining the amount of self interference includes determining an amount of self-NEXT interference and an amount of self-FEXT interference;
wherein said determining the transmit spectrum further comprises:
determining an EQPSD/FDS transmit spectrum if said examining indicates that the amount of self-NEXT interference is substantially high and the amount of self-FEXT interference is substantially low; and
determining an EQPSD/FDS/MFDS transmit spectrum if said examining indicates that the amount of self-FEXT interference is substantially high.

5. The method of claim 1, wherein the uncorrelated interference includes additive Gaussian noise (AGN);
wherein the transmit spectrum is determined in response to the amount of AGN.

6. The method of claim 1, wherein the uncorrelated interference includes different service interference (DSN);
wherein the transmit spectrum is determined in response to the amount of DSIN.

7. The method of claim 6,
wherein the one or more other communications channels further includes a second subset of communications channels that carry a different type of service;
the method further comprising:
determining an amount of different-service interference into the communications channel that results from interference from the second subset of communications channels that carry the second type of service;
examining the amount of different-service interference;
wherein the transmit spectrum is determined in response to the amount of different-service interference.

8. The method of claim 1, wherein said determining the channel transfer function comprises receiving the channel transfer function.

9. The method of claim 1, wherein said determining the channel transfer function comprises measuring the channel transfer function.

10. The method of claim 1, wherein said determining the channel transfer function is performed in response to temperature changes.

11. The method of claim 1, wherein the one or more other communications channels are located proximate to the communications channel.

12. The method of claim 1, wherein the transmit spectrum is determined so that the communications channel has equal upstream and downstream capacities.

13. The method of claim 1, wherein the transmit spectrum is determined so that the communications channel has equal upstream and downstream performance margins.

14. The method of claim 1, wherein the transmit spectrum is determined so that the communications channel has equal upstream and downstream capacities and equal upstream and downstream performance margins.

15. The method of claim 1, wherein the transmit spectrum is determined in response to a predetermined peak power constraint in frequency and a predetermined average power on the communications channel.

16. The method of claim 1, wherein the transmit spectrum is spectrally compatible with the one or more other communications channels.

17. The method of claim 1, wherein the transmit spectrum operates to substantially maximize a data transmission rate for the communications channel and is spectrally compatible with the one or more other communications channels.

18. The method of claim 1, wherein said determining the transmit spectrum comprises using a water-filling technique or a peak constrained water-filling technique to determine a power spectral density function.

19. The method of claim 1, wherein said determining interference characteristics and said determining the transmit spectrum are dynamically performed each time a data transfer is initiated.

20. The method of claim 1, wherein said determining interference characteristics and said transferring the data are performed a plurality of times;
wherein said determining interference characteristics and said determining the transmit spectrum are performed each time a data transfer is initiated.

21. The method of claim 1, further comprising:
repeating said determining interference characteristics and said determining the transmit spectrum during the data transfer to produce a new transmit spectrum;
wherein the new transmit spectrum is used during a remainder of the data transfer.

22. The method of claim 1, wherein said transferring the data includes:
performing a first portion of the data transfer;
repeating said determining interference characteristics and said determining the transmit spectrum during the data transfer to produce a new transmit spectrum after said performing the first portion of the data transfer; and
performing a second portion of the data transfer using the new transmit spectrum after said repeating.

23. The method of claim 1, wherein said determining the transmit spectrum comprises determining a downstream transmit spectrum and an upstream transmit spectrum.

24. The method of claim 1, wherein said determining interference characteristics includes:
determining an amount of self interference into the communications channel that results from interference from the first subset of communications channels that carry the first type of service, and
determining an amount of uncorrelated interference into the communications channel,
wherein the transmit spectrum is determined in response to the channel transfer function, the amount of self interference, and the amount of uncorrelated interference.

25. The method of claim 24, wherein the transmit spectrum is determined in response to a predetermined average power on the communications channel.

26. The method of claim 24,
wherein said determining the amount of self interference includes:
determining a self-NEXT transfer function and determining a self-FEXT transfer function;
wherein the transmit spectrum is determined in response to the self-NEXT and self-FEXT transfer functions.

27. The method of claim 24,
wherein the one or more other communications channels further includes a second subset of communications channels that carry a second, different type of service;
wherein said determining the amount of uncorrelated interference includes:
determining an amount of different-service interference into the communications channel that results from interference from the second subset of communications channels that carry the second type of service; and
wherein the transmit spectrum is determined in response to the amount of different-service interference.

28. The method of claim 24,
wherein said determining the amount of uncorrelated interference includes:
determining an amount of additive Gaussian noise (AGN) that is in addition to the amount of self interference; and
wherein the transmit spectrum is determined in response to the amount of AGN.

29. The method of claim 24,
wherein the one or more other communications channels further includes a second subset of communications channels that carry a second, different type of service;
wherein said determining the amount of uncorrelated interference includes:
determining an amount of different-service interference into the communications channel that results from interference from the second subset of communications channels that carry the second type of service, and
determining an amount of additive Gaussian noise (AGN) that is in addition to the amount of self interference and the amount of different-service interference; and
wherein the transmit spectrum is determined in response to the amount of different-service interference and the amount of AGN.

30. A method for communicating data on a communications channel subject to interference from one or more other communications channels, the method comprising:
determining a channel transfer function of the communications channel;
determining an amount of self-FEXT interference into the communications channel from the one or more other communications channels;
determining an amount of uncorrelated interference into the communications channel;
determining a transmit spectrum that is constructed to orthogonally separate the communications channel from said one or more other communications channels in at least one portion of the transmit spectrum.

31. The method of claim 30, wherein the transmit spectrum comprises a first portion using EQPSD signaling and a second portion using multi-line CDS signaling.

32. The method of claim 31, wherein said determining the transmit spectrum comprises using a water-filling technique or a peak constrained water-filling technique to determine a power spectral density function.

33. The method of claim 30, wherein the transmit spectrum includes a first portion using EQPSD signaling, and wherein the transmit spectrum includes a second portion using MFDS signaling only if the amount of self-FEXT interference is substantially high.

34. The method of claim 30, wherein the transmit spectrum includes a first portion using EQPSD signaling, and wherein the transmit spectrum includes a second portion using MFDS signaling only if the amount of self-FEXT interference indicates a greater data transmission rate for the transmit spectrum with orthogonally separated channels than a transmit spectrum with non-orthogonally separated channels.

35. The method of claim 30, wherein said determining the amount of self-FEXT interference comprises: determining a self-FEXT transfer function, wherein the transmit spectrum is determined in response to the self-FEXT transfer function, and wherein the transmit spectrum includes a first portion using EQPSD signaling and a second portion using MFDS signaling.

36. The method of claim 35,
wherein the first portion covers a frequency range over which the self-FEXT transfer function is greater than a first self-FEXT limit.

37. The method of claim 30, wherein said determining the amount of self-FEXT interference includes determining a self-FEXT transfer function, and wherein the method further comprises:
determining a self-NEXT transfer function,
wherein said determining the amount of uncorrelated interference includes determining a signal-to-noise ratio (SNR) for the communications channel;
wherein the transmit spectrum is determined in response to the self-FEXT transfer function, the self-NEXT transfer function, and the SNR; and
wherein the transmit spectrum includes a first portion using EQPSD signaling and a second portion using MFDS signaling.

38. The method of claim 37,
wherein the first portion covers a frequency range over which the self-FEXT transfer function is less than a first self-FEXT limit.

39. The method of claim 37,
wherein the second portion covers a frequency range over which the self-FEXT transfer function is greater than a first self-FEXT limit.

40. The method of claim 37,
wherein the first portion covers a frequency range over which the self-FEXT transfer function is less than a first self-FEXT limit; and
wherein the second portion covers a frequency range over which the self-FEXT transfer function is greater than a first self-FEXT limit.

41. The method of claim 38, or of claim 39, or of claim 40, wherein the first self-FEXT limit is given by the following expression, $$\frac{[2 + G(f)(X(f) + H(f))] - \left(1 + \frac{M}{2}G(f)H(f)\right)^{1/M}(2 + G(f)X(f))}{G(f)\left(\left(1 + \frac{M}{2}G(f)H(f)\right)^{1/M} - 1\right)};$$

wherein $H(f) \equiv |H_C(f)|^2$ is the channel transfer function, wherein $X(f) \equiv |H_N(f)|^2$ is the self-NEXT transfer function, wherein $G(f)$ is the SNR, and wherein M is one greater than the number of said one or more other communications channels.

42. The method of claim 41, wherein the transmit spectrum further includes a third portion using FDS signaling.

43. The method of claim 30, wherein the transmit spectrum includes a first portion using FDS signaling and a second portion using MFDS signaling.

44. The method of claim 43 wherein said determining the transmit spectrum comprises using a water-filling technique.

45. The method of claim 30, wherein the transmit spectrum includes a first portion using FDS signaling and a second portion using MFDS signaling only if the amount of self-FEXT interference is substantially high.

46. The method of claim 30, wherein the transmit spectrum includes a first portion using FDS signaling and a second portion using MFDS signaling only if the amount of self-FEXT interference indicates a greater data transmission rate for the transmit spectrum with orthogonally separated channels than a transmit spectrum with non-orthogonally separated channels.

47. The method of claim 30, wherein said determining the amount of self-FEXT interference comprises determining a self-FEXT transfer function, wherein the transmit spectrum is determined in response to the self-FEXT transfer function, and wherein the transmit spectrum includes a first portion using FDS signaling and a second portion using MFDS signaling.

48. The method of claim 47, wherein the first portion covers a frequency range over which the self-FEXT transfer function is greater than a second self-FEXT limit.

49. The method of claim 30, wherein said determining the amount of self interference includes:
  determining a self-FEXT transfer function,
  determining a self-NEXT transfer function, and
wherein said determining the amount of uncorrelated interference comprises:
  determining a signal-to-noise ratio (SNR) for the communications channel;
wherein the transmit spectrum is determined in response to the self-FEXT transfer function, the self-NEXT transfer function, and the SNR; and
wherein the transmit spectrum includes a first portion using FDS signaling and a second portion using MFDS signaling.

50. The method of claim 49, wherein the first portion covers a frequency range over which the self-FEXT transfer function is less than a second self-FEXT limit.

51. The method of claim 49, wherein the second portion covers a frequency range over which the self-FEXT transfer function is greater than a second self-FEXT limit.

52. The method of claim 49, wherein the first portion covers a frequency range over which the self-FEXT transfer function is less than a second self-FEXT limit; and
wherein the second portion covers a frequency range over which the self-FEXT transfer function is greater than the second self-FEXT limit.

53. The method of claim 50, or of claim 51, or of claim 52, wherein the second self-FEXT limit is given by the following expression, $$\frac{[1+G(f)H(f)] - \left(1 + \frac{M}{2}G(f)H(f)\right)^{2/M}}{G(f)\left(\left(1 + \frac{M}{2}G(f)H(f)\right)^{2/M} - 1\right)};$$

wherein $H(f) \equiv |H_C(f)|^2$ is the channel transfer function, wherein $X(f) \equiv |H_N(-)|^2$ is the self-NEXT transfer function, wherein $G(f)$ is the SNR, and wherein M is one greater than the number of said one or more other communications channels.

54. The method of claim 53, wherein the transmit spectrum further includes a third portion using EQPSD signaling.

55. The method of claim 30, wherein the transmit spectrum includes:

a first portion covering a frequency range in which a greater data transmission rate exists for EQPSD signaling than for FDS signaling, and
a second portion covering a frequency range in which a lower data transmission rate exists for EQPSD signaling than for FDS signaling;
wherein the first portion includes a subportion using MFDS signaling.

56. The method of claim 55, wherein said determining the amount of self-FEXT interference comprises:

determining a self-FEXT transfer function;
wherein the transmit spectrum is determined in response to the self-FEXT transfer function; and
wherein the subportion covers a frequency range over which the self-FEXT transfer function is greater than a first self-FEXT limit.

57. The method of claim 55, wherein said determining the amount of self-FEXT interference includes determining a self-FEXT transfer function, and wherein the method further comprises:

determining a self-NEXT transfer function;
wherein said determining the amount of uncorrelated interference comprises:
  determining a signal-to-noise ratio (SNR) for the communications channel;
wherein the transmit spectrum is determined in response to the self-FEXT transfer function, to the self-NEXT transfer function, and the SNR; and
wherein the subportion covers a frequency range over which the self-FEXT transfer function is greater than a first self-FEXT limit.

58. The method of claim 57, wherein the first self-FEXT limit is given by the following expression, $$\frac{[2 + G(f)(X(f) + H(f))] - \left(1 + \frac{M}{2}G(f)H(f)\right)^{1/M}(2 + G(f)X(f))}{G(f)\left(\left(1 + \frac{M}{2}G(f)H(f)\right)^{1/M} - 1\right)};$$

wherein $H(f) \equiv |H_C(f)|^2$ is the channel transfer function, wherein $X(f) \equiv |H_N(f)|^2$ is the self-NEXT transfer function, wherein $G(f)$ is the SNR, and wherein M is one greater than the number of said one or more other communications channels.

59. The method of claim 55, wherein the second portion includes a second subportion using MFDS signaling.

60. The method of claim 30, wherein the transmit spectrum includes:

a first portion covering a frequency range in which a greater data transmission rate exists for EQPSD signaling than for FDS signaling, and a second portion covering a frequency range in which a lower data transmission rate exists for EQPSD signaling than for FDS signaling;

wherein the second portion includes a subportion using MFDS signaling.

61. The method of claim 60, wherein said determining the amount of self-FEXT interference comprises:

determining a self-FEXT transfer function;

wherein the transmit spectrum is determined in response to the self-FEXT transfer function; and wherein the subportion covers a frequency range over which the self-FEXT transfer function is greater than a second self-FEXT limit.

62. The method of claim 60, wherein said determining the amount of self-FEXT interference includes determining a self-FEXT transfer function, and wherein the method further comprises:

determining a self-NEXT transfer function;

wherein said determining the amount of uncorrelated interference comprises: determining a signal-to-noise ratio (SNR) for the communications channel;

wherein the transmit spectrum is determined in response to the self-FEXT transfer function, to the self-NEXT transfer function, and the SNR; and wherein the subportion covers a frequency range over which the self-FEXT transfer function is greater than a second self-FEXT limit.

63. The method of claim 62, wherein the second self-FEXT limit is given by the following expression, $$\frac{[1+G(f)H(f)]-\left(1+\frac{M}{2}G(f)H(f)\right)^{2/M}}{G(f)\left(\left(1+\frac{M}{2}G(f)H(f)\right)^{2/M}-1\right)};$$

wherein $H(f) \equiv |H_C(f)|^2$ is the channel transfer function, wherein $X(f) \equiv |H_N(f)|^2$ is the self-NEXT transfer function, wherein $G(f)$ is the SNR, and wherein M is one greater than the number of said one or more other communications channels.

64. The method of claim 60, wherein the first portion includes a second subportion using MFDS signaling.

65. A method for determining a transmit spectrum for use in communicating data on a communications channel, wherein the communications channel is subject to interference from one or more other communications channels, wherein the communications channel carries a first type of service, wherein the one or more other communications channels includes a first subset of communications channels that carry the first type of service, the method comprising:

determining a channel transfer function of the communications channel;

determining interference characteristics of the communications channel, wherein said determining interference characteristics includes:

a) determining an amount of self-FEXT interference into the communications channel that results from interference from the first subset of communications channels that carry the first type of service, wherein the determining an amount of self-FEXT interference includes determining a self-FEXT transfer function, and b) determining an amount of uncorrelated interference into the communications channel;

determining the transmit spectrum in response to said channel transfer function and the interference characteristics, wherein the transmit spectrum is useable in communicating data on the communications channel, and wherein the transmit spectrum includes at least one portion using MFDS signaling;

wherein the communications channel is divisible into a plurality of frequency bins, wherein the transmit spectrum is operable to selectively allocate transmission power to different ones of the plurality of frequency bins.

66. The method of claim 65, wherein said determining interference characteristics comprises determining an amount of self interference into the communications channel;

wherein the transmit spectrum is an EQPSD transmit spectrum in a first subset of the plurality of frequency bins if said examining indicates that the amount of self interference is substantially low in the first subset.

67. The method of claim 65, wherein said determining interference characteristics comprises determining an amount of self interference into the communications channel;

wherein the transmit spectrum is an FDS transmit spectrum in a first subset of the plurality of frequency bins if said examining indicates that the amount of self interference is substantially high in the first subset.

68. The method of claim 65, wherein said determining an amount of self interference into the communications channel comprises determining an amount of self-FEXT interference into the communications channel;

wherein the transmit spectrum is an MFDS transmit spectrum in a first subset of the plurality of frequency bins if said examining indicates that the amount of self-FEXT interference is substantially high in the first subset.

69. The method of claim 68, wherein the transmit spectrum is a discrete MFDS transmit spectrum in the first subset of the plurality of frequency bins.

70. The method of claim 68, wherein the transmit spectrum is a contiguous MFDS transmit spectrum in the first subset of the plurality of frequency bins.

71. The method of claim 68, wherein the transmit spectrum is a contiguous MFDS transmit spectrum in the first subset of the plurality of frequency bins, and wherein the transmit spectrum has equal upstream and downstream capacities and equal upstream and downstream average transmit powers.

72. A method for determining a transmit spectrum for use in communicating data on a communications channel subject to interference from one or more other communications channels, the method comprising:

determining a channel transfer function $H_1(f)$ of the communications channel;

determining a self-NEXT transfer function $X_1(f)$ for self-NEXT interference into the communications channel from said one or more other communications channels;

determining a self-FEXT transfer function $F_1(f)$ for self-FEXT interference into the communications channel from said one or more other communications channels;

determining a SNR $G_1(f)$ of the communications channel;

determining a second SNR $G_2(f)$ of the second communications channel; and determining the transmit spectrum in response to the channel transfer function $H_1(f)$, the self-NEXT transfer function $X_1(f)$, the self-FEXT transfer function $F_1(f)$, the SNR $G_1(f)$, and the second SNR $G_2(f)$ wherein said determining the transmit spectrum comprises determining an EQPSD transmit spectrum in a first frequency range of the communications channel if the SNR $G_1(f)$ is greater than an SNR limit over the first frequency range;

wherein said determining the transmit spectrum comprises determining an MFDS transmit spectrum in a second frequency range of the communications channel if the SNR $G_1(f)$ is less than an SNR limit over the second frequency range; and wherein the SNR limit depends on at least two of the channel transfer function $H_1(f)$, the self-NEXT transfer function $X_1(f)$, the self-FEXT transfer function $F_1(f)$, and the second SNR $G_2(f)$.

73. The method of claim 72, wherein the SNR limit is given by the following expression, $$\frac{G_2^2(f)(X_1(f)+F_1(f))^2 + 2G_2(f)(X_1(f)+F_1(f))}{H_1(f)}.$$

74. The method of claim 72, wherein the one or more other communications channels are located proximate to the communications channel.

75. The method of claim 72, wherein the transmit spectrum is determined so that the communications channel has equal upstream and downstream capacities.

76. The method of claim 72, wherein the transmit spectrum is determined in response to a predetermined average power on the communications channel.

77. The method of claim 72, wherein the transmit spectrum is spectrally compatible with the one or more other communications channels.

78. The method of claim 72, wherein the transmit spectrum operates to substantially maximize a data transmission rate for the communications channel and is spectrally compatible with the one or more other communications channels.

79. The method of claim 72, wherein said determining the transmit spectrum comprises using a water-filling technique to determine a power spectral density function.

80. The method of claim 72, wherein the communications channel is divisible into a plurality of frequency bins;

wherein the transmit spectrum is operable to selectively allocate transmission power to different ones of the plurality of frequency bins.

81. A method for determining a transmit spectrum for use in communicating data on a communications channel, wherein the communications channel is subject to interference from one or more other communications channels;

wherein the communications channel carries a first type of service, wherein the one or more other communications channels includes a first subset of communications channels that carry the first type of service;

wherein the communication channel carries a predetermined average power $P_{max}$;

wherein the communications channel is divisible into a plurality of frequency bins; and wherein the transmit spectrum is indicated by a power distribution that allocates transmission power to different ones of the plurality of frequency bins and by a signaling scheme for each frequency bin in the plurality of frequency bins;

the method comprising:
a) choosing a provisional power distribution that distributes the predetermined average power $P_{max}$ over the plurality of frequency bins;
b) choosing a provisional signaling scheme for each frequency bin in the plurality of frequency bins, wherein for one frequency bin said choosing the provisional signaling scheme comprises:
   determining an amount of self interference into the communications channel, in the one frequency bin, that results from interference from the first subset of communications channels that carry the first type of service,
   determining an amount of uncorrelated interference into the communications channel, in the one frequency bin,
   examining the amount of self interference and the amount of uncorrelated interference in the one frequency bin, and
   determining a signaling scheme in response to said examining, wherein the signaling scheme is chosen to maximize the channel capacity in the one frequency bin;
c) calculating a total channel capacity in response to the provisional power distribution and the provisional signaling scheme;
d) modifying the provisional power distribution in response to the total channel capacity so that the total channel capacity is increased; and
e) repeating steps (b)–(d) to maximize the total channel capacity;

wherein the transmit spectrum is indicated by the provisional power distribution and the provisional signaling scheme for each frequency bin that maximize the total channel capacity; and wherein said determining a signaling scheme comprises selecting a signaling scheme from the set consisting of EQPSD signaling, FDS signaling, and MFDS signaling.

* * * * *